(12) United States Patent
Lee et al.

(10) Patent No.: US 12,730,356 B2
(45) Date of Patent: Sep. 8, 2026

(54) LENS DRIVING DEVICE

(71) Applicant: LG INNOTEK CO., LTD., Seoul (KR)

(72) Inventors: Hyun Joong Lee, Seoul (KR); Han Ul Kwon, Seoul (KR); Jeong Gi You, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 230 days.

(21) Appl. No.: 18/551,761

(22) PCT Filed: Nov. 11, 2021

(86) PCT No.: PCT/KR2021/016420
§ 371 (c)(1),
(2) Date: Sep. 21, 2023

(87) PCT Pub. No.: WO2022/211206
PCT Pub. Date: Oct. 6, 2022

(65) Prior Publication Data
US 2024/0302711 A1 Sep. 12, 2024

(30) Foreign Application Priority Data

Apr. 1, 2021 (KR) ........................ 10-2021-0042988
Apr. 1, 2021 (KR) ........................ 10-2021-0042989
Apr. 1, 2021 (KR) ........................ 10-2021-0042990

(51) Int. Cl.
*G03B 5/00* (2021.01)
*G02B 27/64* (2006.01)
(Continued)

(52) U.S. Cl.
CPC ............. *G03B 5/00* (2013.01); *G02B 27/646* (2013.01); *H02K 33/00* (2013.01); *H04N 23/54* (2023.01); *G03B 2205/0069* (2013.01)

(58) Field of Classification Search
CPC .. H04N 23/54; G03B 2205/0069; G03B 5/00; G03B 2205/0007; G03B 2205/0046;
(Continued)

(56) References Cited

U.S. PATENT DOCUMENTS 12,200,335 B2 * 1/2025 Kim ....................... G03B 17/02
2007/0081820 A1 4/2007 Izumi et al.
(Continued)

FOREIGN PATENT DOCUMENTS

CN 208337697 U 1/2019
CN 111954838 A 11/2020
(Continued)

OTHER PUBLICATIONS

International Search Report dated Feb. 18, 2022 in International Application No. PCT/KR2021/016420.
(Continued)

*Primary Examiner* — Jia X Pan
(74) *Attorney, Agent, or Firm* — SALIWANCHIK, LLOYD & EISENSCHENK

(57) ABSTRACT

The present embodiment relates to a lens driving device comprising: a fixed part; a first moving part and a second moving part disposed in the fixed part; a first driving magnet disposed on the first moving part; a second driving magnet disposed in the second moving part; a first coil disposed in the fixed part and disposed at a position corresponding to the first driving magnet; and a second coil disposed in the fixed part and disposed at a position corresponding to the second driving magnet, wherein the center of the first coil is disposed more forward than the center of the second coil in an optical axis direction, and wherein a portion of the first coil is being overlapped with the second coil in a first direction perpendicular to the optical axis direction.

20 Claims, 49 Drawing Sheets

(51) Int. Cl.
*H02K 33/00* (2006.01)
*H04N 23/54* (2023.01)

(58) Field of Classification Search
CPC .......... G03B 3/00; G03B 30/00; H02K 33/00; G02B 27/646; G02B 7/102
See application file for complete search history.

(56) References Cited

U.S. PATENT DOCUMENTS

| | | | | |
|---|---|---|---|---|
| 2018/0129119 A1* | 5/2018 | Minamisawa | G02B 27/646 | |
| 2020/0033551 A1* | 1/2020 | Lee | G03B 17/12 | |
| 2020/0137274 A1* | 4/2020 | Lee | G03B 17/17 | |
| 2020/0351421 A1* | 11/2020 | Park | H04N 23/54 | |
| 2021/0018719 A1 | 1/2021 | Park | | |
| 2022/0201166 A1* | 6/2022 | Roh | G02B 7/021 | |
| 2023/0185161 A1* | 6/2023 | Lee | G02B 13/0065 | 359/554 |
| 2023/0209162 A1* | 6/2023 | Kim | H04N 23/55 | 348/207.99 |
| 2023/0213837 A1* | 7/2023 | Lee | G03B 3/10 | 359/824 |
| 2023/0314830 A1* | 10/2023 | Lee | G02B 27/646 | 359/555 |
| 2024/0302625 A1* | 9/2024 | Lee | H02K 11/215 | |
| 2025/0097555 A1* | 3/2025 | Kim | H04N 23/685 | |

FOREIGN PATENT DOCUMENTS

| | | | | |
|---|---|---|---|---|
| CN | 112955802 A | 6/2021 | | |
| EP | 3 739 370 A1 | 11/2020 | | |
| JP | 2013-109248 A | 6/2013 | | |
| JP | 2020-515889 A | 5/2020 | | |
| KR | 10-2015-0080367 A | 7/2015 | | |
| KR | 10-2017-0102790 A | 9/2017 | | |
| KR | 10-2018-0137278 A | 12/2018 | | |
| KR | 10-2019-0015788 A | 2/2019 | | |
| KR | 10-2019-0116808 A | 10/2019 | | |
| KR | 10-2020-0041067 A | 4/2020 | | |
| KR | 10-2020-0061622 A | 6/2020 | | |
| KR | 10-2020-0111657 A | 9/2020 | | |
| KR | 10-2020-0122166 A | 10/2020 | | |
| KR | 10-2020-0142876 A | 12/2020 | | |
| KR | 10-2020-0143187 A | 12/2020 | | |
| WO | WO-2020045867 A1 | * | 3/2020 | H04N 23/6812 |
| WO | WO-2020213994 A1 | * | 10/2020 | H04N 23/687 |
| WO | WO-2020218884 A1 | * | 10/2020 | H04N 23/687 |
| WO | WO-2020231110 A1 | * | 11/2020 | H04N 23/50 |
| WO | 2021/020738 A2 | | 2/2021 | |
| WO | WO-2023277540 A1 | * | 1/2023 | H02K 33/16 |

OTHER PUBLICATIONS

Supplementary European Search Report dated Mar. 13, 2025 in European Application No. 21935319.
Office Action dated Dec. 2, 2025 in Japanese Application No. 2023-560132.
Office Action dated Feb. 23, 2026 in Korean Application No. 10-2021-0042988.
Office Action dated Feb. 23, 2026 in Korean Application No. 10-2021-0042990.
Office Action dated Dec. 29, 2025 in Taiwanese Application No. 111111477.
Office Action dated Mar. 16, 2026 in Chinese Application No. 202180096549.3.
Office Action dated Mar. 17, 2026 in Japanese Application No. 2023-560132.

* cited by examiner

LENS DRIVING DEVICE

CROSS-REFERENCE TO RELATED APPLICATIONS

This application is the U.S. national stage application of International Patent Application No. PCT/KR2021/016420, Nov. 11, 2021, which claims the benefit under 35 U.S.C. § 119 of Korean Application Nos. KR 10-2021-0042988, filed Apr. 1, 2021, KR 10-2021-0042989, filed Apr. 1, 2021, and KR 10-2021-0042990, filed Apr. 1, 2021, the disclosures of each of which are incorporated herein by reference in their entirety.

TECHNICAL FIELD

The present invention relates to a lens driving device.

BACKGROUND ART

A camera device is a device that photographs a picture or video of a subject, and is installed in optical devices such as smartphones, drones, and vehicles.

In recent camera devices, in order to improve image quality, optical image stabilization (OIS) function that corrects image shake caused by user movement, auto focus (AF) function that automatically adjusts the distance between the image sensor and the lens to align the focal length of the lens, and zoom function that increases or decreases the magnification of a distant subject through a zoom lens are being requested.

In addition, as the need for high-performance zoom capability and high accuracy of camera modules increases, the required stroke length is increasing, it is necessary to develop a technology that can increase the accuracy while implementing a long stroke length.

DETAILED DESCRIPTION OF THE INVENTION

Technical Subject

The present embodiment intends to provide a lens driving device that provides continuous zoom and autofocus functions.

In addition, it is intended to provide a lens driving device that minimizes damage in the assembly stage, improves driving performance, and minimizes noise generation.

In addition, it is intended to provide a lens driving device with enhanced driving performance.

In addition, it is intended to provide a lens driving device that minimizes the size.

The technical problem to be solved by the present invention is to provide a lens driving device driven by a magnet comprising a void and a camera module comprising the same.

Technical Solution

A lens driving device according to the present embodiment comprises: a fixed part; a moving part disposed in the fixed part; a driving magnet disposed in the moving part; a coil disposed at a position corresponding to the driving magnet; a guide rail coupled to the fixed part; and a ball disposed between the guide rail and the moving part, wherein the fixed part comprises a housing comprising a protrusion and a cover coupled to the protrusion of the housing, and wherein the protrusion of the housing may be inserted into the cover through the guide rail.

The protrusion of the housing comprises: a first portion disposed on the guide rail; and a second portion being extended from the first portion and disposed in the cover, wherein the second portion of the protrusion of the housing may have a smaller width than the first portion.

The protrusion of the housing may comprise a first protrusion and a second protrusion, wherein the second portion of the first protrusion may have a greater width than the second portion of the second protrusion.

The first portion of the first protrusion and the first portion of the second protrusion may have the same width.

The guide rail comprises four holes in which the protrusions of the housing are disposed, wherein two of the four holes of the guide rail are formed to have shapes and diameters corresponding to the protrusions of the housing, and wherein the other two holes among the four holes may be formed in a shape different from the protrusion of the housing or have a larger diameter than the protrusion of the housing.

The cover may comprise two holes and two grooves in which the protrusions of the housing are disposed.

One of the two holes of the cover is formed with a shape and a diameter corresponding to the protrusion of the housing, wherein the other one of the two holes of the cover may be formed in a shape different from the protrusion of the housing or a diameter larger than that of the protrusion of the housing.

Each of the two grooves of the cover may be formed in a shape different from the protrusion of the housing or have a diameter larger than that of the protrusion of the housing.

The moving part may comprise a rail groove in which the ball is disposed, and a length of the rail groove of the moving part may be 2 to 4 times a diameter of the ball.

The rail groove of the moving part comprises a first rail groove and a second rail groove disposed on one side of the driving magnet, and a third rail groove and a fourth rail groove disposed on the other side of the driving magnet, wherein the first rail groove and the second rail groove may be spaced apart from each other by a distance of two to three times the diameter of the ball.

The guide rail comprises rail grooves formed at positions corresponding to the first and second rail grooves, wherein the guide rail may be formed as a plane at positions corresponding to the third and fourth rail grooves.

The moving part comprises a first holder and a second holder, wherein the first holder comprises a first surface facing the cover, and a plurality of protrusions formed on the first surface and being in contact with the cover, and wherein the second holder may comprise a second surface facing the first holder, and a plurality of protrusions formed on the second surface and being in contact with the second holder.

It may comprise a poron disposed on the fixed part and in contact with the first holder and the second holder.

A camera device according to the present embodiment comprises: a printed circuit board; an image sensor disposed on the printed circuit board; and a lens driving device.

An optical device according to the present embodiment comprises: a main body; a camera device disposed on the body; and a display disposed on the main body and outputting at least one of a video and an image photographed by the camera device.

A lens driving device according to the present embodiment comprises: a housing comprising a protrusion; a cover coupled to the protrusion of the housing; a holder disposed inside the housing; a driving magnet disposed on the holder;

a coil disposed at a position corresponding to the driving magnet; a guide rail coupled to the protrusion of the housing; and a ball disposed between the guide rail and the holder, wherein the protrusion of the housing may comprise: a first portion disposed on the guide rail; and a second portion being extended from the first portion and disposed on the cover.

The second portion of the protrusion of the housing may have a smaller width than the first portion.

The protrusion of the housing may comprise a first protrusion and a second protrusion, wherein the second portion of the first protrusion may have a greater width than the second portion of the second protrusion.

The guide rail comprises a plurality of holes in which the protrusion of the housing is disposed, wherein some of the plurality of holes of the guide rail is formed as a regular hole formed in a shape and diameter corresponding to the protrusion of the housing, and wherein some of the remaining part of the plurality of holes of the guide rail may be formed as a lengthy hole being formed in a shape different from that of the protrusion of the housing.

A lens driving device according to the present embodiment comprises: a housing comprising a protrusion; a cover coupled to the protrusion of the housing; a holder disposed inside the housing; a driving magnet disposed on the holder; a coil disposed at a position corresponding to the driving magnet; a guide rail coupled to the protrusion of the housing; and a ball disposed between the guide rail and the holder, wherein the guide rail comprises a hole in which the protrusion of the housing is disposed, wherein the cover comprises a hole or groove in which the protrusion of the housing is disposed, and wherein a diameter of the hole of the guide rail may be greater than a diameter of the hole or groove of the cover.

A lens driving device according to the present embodiment comprises: a fixed part; a first moving part and a second moving part disposed inside the fixed part; a first driving magnet disposed on the first moving part; a second driving magnet disposed on the second moving part; a first coil disposed on the fixed part and disposed at a position corresponding to the first driving magnet; and a second coil disposed on the fixed part and disposed at a position corresponding to the second driving magnet, wherein the center of the first coil is disposed in front of the center of the second coil in an optical axis direction, and wherein a portion of the first coil may be overlapped with the second coil in a first direction perpendicular to the optical axis direction.

The first coil may comprise a portion not being overlapped with the second coil in the first direction.

The center of the first coil may be disposed at a height corresponding to the center of the second coil in a second direction perpendicular to the optical axis direction and the first direction.

The fixed part comprises a housing and a first lens disposed in the housing, wherein the first moving part comprises: a first holder disposed in the housing; and a second lens disposed on the first holder, wherein the second moving part comprises: a second holder disposed in the housing; and a third lens disposed in the second holder, and wherein the second lens may be disposed between the first lens and the third lens.

The first coil may be formed to have the same size as the second coil and disposed closer to the first lens than the second coil.

A portion of the first driving magnet may be overlapped with the second driving magnet in the first direction.

The first driving magnet is formed to have the same size as the second driving magnet and may be disposed closer to the first lens than the second driving magnet.

It comprises a first Hall sensor and a second Hall sensor disposed in the hollow of the first coil and detecting the first driving magnet, wherein the first driving magnet comprises: a first magnet portion and a second magnet portion each having an N pole and an S pole; and a neutral portion or void disposed between the first magnet portion and the second magnet portion, and wherein in the optical axis direction, the size of the neutral portion or void may be smaller than the size of the hollow of the first coil and larger than the distance between the first Hall sensor and the second Hall sensor.

The first driving magnet comprises: a first magnet portion and a second magnet portion each having an N pole and an S pole; a neutral portion or void disposed between the first magnet portion and the second magnet portion, wherein the first coil comprises: a first portion facing the first magnet portion; and a second portion facing the second magnet portion, and wherein the first portion of the first coil is not overlapped with the second magnet portion in the first direction and the second portion of the first coil may not be overlapped with the first magnet portion in the first direction.

The fixed part comprises a first yoke that is a magnetic material, wherein the first driving magnet is disposed such that an attractive force acts with the first yoke, wherein the width of the first yoke in a second direction perpendicular to the optical axis direction and the first direction may be formed to be larger than the width of the first surface of the first driving magnet facing the first surface of the first yoke.

It comprises a second yoke disposed between the first driving magnet and the first moving part, wherein the second yoke may surround at least three surfaces of the first driving magnet.

When a current is applied to the first coil, the first moving part moves to perform a zoom function, and when a current is applied to the second coil, the second moving part may move to perform an autofocus function.

The camera device according to the present embodiment may comprise: a printed circuit board; an image sensor disposed on the printed circuit board; a reflective member driving device; and a lens driving device disposed between the image sensor and the reflective member driving device.

The camera device may comprise: a driver IC disposed on the printed circuit board and electrically connected to the first coil and the second coil; a substrate electrically connecting the printed circuit board and the reflective member driving device; and a temperature sensor disposed on the substrate.

The temperature sensor may be disposed adjacent to the first coil or the second coil.

The optical device according to the present embodiment may comprise: a main body; a camera device disposed on the main body; and a display disposed in the main body and outputting at least one of a video and an image photographed by the camera device.

A lens driving device according to the present embodiment comprises: a fixed part comprising a first lens; a first moving part disposed within the fixed part and comprising a second lens; a second moving part disposed within the fixed part and comprising a third lens; a first driving magnet disposed on the first moving part; a second driving magnet disposed on the second moving part; a first coil disposed at a position corresponding to the first driving magnet; and a second coil disposed at a position corresponding to the second driving magnet, wherein the first driving magnet may be disposed closer to the first lens than the second driving magnet, and wherein a portion of the first driving magnet may be overlapped with the second driving magnet in a first direction perpendicular to the optical axis direction.

The first driving magnet may comprise a portion not being overlapped with the second driving magnet in the first direction.

The first coil may be disposed closer to the first lens than the second coil.

The first driving magnet may be formed to have the same size as the second driving magnet.

A lens driving device according to the present embodiment comprises: a housing; a first holder and a second holder disposed inside the housing; a first lens disposed in the housing; a second lens disposed on the first holder; a third lens disposed on the second holder; a first driving magnet disposed on the first holder; a second driving magnet disposed on the second holder; a first coil disposed at a position corresponding to the first driving magnet; and a second coil disposed at a position corresponding to the second driving magnet, wherein the first coil is disposed closer to the first lens than the second coil, and wherein a portion of the first coil may be overlapped with the second coil in a first direction perpendicular to an optical axis direction, and another portion of the first coil may not be overlapped with the second coil in the first direction.

A lens driving device according to the present embodiment comprises: a fixed part; a moving part disposed inside the fixed part; a driving magnet disposed in the moving part; a substrate disposed in the fixed part; a coil disposed on the substrate and disposed at a position corresponding to the driving magnet; and an EEPROM disposed on the substrate, wherein the EEPROM may be electrically connected to the coil.

The moving part comprises a first moving part and a second moving part, wherein the driving magnet comprises a first driving magnet disposed in the first moving part and a second driving magnet disposed in a second moving part, wherein the substrate comprises a first substrate and a second substrate disposed to be spaced apart from each other on opposite sides with respect to the moving part, and wherein the coil may comprise: a first coil disposed on the first substrate and disposed at a position corresponding to the first driving magnet; and a second coil disposed on the second substrate and disposed at a position corresponding to the second driving magnet.

The second coil and the EEPROM may be disposed on an inner surface of the second substrate.

The fixed part may comprise a housing comprising a groove, and the EEPROM may be disposed in the groove of the housing.

The moving part comprises a holder and a lens disposed on the holder, wherein the holder comprises two protrusions spaced apart from each other in an optical axis direction, and wherein an upper surface of each of the two protrusions may comprise a flat surface and an inclined surface inclined from the flat surface.

The fixed part comprises a housing and a first lens disposed in the housing; the first moving part comprises a first holder and a second lens disposed on the first holder; the second moving part comprises a second holder and a third lens disposed on the second holder; and the first moving part and the second moving part may move individually.

Each of the first to third lenses may comprise a plurality of lenses.

The second lens and the third lens may be formed of a D-cut lens.

It comprises a Hall sensor disposed on the substrate and disposed in a hollow of the coil, wherein the EEPROM may be disposed outside the coil.

A camera device according to the present embodiment comprises: a printed circuit board; an image sensor disposed on the printed circuit board; and a lens driving device, wherein the substrate may be formed separately from the printed circuit board and may be electrically connected to each other through a conductive member.

The camera device may comprise a driver IC being electrically connected to the coil, and the driver IC may be disposed on the printed circuit board.

The substrate comprises: a plurality of terminals coupled to the printed circuit board through the conductive member; a first area in which the plurality of terminals are disposed; and a second area in which the coil is disposed, wherein in a state in which the first region is bent inward with respect to the second region, the plurality of terminals may be coupled to the printed circuit board.

The fixed part may comprise a housing comprising an inclined surface, wherein the first area may be inclinedly extended along the inclined surface of the housing with respect to the second area.

The camera device comprises: a sensor base disposed on the printed circuit board; and a filter disposed on the sensor base, wherein the filter is disposed at the opposite side of the image sensor with respect to the sensor base, and a portion of the filter may be protruded from the sensor base.

An optical device according to the present embodiment may comprise: a main body; a camera device disposed on the main body; and a display disposed on the main body and outputting at least one of a video and an image photographed by the camera device.

The lens driving device according to the present embodiment may comprise: a housing; a first holder and a second holder disposed inside the housing; a first driving magnet disposed on the first holder; a second driving magnet disposed on the second holder; a first substrate and a second substrate disposed in the housing being disposed and spaced apart from each other at opposite sides with respect to the first holder and the second holder; a first coil disposed on the first substrate; a second coil disposed on the second substrate; and an EEPROM disposed on at least one of the first substrate and the second substrate and electrically connected to the first coil and the second coil.

The EEPROM may individually control the first coil and the second coil.

The second coil and the EEPROM may be disposed on an inner surface of the second substrate, and the EEPROM may be disposed outside the second coil.

Each of the first holder and the second holder comprises two protrusions spaced apart from each other in an optical axis direction, wherein the upper surface of each of the two protrusions may comprise a flat surface and an inclined surface inclined from the flat surface.

The camera device according to the present embodiment may comprise: a printed circuit board; an image sensor disposed on the printed circuit board; a housing; a first holder and a second holder disposed inside the housing; a first driving magnet disposed on the first holder; a second driving magnet disposed on the second holder; a substrate being electrically connected to the printed circuit board and disposed in the housing; a first coil and a second coil disposed on the substrate; an EEPROM being disposed on the substrate and electrically connected to the first coil and the second coil; and a driver IC being disposed on the printed circuit board and electrically connected to the first coil and the second coil.

In order to solve the above technical problem, a lens driving device according to an embodiment of the present invention comprises: a lens barrel; and a magnet disposed in the lens barrel and comprising a first pole, a void, and a second pole, wherein the length of the void of the magnet is set according to the movement stroke length of the magnet.

In addition, the length of the void may be set to ½ of the length of the movement stroke in the movement direction of the magnet.

In addition, the length of the void may be set within a tolerance range of ½ of the length of the movement stroke in the movement direction of the magnet.

In addition, the tolerance range may be 10%.

In addition, the length of the void may be set to ¼ to ¾ of the length of the movement stroke in the movement direction of the magnet.

In addition, it comprises a position measuring unit for measuring the position of the magnet, wherein the magnet may perform the function of a driving magnet for driving the lens barrel and a sensing magnet for measuring the position of a lens barrel according to the measurement of the position measuring unit.

In order to solve the above technical problem, a camera module according to an embodiment of the present invention comprises: a plurality of lens groups comprising at least one lens group being fixed in position and at least one movable lens group; a lens barrel in which the plurality of lens groups are disposed; a magnet disposed in the lens barrel and comprising a first pole, a void, and a second pole; and a position measuring unit for measuring the position of the magnet, wherein the length of the void may be set according to the length of the movement stroke of the magnet.

In addition, the length of the void may be set within a tolerance range of ½ of the length of the movement stroke in the movement direction of the magnet.

In addition, the tolerance range may be 10%.

In addition, the magnification may be continuously adjusted according to a distance between two lens groups among the plurality of lens groups.

Advantageous Effects

Through the present embodiment, it is possible to inhibit the problem that the optical axis of the first group to third group lenses is misaligned due to damage to the coupling protrusion in the assembly process.

In addition, driving performance such as linearity and hysteresis may be enhanced by forming a ball rolling portion of the moving part to be elongated by a predetermined multiple of the ball diameter.

In addition, it is possible to minimize the noise caused by the collision among the first to third group lenses and the barrel and inhibit damage.

Through the present embodiment, two moving parts for performing the zoom function and autofocus function can be moved individually, and the space for movement can be minimized.

In addition, the sensitivity and linearity of the Hall output can be enhanced.

In addition, compensation according to the degree of heat generation may be applied.

Through this, driving performance of the auto focus function and the zoom function can be enhanced.

Since the calibration data (Cal. Data) performed in the previous process is used in the manufacturing stage through the EEPROM of the present embodiment, the time required to port the software can be minimized. Through this, the mass productivity of a camera device can be improved.

Through the present embodiment, the substrate on which the coil is placed, and the substrate on which the image sensor is placed are formed as separate substrates, and they can be connected via solder in the assembly process. At this time, according to the structure of the present embodiment, the size of the camera device can be minimized because the substrate and the solder for soldering the substrate are not protruded further than the substrate.

According to embodiments of the present invention, linearity, hysteresis, and resolution may be improved by using a magnet in which a void is being formed.

BRIEF DESCRIPTION OF DRAWINGS

Figure 10:
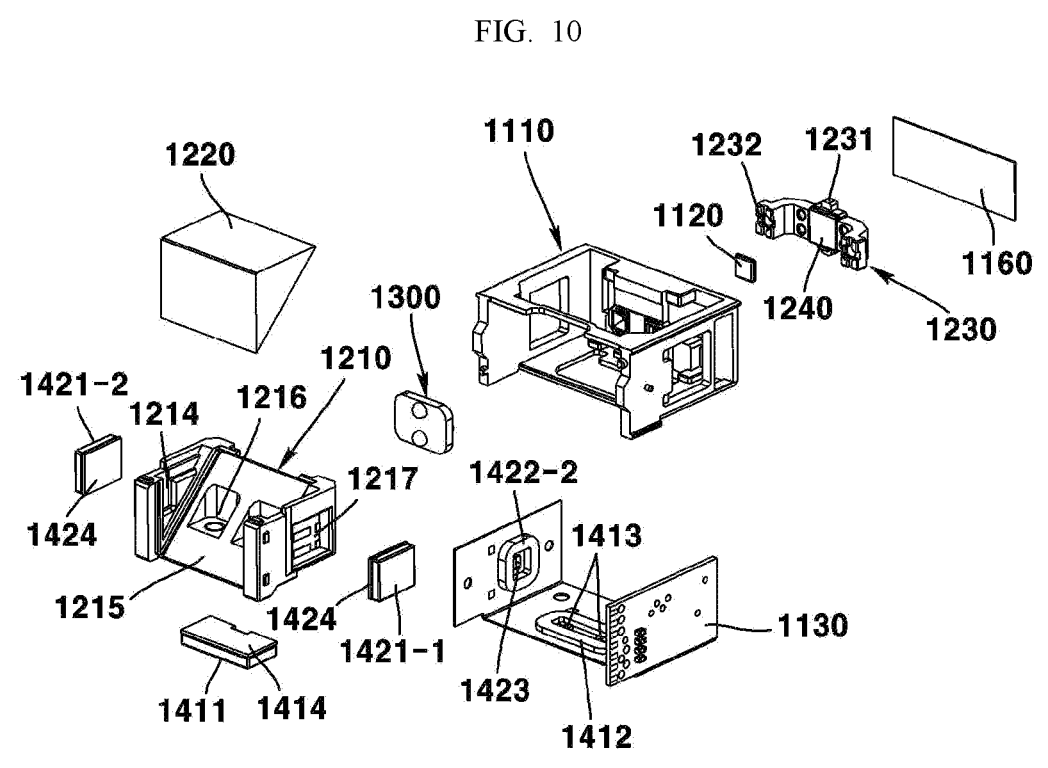

FIG. 10 is an exploded perspective view of a reflective member driving device according to the present embodiment.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a reflective member driving device according to the present embodiment will be described with reference to the drawings.

Figure 9:
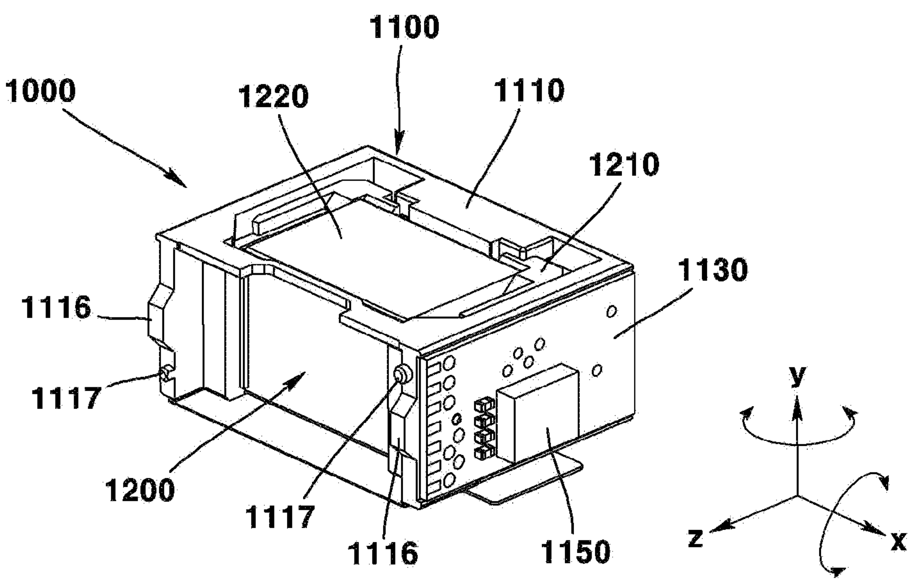
FIG. 9 is a perspective view of a reflective member driving device according to the present embodiment.
Figure 11:
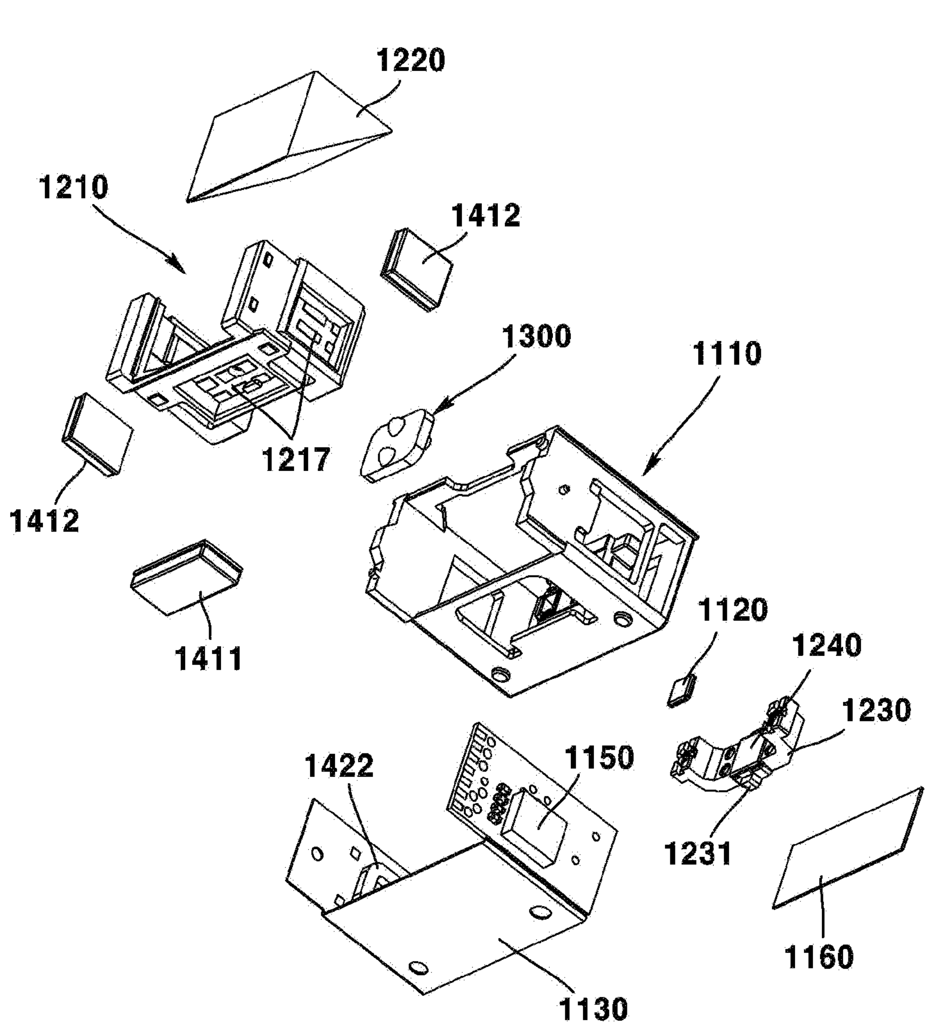
FIG. 11 is a bottom exploded perspective view of a reflective member driving device according to the present embodiment.
Figure 12:
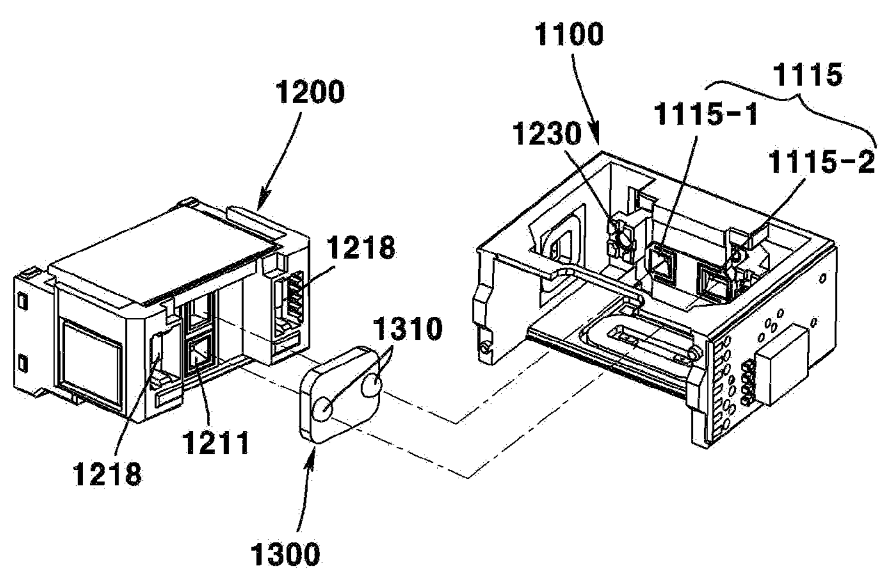
FIGS. 12 and 13 are diagrams for explaining a structure related to a moving plate of a reflective member driving device according to the present embodiment.
Figure 13:
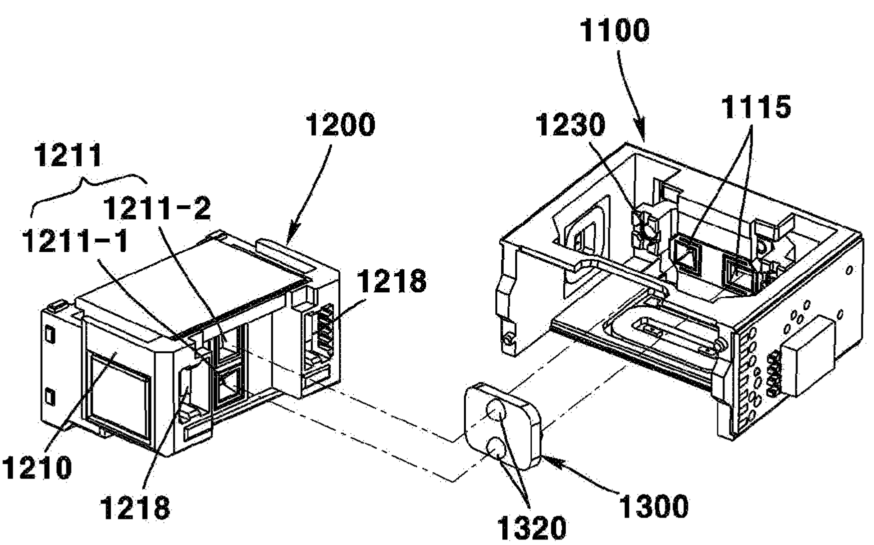
Figure 14:
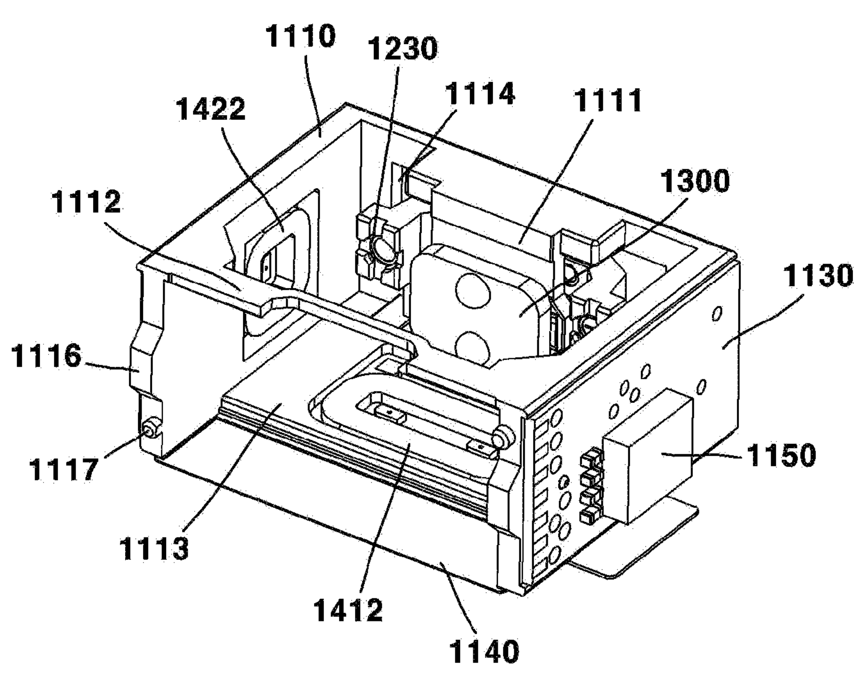
FIG. 14 is a perspective view of a state in which the configuration of a moving part of a reflective member driving device according to the present embodiment is omitted.
Figure 15:
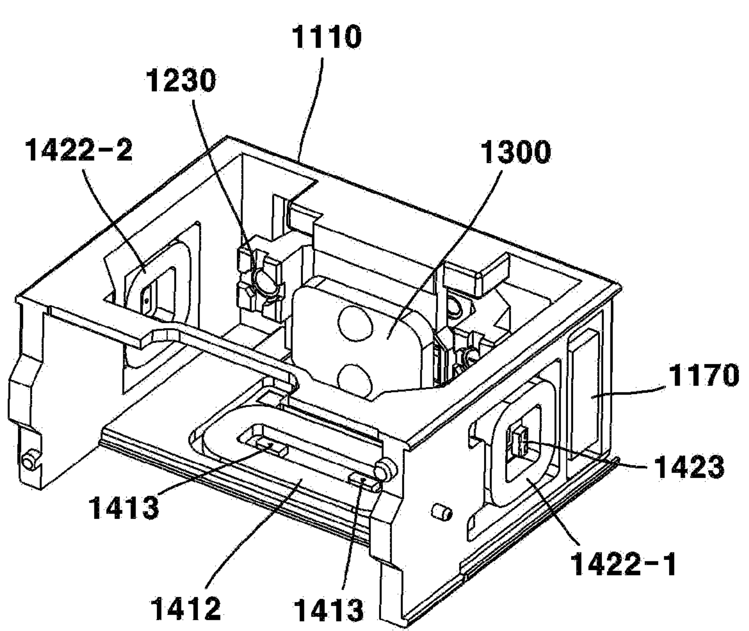
FIG. 15 is a perspective view of the reflective member driving device of FIG. 14 in a state in which components such as a substrate are omitted.
Figure 16:
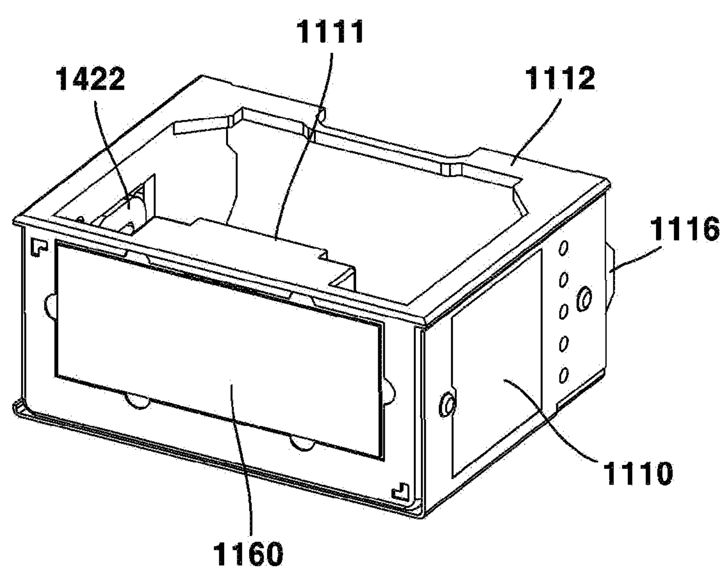
FIG. 16 is a perspective view illustrating a fixed part and related configuration of a reflective member driving device according to the present embodiment.
Figure 17:
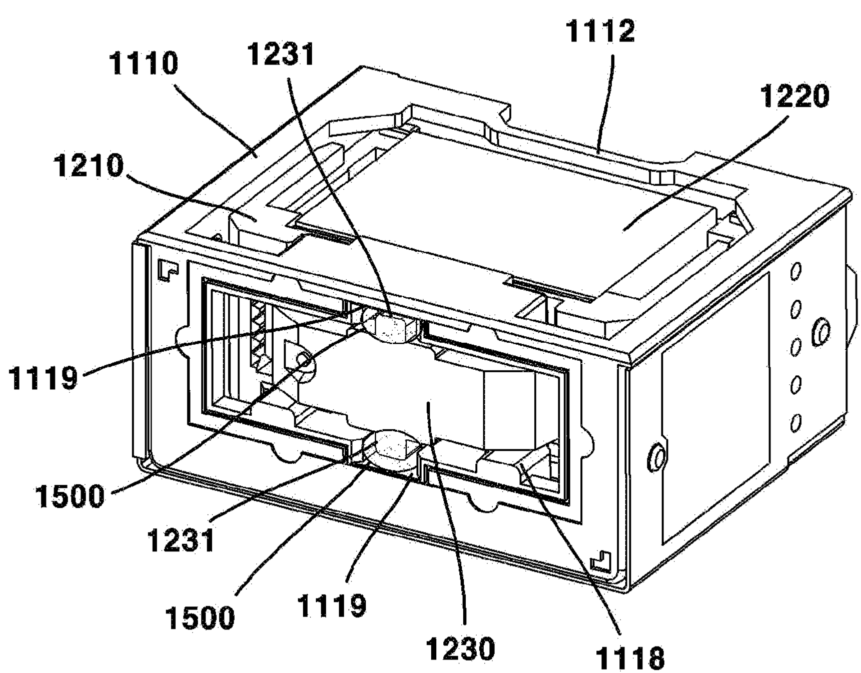
FIG. 17 is a perspective view illustrating a state in which a moving part is disposed in a fixed part in a reflective member driving device according to the present embodiment.
Figure 18:
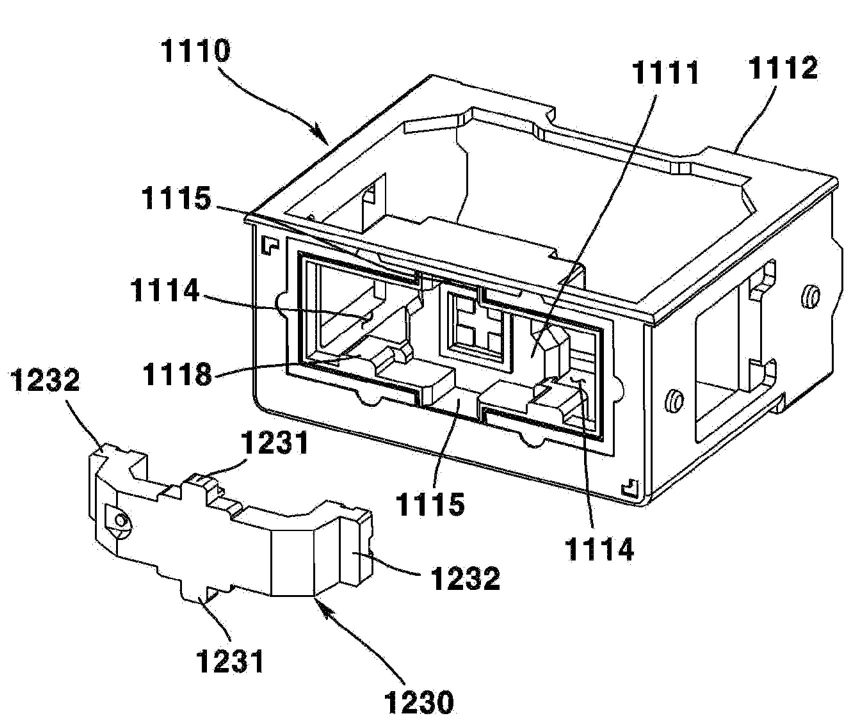
FIG. 18 is an exploded perspective view illustrating the related shapes of a rigid mover and the fixed part of a reflective member driving device according to the present embodiment.
Figure 19:
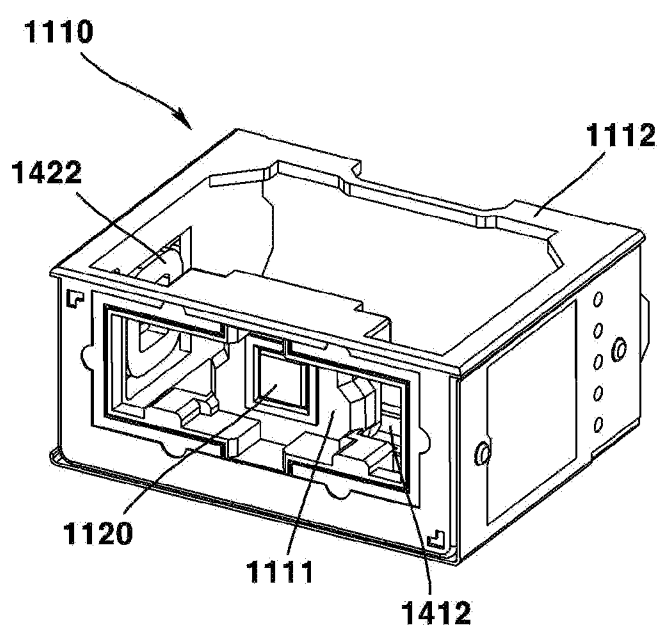
FIG. 19 is a perspective view illustrating an arrangement state of a second magnet of a fixed part of a reflective member driving device according to the present embodiment.
Figure 20:
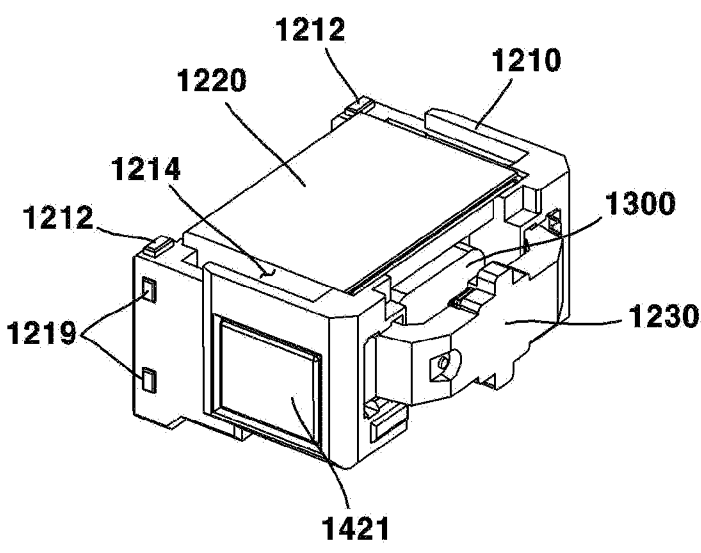
FIG. 20 is a perspective view illustrating a coupling state between a holder of a reflective member driving device and a rigid mover according to the present embodiment.
Figure 21:
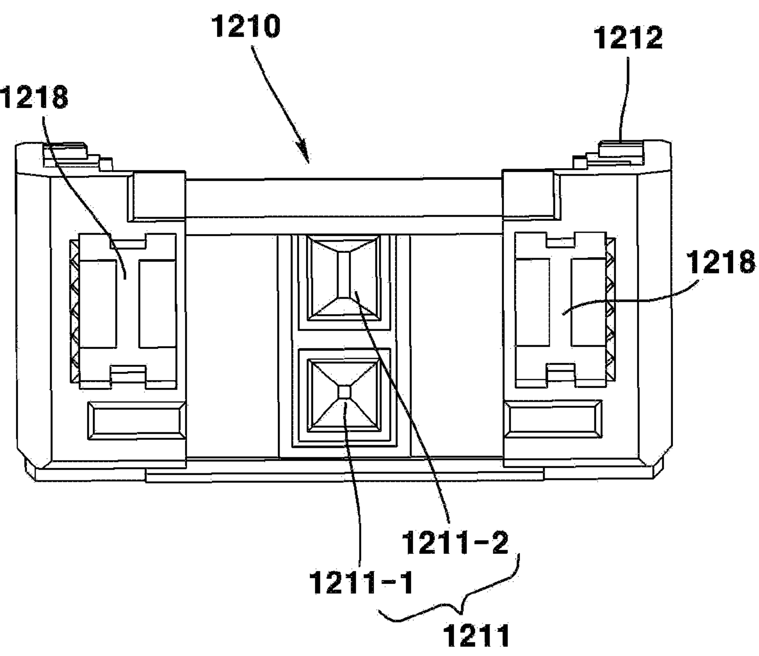
FIG. 21 is a front view illustrating a holder of a reflective member driving device according to the present embodiment.
Figure 22:
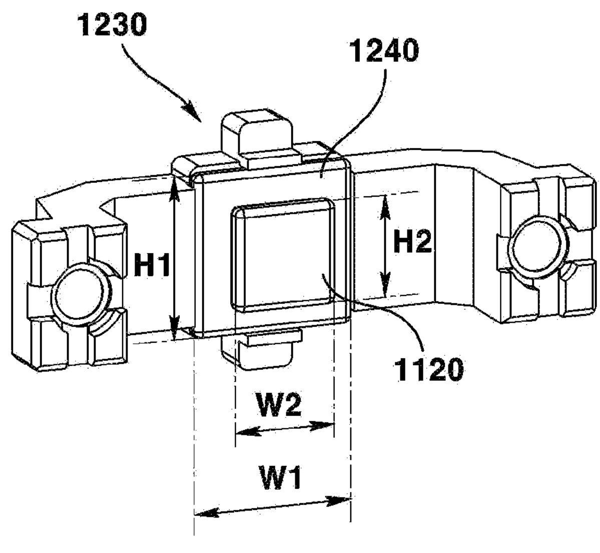
FIG. 22 is a perspective view illustrating a rigid mover, a first magnet, and a second magnet of a reflective member driving device according to the present embodiment.
Figure 23:
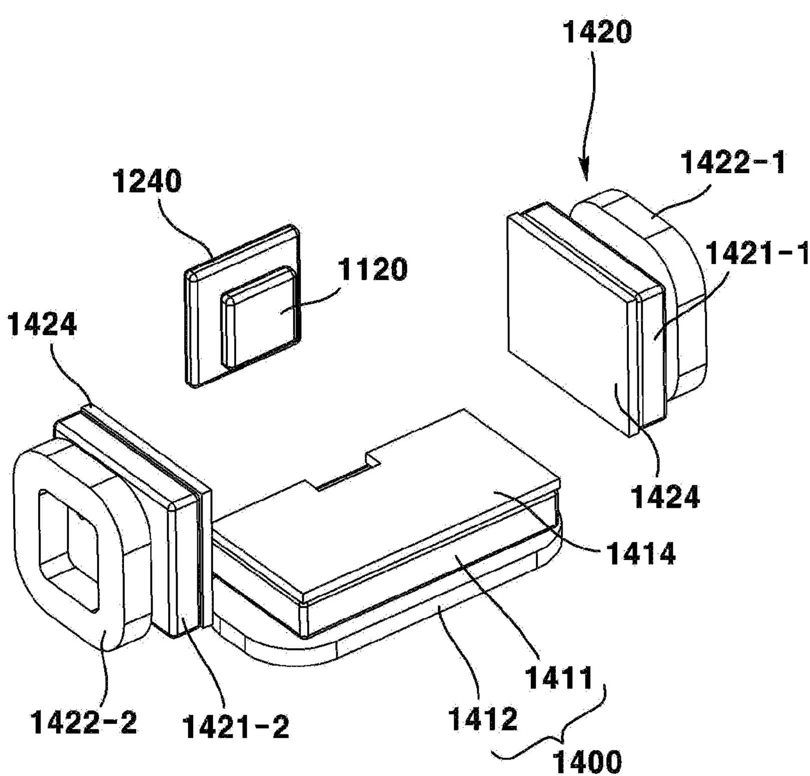
FIG. 23 is a perspective view illustrating a first magnet, a second magnet, and a driving unit of a reflective member driving device according to the present embodiment.
Figure 24:
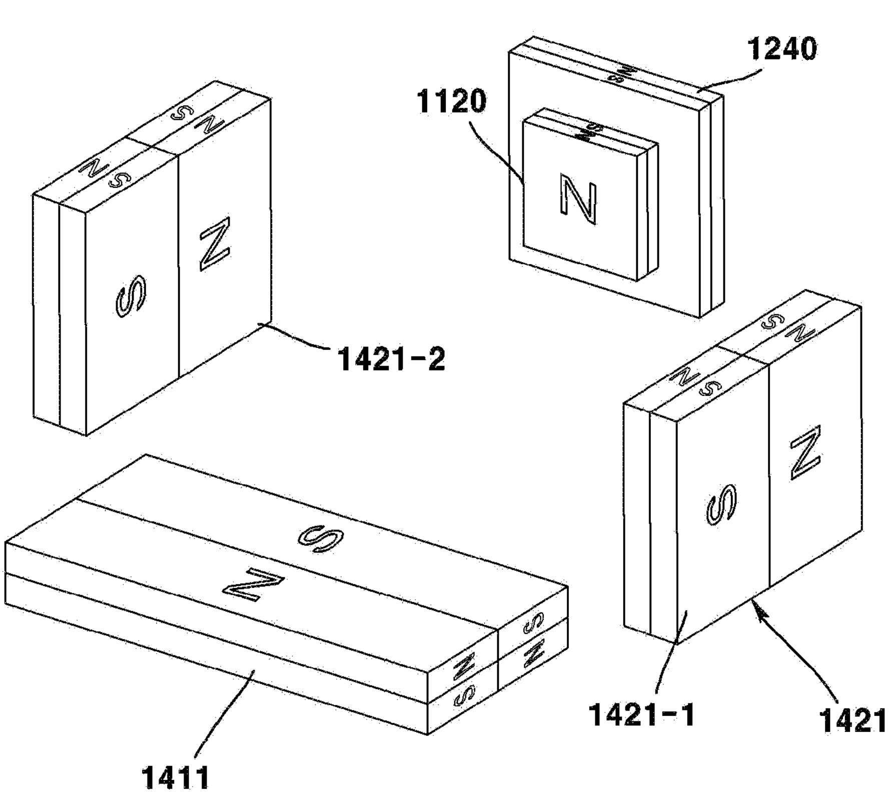
FIG. 24 is a perspective view illustrating a first magnet, a second magnet, and a driving magnet of a reflective member driving device according to the present embodiment.
Figure 25:
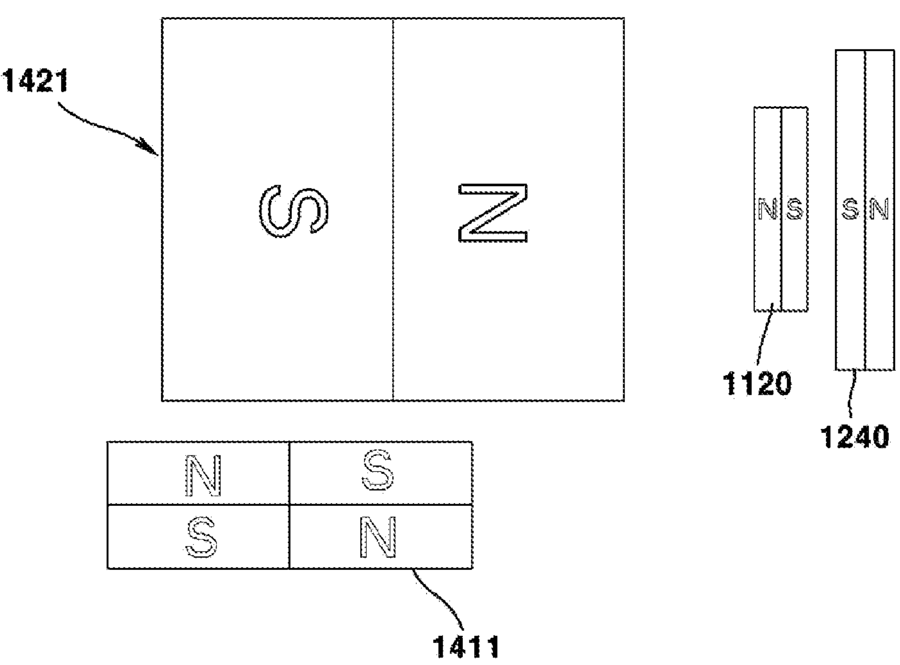
FIG. 25 is a side view illustrating a first magnet, a second magnet, and a driving magnet of a reflective member driving device according to the present embodiment.
Figure 26:
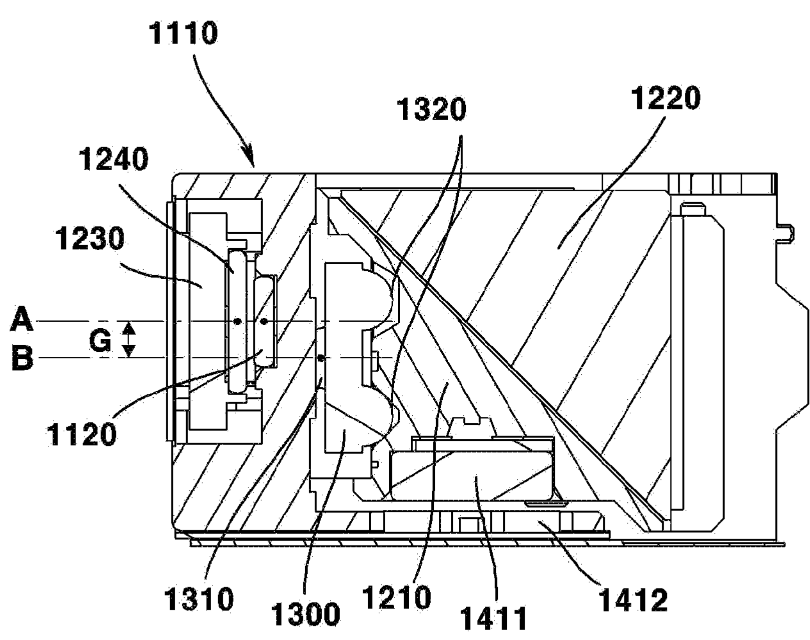
FIG. 26 is a cross-sectional view of a reflective member driving device according to the present embodiment.
Figure 27:
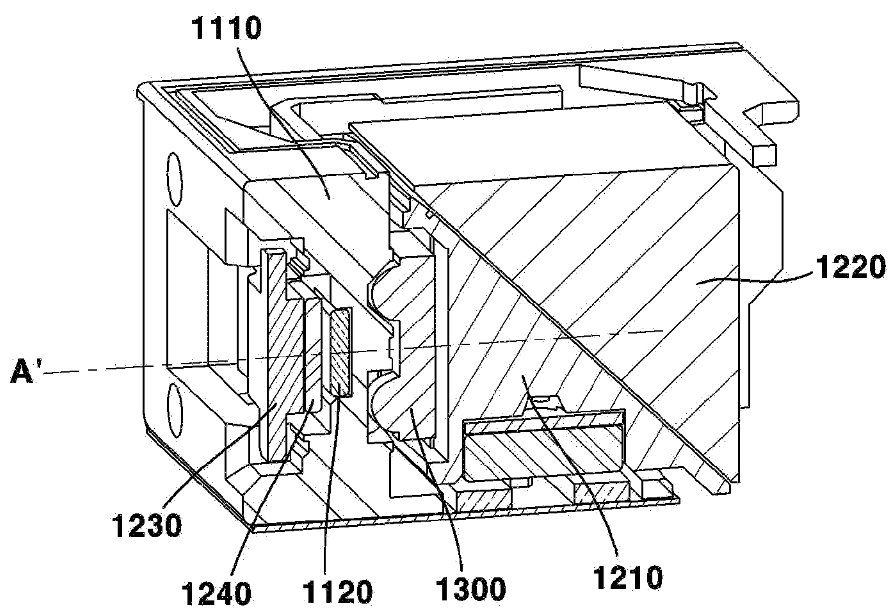
FIG. 27 is a cross-sectional perspective view of a reflective member driving device according to a modified example.
Figure 28:
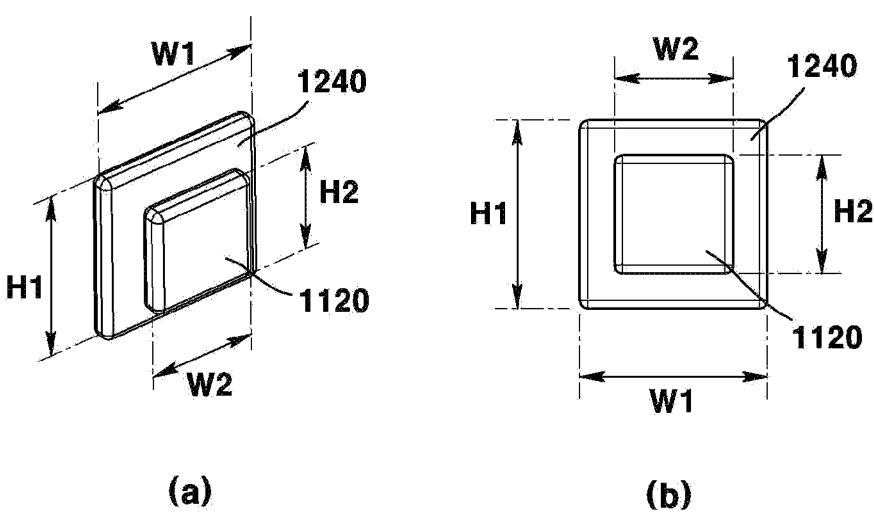
FIG. 28(a) is a perspective view, and (b) is a rear side view illustrating a first magnet and a second magnet of a reflective member driving device according to the present embodiment.
Figure 29:
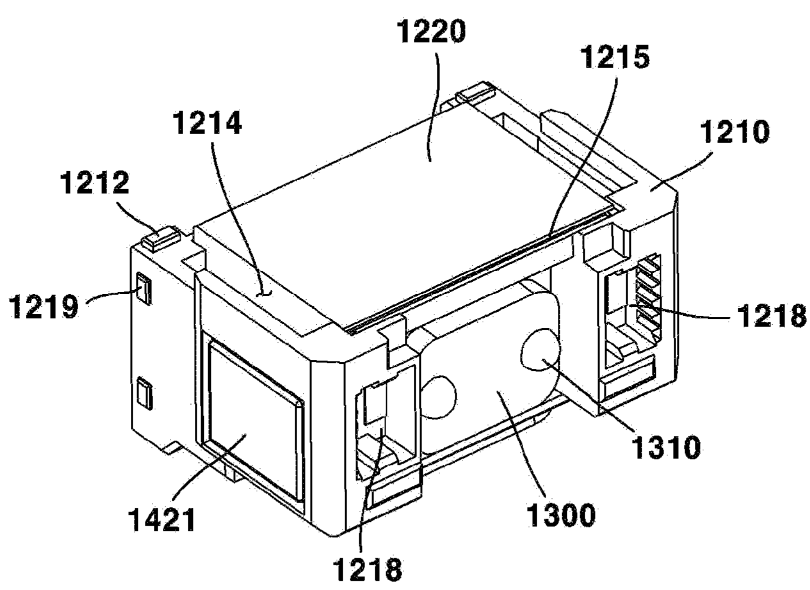
FIG. 29 is a perspective view illustrating a state in which a moving plate is disposed in a moving part of a reflective member driving device according to the present embodiment.

FIG. 9 is a perspective view of a reflective member driving device according to the present embodiment; FIG. 10 is an exploded perspective view of a reflective member driving device according to the present embodiment; FIG. 11 is a bottom exploded perspective view of a reflective member driving device according to the present embodiment; FIGS. 12 and 13 are diagrams for explaining a structure related to a moving plate of a reflective member driving device according to the present embodiment; FIG. 14 is a perspective view of a state in which the configuration of a moving part of a reflective member driving device according to the present embodiment is omitted; FIG. 15 is a perspective view of the reflective member driving device of FIG. 14 in a state in which components such as a substrate are omitted; FIG. 16 is a perspective view illustrating a fixed part and related configuration of a reflective member driving device according to the present embodiment; FIG. 17 is a perspective view illustrating a state in which a moving part is disposed in a fixed part in a reflective member driving device according to the present embodiment; FIG. 18 is an exploded perspective view illustrating the related shapes of a rigid mover and the fixed part of a reflective member driving device according to the present embodiment; FIG. 19 is a perspective view illustrating an arrangement state of a second magnet of a fixed part of a reflective member driving device according to the present embodiment; FIG. 20 is a perspective view illustrating a coupling state between a holder of a reflective member driving device and a rigid mover according to the present embodiment; FIG. 21 is a front view illustrating a holder of a reflective member driving device according to the present embodiment; FIG. 22 is a perspective view illustrating a rigid mover, a first magnet, and a second magnet of a reflective member driving device according to the present embodiment; FIG. 23 is a perspective view illustrating a first magnet, a second magnet, and a driving unit of a reflective member driving device according to the present embodiment; FIG. 24 is a perspective view illustrating a first magnet, a second magnet, and a driving magnet of a reflective member driving device according to the present embodiment; FIG. 25 is a side view illustrating a first magnet, a second magnet, and a driving magnet of a reflective member driving device according to the present embodiment; FIG. 26 is a cross-sectional view of a reflective member driving device according to the present embodiment; FIG. 27 is a cross-sectional perspective view of a reflective member driving device according to a modified example; FIG. 28(a) is a perspective view, and (b) is a rear side view illustrating a first magnet and a second magnet of a reflective member driving device according to the present embodiment; and FIG. 29 is a perspective view illustrating a state in which a moving plate is disposed in a moving part of a reflective member driving device according to the present embodiment.

A reflective member driving device 1000 may perform optical image stabilization (OIS) function. The reflective member driving device 1000 may perform a handshake correction function. The reflective member driving device 1000 may move the reflective member 1220. The reflective member driving device 1000 may tilt the reflective member 1220. The reflective member driving device 1000 may tilt the reflective member 1220 around two axes. The reflective member driving device 1000 may tilt the reflective member 1220 about the x-axis and the y-axis. The x-axis and the y-axis may be perpendicular to each other.

The reflective member driving device 1000 may be a reflective member actuator. The reflective member driving device 1000 may be an OIS actuator. The reflective member driving device 1000 may be an OIS driving device. The reflective member driving device 1000 may be a prism driving device. The reflective member driving device 1000 may be an actuator. The reflective member driving device 1000 may be an actuator device. The reflective member driving device 1000 may be an actuator driving device. The reflective member driving device 1000 may be a tilting device.

The reflective member driving device 1000 may comprise a fixed part 1100. The fixed part 1100 may be a relatively fixed part when the moving part 1200 is moved. The fixed part 1100 may accommodate at least a portion of the moving part 1200. The fixed part 1100 may be disposed outside the moving part 1200.

The reflective member driving device 1000 may comprise a housing 1110. The fixed part 110 may comprise a housing 1110. The housing 1110 may be disposed outside the holder 1210. The housing 1110 may accommodate at least a portion of the holder 1210. The housing 1110 may comprise an opening or a hole in the upper plate and any one of the side plates for securing a path of light. The housing 1110 may comprise an upper plate, a lower plate, and a plurality of side plates.

The housing 1110 may comprise a first portion 1111. The first portion 1111 may be formed on a side plate of the housing 1110. A moving plate 1300 may be disposed on the first portion 1111. The first portion 1111 may be disposed between the holder 1210 and a rigid mover 1230. The first portion 1111 may be disposed between the rigid mover 1230 and the moving plate 1300. A second magnet 1120 may be disposed on the first portion 1111. The moving plate 1300 may be disposed on one side of the first portion 1111 and the second magnet 1120 may be disposed on the other side of the opposite side. A portion of the housing 1110 may be disposed between the moving plate 1300 and the rigid mover 1230.

The housing 1110 may comprise a second portion 1112. The second portion 1112 may be disposed on the holder 1210. The second portion 1112 may be in contact with the holder 1210 when the holder 1210 moves upward. The second portion 1112 may be overlapped with the holder 1210 in the moving direction of the holder 1210. The second portion 1112 may be an upper plate of the housing 1110.

The housing 1110 may comprise a third portion 1113. The third portion 1113 may be disposed below the holder 1210. The third portion 1113 may be in contact with the holder 1210 when the holder 1210 moves downward. The third portion 1113 may be overlapped with the holder 1210 in the moving direction. The third portion 1113 may be a lower plate of the housing 1110.

The housing 1110 may comprise a hole 1114. The hole 1114 may be a rigid mover through hole. The hole 1114 may be formed in the side plate of the housing 1110. The hole 1114 may be formed in the first portion 1111 of the housing 1110. A rigid mover 1230 may be disposed in the hole 1114. The rigid mover 1230 may be disposed to pass through the hole 1114. The hole 1114 may be formed to be larger than the movement space of the rigid mover 1230 so as not to interfere with the rigid mover 1230. The housing 1110 may comprise two holes 1114 into which the rigid mover 1230 is inserted.

The housing 1110 may comprise a groove 1115. The groove 1115 may be an accommodating groove of a first protrusion of the moving plate. A first protrusion 1310 of the moving plate 1300 may be disposed in the groove 1115. The groove 1115 may accommodate at least a portion of the moving plate 1300. The groove 1115 may arrest the movement except for rotation of the first protrusion 1310 of the moving plate 1300. The groove 1115 may comprise an inclined surface being in contact with the first protrusion 1310 of the moving plate 1300. An inclined surface may comprise a plurality of inclined surfaces.

The housing 1110 may comprise a plurality of grooves 1115 in which a plurality of first protrusions 1310 are disposed. The plurality of grooves 1115 of the housing 1110 may comprise: a first groove 1115-1 in contact with a first protrusion 1310 among a plurality of first protrusions 1310 at four point; and a second groove 1115-2 in contact with the first protrusion 1310 of the other one among the plurality of first protrusions 1310 at two points.

The groove 1115 may comprise a first groove 1115-1. The first groove 1115-1 may be a four-point contact groove. The first groove 1115-1 may be in contact with one among the two first protrusions 1310 of the moving plate 1300 at four points. Through this, the first groove 1115-1 of the housing 1110 may arrest the movement in four directions, up, down, left, and right except for rotation of one among the first protrusions 1310 of the moving plate 1300.

The groove 1115 may comprise a second groove 1115-2. The second groove 1115-2 may be a two-point contact groove. The second groove 1115-2 may be in contact with the other one among the two first protrusions 1310 of the moving plate 1300 at two points. Through this, the second groove 1115-2 of the housing 1110 may arrest the movement of the other one among the first protrusions 1310 of the moving plate 1300 in two directions. For example, the second groove 1115-2 of the housing 1110 may arrest the up and down movement of the first protrusion 1310 of the moving plate 1300 and may not arrest the left to right movement.

The housing 1110 may comprise a protruded portion 1116. The protruded portion 1116 may be coupled to the lens driving device 2000. The protruded portion 1116 may be formed on a side plate of the housing 1110. The protruded portion 1116 may be formed on a side of the housing 1110 facing the lens driving device 2000. The protruded portion 1116 may have a trapezoidal cross-section. The protruded portion 1116 may be coupled to the housing 2110 of the lens driving device 2000. The protruded portion 1116 may be inserted into the first groove 2111 of the housing 2110 of the lens driving device 2000. The protruded portion 1116 may be coupled to the housing 2110 of the lens driving device 2000 by an adhesive.

The housing 1110 may comprise a protrusion 1117. The protrusion 1117 may be coupled to the lens driving device 2000. The protrusion 1117 may be formed on the side plate of the housing 1110. The protrusion 1117 may be formed on a side of the housing 1110 facing the lens driving device 2000. The protrusion 1117 may comprise a circular cross-section. The protrusion 1117 may be coupled to the housing 2110 of the lens driving device 2000. The protrusion 1117 may be inserted into the second groove 2112 of the housing 2110 of the lens driving device 2000. The protrusion 1117 may be coupled to the housing 2110 of the lens driving device 2000 by an adhesive.

The housing 1110 may comprise a protrusion 1118. The protrusion 1118 may be a protrusion to be in contact with the rigid mover. A protrusion 1118 may be formed on a second surface of the housing 1110. The protrusion 1118 may be in contact with the rigid mover 1230. The protrusion 1118 may be formed on an inner circumferential surface of the hole 1114 of the housing 1110 through which the rigid mover 1230 passes. The protrusion 1118 may be formed to be in contact with any one or more of the lower surface and the upper surface of the rigid mover 1230 when the rigid mover 1230 is moved. The protrusion 1118 can inhibit the rigid mover 1230 from being separated and removed from the original position excessively.

The protrusion 1118 may comprise a plurality of protrusions. The protrusion 1118 may comprise two protrusions. The two protrusions may be spaced apart by the same distance as the second groove disposed below among the grooves 1119 of the housing 1110. When the body portion of the rigid mover 1230 moves downward, the body portion of the rigid mover 1230 may be in contact with the two protrusions 1118 of the housing 1110.

The housing 1110 may comprise a groove 1119. At least a portion of the protruded portion 1231 may be disposed in the groove 1119. A portion of the protruded portion 1231 may be disposed in the groove 1119. The groove 1119 may be open toward the outside of the housing 1110. The groove 1119 may be larger than the protruded portion 1231 of the rigid mover 1230. The groove 1119 may be spaced apart from the protruded portion 1231 of the rigid mover 1230. In an initial state in which power is not applied to the driving unit 1400, the groove 1119 may be spaced apart from the protruded portion 1231 of the rigid mover 1230. Even when power is applied to the driving unit 1400 to be driven, the groove 1119 may be spaced apart from the protruded portion 1231 of the rigid mover 1230. The groove 1119 of the housing 1110 and the protruded portion 1231 of the rigid mover 1230 may be in contact with each other by an external impact. That is, the groove 1119 of the housing 1110 and the protruded portion 1231 of the rigid mover 1230 do not come into contact within the normal driving range of the rigid mover 1230, and they can be in contact with each other when they are outside the normal driving range due to an impact. The groove 1119 of the housing 1110 and the protruded portion 1231 of the rigid mover 1230 may perform a stopper function upon impact.

The groove 1119 may comprise a first groove portion and a second groove portion recessed from the first groove portion. The groove 1119 may be formed as a two-step groove. The groove 1119 may have a double groove shape. A damper 1500 may be disposed in the second groove portion. A contact area between the damper 1500 and the housing 1110 may be increased by the second groove portion. The second groove portion may inhibit the damper 1500 from flowing.

The groove 1119 may comprise a plurality of grooves. The groove 1119 may comprise a first groove in which at least a portion of the first protruded region of the rigid mover 1230 is disposed, and a second groove in which at least a portion of the second protruded region is disposed. The housing 1110 may comprise a first surface opposite to the upper surface of the body of the rigid mover 1230. The housing 1110 may comprise a second surface facing the lower surface of the body of the rigid mover 1230. The housing 1110 may comprise a first groove formed on the first surface of the housing 1110 and a second groove formed on the second surface of the housing 1110.

The reflective member driving device 1000 may comprise a second magnet 1120. The fixed part 1100 may comprise a second magnet 1120. The second magnet 1120 may be disposed in the fixed part 1100. The second magnet 1120 may be a second repulsive force magnet. The second magnet 1120 may be disposed in the housing 1110. The second magnet 1120 may be disposed on the first portion 1111 of the housing 1110. The second magnet 1120 may be disposed on the opposite side of the moving plate 1300 with respect to the first portion 1111 of the housing 1110. The second magnet 1120 may be disposed between the first magnet 1240 and the moving plate 1300. The second magnet 1120 may be disposed to face the first magnet 1240. The second magnet 1120 may generate a repulsive force with the first magnet 1240. The second magnet 1120 may be disposed to generate a repulsive force with the first magnet 1240. The second magnet 1120 may be disposed to face the same polarity as the first magnet 1240. The second magnet 1120 may push the first magnet 1240 out.

At least a portion of the second magnet 1120 may be disposed between the first magnet 1240 and the moving plate 1300. The second magnet 1120 may be disposed between the first magnet 1240 and the moving plate 1300. The center of the second magnet 1120 may be disposed at the same height as the center of the first magnet 1240.

In the present embodiment, the driving unit 1400 may tilt the moving part 1200 With respect to the x-axis and the y-axis of the moving plate 1300 perpendicular to each other. At this time, in the y-axis direction, a horizontal axis passing through the center of the second magnet 1120 may be disposed to be eccentric with the x-axis of the moving plate 1300. The horizontal axis may be parallel to the x-axis.

In a direction passing through the x-axis, the center of the second magnet 1120 may not be eccentric with the y-axis. When viewed from the moving plate 1300 toward the first magnet 1240, the center of the second magnet 1120 may be disposed to coincide with the y-axis. The center of the second magnet 1120 may be disposed at the same height as the center of the first magnet 1240. The center of the second magnet 1120 may be disposed at the same height as the center of the first magnet 1240. The center of gravity of the second magnet 1120 may be disposed at the same height as the center of gravity of the first magnet 1240.

The second magnet 1120 may comprise a second surface disposed opposite to the first surface of the second magnet 1120. The first magnet 1240 may comprise a first surface facing the second surface of the second magnet 1120. The first surface of the first magnet 1240 may have the same polarity as the second surface of the second magnet 1120.

In a direction in which the first surface of the first driving magnet 1411 faces, the second magnet 1120 may be disposed so as not to be overlapped the first driving magnet 1411. In a direction in which the first surface of the second magnet 1120 faces, the second magnet 1120 may be disposed so as not to be overlapped with the first driving magnet 1411.

The reflective member driving device 1000 may comprise a substrate 1130. The fixed part 1100 may comprise a substrate 1130. The substrate 1130 may be a flexible printed circuit board (FPCB). The substrate 1130 may be a flexible printed circuit board. The substrate 1130 may be disposed in the housing 1110.

The reflective member driving device 1000 may comprise a suspension (SUS) 1140. The fixed part 1100 may comprise a SUS 1140. The suspension 1140 may be disposed on the substrate 1130. The suspension 1140 may be disposed on the outer surface of the substrate 1130. The suspension 1140 may reinforce the strength of the substrate 1130.

The reflective member driving device 1000 may comprise a gyro sensor 1150. The fixed part 1100 may comprise a gyro sensor 1150. The gyro sensor 1150 may detect shaking of the camera device 10. The shake detected by the gyro sensor 1150 may be offset through the hand shake correction function. The gyro sensor 1150 may be disposed on the substrate 1130. The gyro sensor 1150 may be disposed on an outer surface of the substrate 1130.

The reflective member driving device 1000 may comprise a plate 1160. The fixed part 1100 may comprise a plate 1160. The plate 1160 may be coupled to the housing 1110. The plate 1600 may cover up the rigid mover 1230. The plate 1600 may cover the rigid mover 1230. The plate 1160 may be disposed to cover the open portion of the housing 1110. The plate 1160 may be disposed to close the open front of the housing 1110. The plate 1160 may be formed of a metal plate. The housing 1110 may comprise a groove in which an adhesive for fixing the plate 1160 to the housing 1110 is disposed.

The reflective member driving device 1000 may comprise a driver IC 1170. The fixed part 1100 may comprise a driver IC 1170. The driver IC 1170 may be disposed on the substrate 1130. The driver IC 1170 may be electrically connected to the first coil 1412 and the second coil 1422. The driver IC 1170 may supply current to the first coil 1412 and the second coil 1422. The driver IC 1170 may control at least one of a voltage and a current applied to each of the first coil 1412 and the second coil 1422. The driver IC 1170 may be electrically connected to the Hall sensors 1413 and 1423. The driver IC 1170 may feedback-control the voltage and current applied to the first coil 1412 and the second coil 1422 through the position of the reflective member 1220 detected by the Hall sensors 1413 and 1423.

The reflective member driving device 1000 may comprise a moving part 1200. The moving part 1200 may be a moving part. The moving part 1200 may be a movable part. The moving part 1200 may be a mover. The moving part 1200 may move with respect to the fixed part 1100. The moving part 1200 may be tilted with respect to the fixed part 1100. The moving part 1200 may be disposed inside the fixed part 1100. At least a portion of the moving part 1200 may be spaced apart from the fixed part 1100.

In the present embodiment, in an initial state in which no current is applied to the driving unit 1400, the moving part 1200 may be in contact with the fixed part 1100.

The reflective member driving device 1000 may comprise a holder 1210. The moving part 1200 may comprise a holder 1210. The holder 1210 may be disposed in the housing 1110. The holder 1210 is movable with respect to the housing 1110. The holder 1210 may be tilted with respect to the housing 1110. At least a portion of the holder 1210 may be spaced apart from the housing 1110. The holder 1210 may be in contact with the housing 1110.

In the present embodiment, the holder 1210 may move between the second portion 1112 and the third portion 1113 of the housing 1110 by a first driving unit 1410. In an initial state in which no current is applied to the first driving unit 1410, the holder 1210 may be in contact with the housing 1110. In the initial state, the holder 1210 may be in contact with the inner surface of the housing 1110 adjacent to the incident surface of the reflective member 1220. As current is applied to the driving unit 1400, the holder 1210 may be spaced apart from the inner surface of the housing 1110 and may be tilted with respect to the first axis of the moving plate 1300.

The holder 1210 may comprise a groove 1211. The groove 1211 may be an accommodating groove of a second protrusion of the moving plate. A second protrusion 1320 of the moving plate 1300 may be disposed in the groove 1211. The groove 1211 may accommodate at least a portion of the moving plate 1300. The groove 1211 may arrest the movement except for rotation of the second protrusion 1320 of the moving plate 1300. The groove 1211 may comprise an inclined surface being in contact with the second protrusion 1320 of the moving plate 1300. An inclined surface may comprise a plurality of inclined surfaces.

The holder 1210 may comprise a plurality of grooves 1211 in which a plurality of second protrusions 1320 are being disposed. The plurality of grooves 1211 of the holder 1210 comprises a first groove 1211-1 in four-point contact with one of the second protrusions 1320 among the plurality of second protrusions 1320, and a plurality of second protrusions 1320. It may comprise a second groove 1211-2 in two-point contact with the other second protrusion 1320.

The groove 1211 may comprise a first groove 1211-1. The first groove 1211-1 may be a four-point contact groove. The first groove 1211-1 may be in contact with one among the two second protrusions 1320 of the moving plate 1300 at four points. Through this, the first groove 1211-1 of the holder 1210 may arrest the movement in four directions, up, down, left, and right except for rotation of one among the second protrusions 1320 of the moving plate 1300.

The groove 1211 may comprise a second groove 1211-2. The second groove 1211-2 may be a two-point contact groove. The second groove 1211-2 may be in contact with the other one among the two second protrusions 1320 of the moving plate 1300 at two points. Through this, the second groove 1211-2 of the holder 1210 may arrest the movement of the other one among the second protrusions 1320 of the moving plate 1300 in two directions. For example, the second groove 1211-2 of the holder 1210 may arrest the movement in the left and right directions of the second protrusion 1320 of the moving plate 1300 and may not arrest the movement in the up and down direction.

The holder 1210 may comprise a first protrusion 1212. The first protrusion 1212 may be an upper stopper. The first protrusion 1212 may be formed on an upper surface of the holder 1210. The first protrusion 1212 may be protruded from an upper surface of the holder 1210. The first protrusion 1212 may be in contact with the housing 1110 when the holder 1210 moves upward. The first protrusion 1212 may be in contact with the second portion 1112 of the housing 1110 when the holder 1210 moves upward.

The holder 1210 may comprise a second protrusion 1213. The second protrusion 1213 may be a lower stopper. The second protrusion 1213 may be formed on a lower surface of the holder 1210. The second protrusion 1213 may be protruded from a lower surface of the holder 1210. The second protrusion 1213 may be in contact with the housing 1110 when the holder 1210 moves downward. The second protrusion 1213 may be in contact with the third portion 1113 of the housing 1110 when the holder 1210 moves downward.

In the present embodiment, in the initial state, the first protrusion 1212 of the holder 1210 may be in contact with the second portion 1112 of the housing 1110. The second protrusion 1213 of the holder 1210 may come into contact with the third portion 1113 of the housing 1110 by applying a current to the first driving unit 1410 or by impact.

The holder 1210 may comprise an adhesive accommodating groove 1214. The adhesive accommodating groove 1214 may receive an adhesive for fixing the reflective member 1220 to the holder 1210. The adhesive accommodating groove 1214 may be formed on a surface in contact with the reflective member 1220. An adhesive may be disposed in the adhesive accommodating groove 1214.

The holder 1210 may comprise a groove 1215. The groove 1215 may be a separation groove providing a separation space between the groove 1215 and the reflective member 1220. The groove 1215 may be formed on a surface in contact with the reflective member 1220. A contact area between the reflective member 1220 and the holder 1210 may be reduced by the groove 1215.

The holder 1210 may comprise a groove 1216. The groove 1216 may be a slimming groove. The groove 1216 may be formed in a central portion of the holder 1210. The weight of the holder 1210 may be reduced by the groove 1216.

The holder 1210 may comprise a magnet accommodating groove 1217. Driving magnets 1411 and 1421 may be disposed in the magnet accommodating groove 1217. The magnet accommodating groove 1217 may be formed in a shape corresponding to the driving magnets 1411 and 1421. The magnet accommodating groove 1217 may be concavely formed on a lower surface of the holder 1210. The magnet accommodating groove 1217 may be formed on a lower surface and both side surfaces of the holder 1210. The magnet accommodating groove 1217 may comprise a plurality of magnet accommodating grooves. The magnet accommodating groove 1217 may comprise a first magnet accommodating groove accommodating the first driving magnet 1411 and the yoke 1414. The magnet accommodating groove 1217 may comprise a second magnet accommodating groove accommodating the second driving magnet 1421 and the yoke 1424.

The holder 1210 may comprise a groove 1218. The groove 1218 may be a rigid mover accommodating groove. A coupling portion 1232 of the rigid mover 1230 may be disposed in the groove 1218. The groove 1218 may be formed in a shape corresponding to the coupling portion 1232 of the rigid mover 1230. The groove 1218 may comprise a groove in which an adhesive for fixing the coupling portion 1232 of the rigid mover 1230 to the holder 1210 is accommodated. The holder 1210 may comprise a plurality of protrusions formed inside the groove 1218. At least a portion of the coupling portion 1232 of the rigid mover 1230 may be inserted into the groove 1218. The reflective member driving device 1000 may comprise an adhesive for fixing the rigid mover 1230 to the holder 1210. At least a portion of the adhesive may be disposed between the plurality of protrusions formed inside the grooves 1218 of the holder 1210. Through this, the coupling force between the rigid mover 1230 and the holder 1210 may be enhanced.

The holder 1210 may comprise a side stopper 1219. The side stopper 1219 may be formed on both sides of the holder 1210. The side stopper 1219 may be protruded from the side surface of the holder 1210. The side stopper 1219 may be in contact with the housing 1110 when the holder 1210 moves laterally. The side stopper 1219 may be in contact with the side plate of the housing 1110 when the holder 1210 moves laterally.

The reflective member driving device 1000 may comprise a reflective member 1220. The moving part 1200 may comprise a reflective member 1220. The reflective member 1220 may be disposed on the holder 1210. The reflective member 1220 may be disposed inside the holder 1210. The reflective member 1220 may be coupled to the holder 1210. The reflective member 1220 may be fixed to the holder 1210. The reflective member 1220 may be fixed to the holder 1210 by an adhesive. The reflective member 1220 may move integrally with the holder 1210. The reflective member 1220 may change the path of light. The reflective member 1220 may reflect light. The reflective member 1220 may comprise a prism. The reflective member 1220 may comprise a mirror. The reflective member 1220 may be formed in a triangular prism shape. An angle between a path of light incident to the reflective member 1220 and a path of exiting light may be 90 degrees.

The reflective member driving device 1000 may comprise a rigid mover 1230. The moving part 1200 may comprise a rigid mover 1230. The rigid mover 1230 may be coupled to the holder 1210. The rigid mover 1230 may be formed as a member separate from the holder 1210. The rigid mover 1230 may be coupled to the holder 1210 through the hole 1114 of the housing 1110. The rigid mover 1230 may be formed of a non-magnetic metal. A first magnet 1240 and a second magnet 1120 may be disposed between the rigid mover 1230 and the holder 1210. The first magnet 1240 and the second magnet 1120 may be disposed to face the same polarity and may repel each other. The first magnet 1240 fixed to the housing 1110 may push the second magnet 1120 outward. The rigid mover 1230 to which the second magnet 1120 is fixed by the repulsive force of the first magnet 1240 may also be pressed toward the outer side. The holder 1210 to which the rigid mover 1230 is fixed may also be pressed toward the outer side. Through this, the holder 1210 may press the moving plate 1300 against the housing 1110. Through this, the moving plate 1300 may be disposed between the holder 1210 and the housing 1110 without being separated and removed.

The rigid mover 1230 may comprise a protruded portion 1231. The protruded portion 1231 may be extended from the body portion of the rigid mover 1230. The protruded portion 1231 may be coupled to the housing 1110 by the damper 1500. The protruded portion 1231 may be disposed in a central region of the rigid mover 1230. The protruded portion 1231 may be formed in a central region of the rigid mover 1230. The protruded portion 1231 may be protruded from an upper surface of the body portion of the rigid mover 1230. The protruded portion 1231 may in contact with the housing 1110 when the rigid mover 1230 moves.

The protruded portion 1231 may comprise a plurality of protruded portions. The protruded portion 1231 of the rigid mover 1230 may comprise a first protruded portion formed on an upper surface of the body portion of the rigid mover 1230. It may comprise a second protruded portion formed on a lower surface of the body portion of the rigid mover 1230. At least a portion of the first protruded portion of the rigid mover 1230 may be disposed in the first groove of the housing 1110. At least a portion of the second protruded portion of the rigid mover 1230 may be disposed in the second groove of the housing 1110. The protruded portion 1231 may comprise a first protruded region being protruded to one side and a second protruded region being protruded to the other side. Each of the first and second protruded regions may be referred to as a protruded portion.

The rigid mover 1230 may comprise a body portion. The body portion may be disposed at an opposite side of the moving plate 1300 with respect to the first portion 1111 of the housing 1110. The rigid mover 1230 may comprise two coupling portions 1232 protruding from both sides of the body portion. The rigid mover 1230 may comprise two protruded portions 1231 being protruded up and down directions from the body portion.

The rigid mover 1230 may comprise a coupling portion 1232. The coupling portion 1232 may be a leg portion. The coupling portion 1232 may be extended from the body portion of the rigid mover 1230. The coupling portion 1232 may pass through the hole 1114 of the housing 1110. The coupling portion 1232 may be coupled to the holder 1210. The coupling portion 1232 may be fixed to the holder 1210 by an adhesive. At least a portion of the coupling portion 1232 may be inserted into the groove 1218 of the holder 1210.

The reflective member driving device 1000 may comprise a first magnet 1240. The moving part 1200 may comprise a first magnet 1240. The first magnet 1240 may be disposed in the moving part 1200. The first magnet 1240 may be a first repulsive force magnet. The first magnet 1240 may be disposed in the rigid mover 1230. The first magnet 1240 may be disposed in the body portion of the rigid mover 1230. The first magnet 1240 may be disposed to face the second magnet 1120. The first magnet 1240 may be disposed to generate a repulsive force with the second magnet 1120. The first magnet 1240 may be disposed to face the same polarity as the second magnet 1120. The first magnet 1240 may push the second magnet 1120.

In the present embodiment, with respect to the first optical axis, the central axis of the first magnet 1240 may be disposed to be eccentric with the central axis of the moving plate 1300. At this time, the first optical axis may be a z-axis. The first optical axis may be an axis perpendicular to the sensor surface of the image sensor 3400. The first optical axis may be an optical axis of lens groups disposed adjacent to the image sensor 3400.

As illustrated in FIG. 26, the horizontal central axis A of the first magnet 1240 and the second magnet 1120 may be eccentrically placed to have a gap G in the longitudinal direction with the horizontal central axis B of the moving plate 1300.

When viewed from the moving plate 1300 toward the first magnet 1240, the center of the first magnet 1240 may be disposed to be eccentric with the center of the moving plate 1300.

With respect to the facing surface, the horizontal axis passing through the central axis of the first magnet 1240 may be eccentric in the direction of the horizontal axis passing through the central axis of the moving plate 1300 and a second optical axis perpendicular to the first optical axis. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. With respect to the facing surface, the horizontal axis that meets or comes into contact with the central axis of the first magnet 1240 may be eccentric in the direction of the horizontal axis passing through the central axis of the moving plate 1300 and the second optical axis perpendicular to the first optical axis. The center of the first magnet 1240 may be disposed to be eccentric in the longitudinal direction with respect to the center of the moving plate 1300.

With respect to the facing surface, the vertical axis passing through the central axis of the first magnet 1240 may not be eccentric in the direction of the vertical axis and the horizontal axis passing through the central axis of the moving plate 1300. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. The center of the first magnet 1240 may be disposed so as not to be eccentric in the horizontal direction with respect to the center of the moving plate 1300.

With respect to the facing surface, a horizontal line passing through the center of the first magnet 1240 may be eccentric in the vertical direction from a horizontal line passing through the center of the moving plate 1300. With respect to the facing surface, the vertical line passing through the center of the first magnet 1240 may not be eccentric in the horizontal direction from the vertical line passing through the center of the moving plate 1300.

A horizontal axis of the first magnet 1240 may be disposed higher than a horizontal axis of the moving plate 1300. As a modified embodiment, the horizontal axis of the first magnet 1240 may be disposed lower than the horizontal axis of the moving plate 1300.

The first magnet 1240 and the second magnet 1120 may be disposed between the rigid mover 1230 and the moving plate 1300.

The size of the first magnet 1240 may be different from the size of the second magnet 1120. The first magnet 1240 may be formed in a size different from that of the second magnet 1120. The size of the first magnet 1240 may be larger than the size of the second magnet 1120. The first magnet 1240 may be formed to be larger than the second magnet 1120.

The area of the first surface of the first magnet 1240 may be larger than the area of the second surface of the second magnet 1120 facing the first surface. The first surface and the second surface are arbitrarily referred to as one of the two surfaces, and the other may be referred to as the second surface, and both may be referred to as the first surface. The first magnet 1240 may comprise a first surface. The second magnet 1120 may comprise a first surface facing the first surface of the first magnet 1240. The area of the first surface of the first magnet 1240 may be larger than the area of the first surface of the second magnet 1120.

The first surface of the first magnet 1240 may comprise a first side. The first surface of the second magnet 1120 may comprise a first side disposed in a direction corresponding to the first side of the first magnet 1240. The first side of the second magnet 1120 may be 55% to 75% of the first side of the first magnet 1240. The first side of the second magnet 1120 may be 60% to 66% of the first side of the first magnet 1240. The first side of the second magnet 1120 may be 62% to 64% of the first side of the first magnet 1240. The height H1 of the first magnet 1240 may be greater than the height H2 of the second magnet 1120. The width W1 of the first magnet 1240 may be greater than the width W2 of the second magnet 1120.

The area of the first surface of the second magnet 1120 may be 30% to 50% of the area of the first surface of the first magnet 1240. The area of the first surface of the second magnet 1120 may be 35% to 45% of the area of the first surface of the first magnet 1240. The area of the first surface of the second magnet 1120 may be 38% to 42% of the area of the first surface of the first magnet 1240.

The first magnet 1240 and the second magnet 1120 may be formed to have the same thickness. The volume of the second magnet 1120 may be 30% to 50% of the volume of the first magnet 1240.

When viewed from the second magnet 1120 toward the first magnet 1240, an edge region of the second magnet 1120 may be disposed inside the first surface of the first magnet 1240. The edge region may be a corner region. The edge region may be a corner. The first magnet 1240 may be disposed such that all regions of the second magnet 1120 are being overlapped with the first magnet 1240 in a first direction in which the first magnet 1240 faces the second magnet 1120. The first magnet 1240 may be disposed such that all regions of the second magnet 1120 are being overlapped with the first magnet 1240 in a first direction in which the first magnet 1240 faces the second magnet 1120.

As a modified embodiment, the size of the first magnet 1240 may be smaller than the size of the second magnet 1120. The second magnet 1120 may be formed to be larger than the first magnet 1240.

The central axes of the first magnet 1240 and the second magnet 1120 may coincide. However, in actual products, a tolerance of +1% to +2% may occur.

In the present embodiment, the second magnet 1120 may comprise a second surface facing the first surface of the first magnet 1240. At this time, the central axis of the first magnet 1240 may be disposed to be eccentric with the central axis of the moving plate 1300 in a direction perpendicular to the first surface. The area of the first surface of the first magnet 1240 may be larger than the area of the second surface of the second magnet 1120.

In the present embodiment, in an initial state in which no current is applied to the driving unit 1400, the moving part 1200 may be in contact with the fixed part 1100. When viewed from the second magnet 1120 toward the first magnet 1240, an edge of the first magnet 1240 may surround the second magnet 1120. When viewed from the second magnet 1120 toward the first magnet 1240, the second magnet 1120 may be disposed at an inner side of the corner of the first magnet 1240.

The first magnet 1240 may comprise a first surface facing the second magnet 1120 and a second surface opposite to the first surface. The first surface of the first magnet 1240 may comprise a first side and a second side shorter than the first side. The first side of the first magnet 1240 may be formed to be 1 mm to 5 mm. The second side of the first magnet 1240 may be formed to be 0.8 mm to 4 mm. A thickness between the first and second surfaces of the first magnet 1240 may be formed to be 0.1 mm to 0.5 mm.

In the present embodiment, the force Fx formed by the first driving unit 1410 may be within 7 mN. In addition, the force Fy formed by the second driving unit 1420 may be within 7 mN. Or, the force Fx formed by the first driving unit 1410 may be within 3 mN. In addition, the force Fy formed by the second driving unit 1420 may be within 3 mN.

The first surface of the first magnet 1240 may be formed in a square shape. The first surface of the second magnet 1120 may be formed in a square shape. Or, each of the first surface of the first magnet 1240 and the first surface of the second magnet 1120 may be formed in a rectangular shape. The first magnet 1240 may have a square cross-section at least in part. The second magnet 1120 may have a square cross-section at least in part. The first magnet 1240 may be formed to have a rounded edge. The second magnet 1120 may be formed to have a rounded edge.

In a modified embodiment, the first magnet 1240 may have a circular cross section. The first magnet 1240 may be formed in a cylindrical shape. The second magnet 1120 may have a circular cross-section. The second magnet 1120 may be formed in a cylindrical shape. The first magnet 1240 may be formed to have a rounded edge. The first magnet 1240 may be formed to have a curved edge. The first magnet 1240 may be formed so that an edge has a curvature. The first magnet 1240 may be formed to have a C-cut or R-cut edge. The second magnet 1120 may be formed to have a rounded edge. The second magnet 1120 may be formed to have a curved edge. The second magnet 1120 may be formed so that an edge has a curvature. The second magnet 1120 may be formed to have a C-cut or R-cut edge.

The reflective member driving device 1000 may comprise a moving plate 1300. The moving plate 1300 may be an intermediate plate. The moving plate 1300 may be disposed between the housing 1110 and the holder 1210. The moving plate 1300 may be disposed between the rigid mover 1230 and the holder 1210. The moving plate 1300 may be disposed between the first magnet 1240 and the holder 1210. The moving plate 1300 may be placed between the fixed part 1100 and the moving part 1200. The moving plate 1300 may be disposed between the first surface of the second magnet 1120 and the holder 1210. The moving plate 1300 may guide the movement of the holder 1210 against the housing 1110. The moving plate 1300 may provide a tilt center of the holder 1210. That is, the holder 1210 may be tilted around the moving plate 1300. The moving plate 1300 may have one side disposed on the holder 1210 and the other side disposed in the housing 1110. The moving plate 1300 may be in contact with the holder 1210 and the housing 1110.

The moving plate 1300 may comprise a first surface facing the housing 1110 and a second surface facing the holder 1210. The first surface of the moving plate 1300 may comprise a plurality of first protrusions 1310 spaced apart from each other in the direction of the first axis. The second surface of the moving plate 1300 may comprise a plurality of second protrusions 1320 spaced apart from each other in the direction of the second axis.

The moving plate 1300 may comprise a plurality of first convex portions formed on one surface and a plurality of second convex portions formed on the other surface. The first convex portion may be a first protrusion 1310. The second convex portion may be a second protrusion 1320. The x-axis may correspond to a straight line connecting two convex portions among the plurality of first convex portions. The x-axis may coincide with or parallel to a straight line connecting two convex portions among the plurality of first convex portions. The y-axis may correspond to a straight line connecting two convex portions among the plurality of second convex portions. The y-axis may coincide with or parallel to a straight line connecting the two convex portions among the plurality of second convex portions. In a modified embodiment, the first protrusion may be the second protrusion 1320 and the second protrusion may be the first protrusion 1310.

The moving plate 1300 may comprise a first protrusion 1310. The first protrusion 1310 may be disposed in the housing 1110. The first protrusion 1310 may be in contact with the housing 1110. The first protrusion 1310 may be disposed in the groove 1115 of the housing 1110. The first protrusion 1310 may provide a first axis tilt center with respect to the holder 1210. The first protrusion 1310 may provide an x-axis tilt center for the holder 1210. The first protrusion 1310 may comprise two first protrusions. The two first protrusions may be spaced apart from each other in the x-axis direction. The two first protrusions may be disposed on the x-axis. The holder 1210 may be tilted around the first protrusion 1310 of the moving plate 1300 by the first driving unit 1410. The holder 1210 may be tilted up and down about the first protrusion 1310 of the moving plate 1300 by the first driving unit 1410.

A first axis of the moving plate 1300 may be defined by a first protrusion 1310 of the moving plate 1300 and a groove 1115 of the housing 1110. In the present embodiment, by disposing the first protrusion 1310 of the moving plate 1300 in the housing 1110 side rather than the holder 1210 side, the rotation center of the tilt about the first axis can be further away. Through this, the accuracy of the Hall value for detecting the amount of the tilt movement of the first axis may be increased. A mechanical stroke for the x-axis tilt driving can be secured.

The moving plate 1300 may comprise a second protrusion 1320. The second protrusion 1320 may be disposed in the holder 1210. The second protrusion 1320 may be in contact with the holder 1210. The second protrusion 1320 may be disposed in the groove 1211 of the holder 1210. The second protrusion 1320 may provide a second axis tilt center perpendicular to the first axis for the holder 1210. The second protrusion 1320 may provide a y-axis tilt center for the holder 1210. The second protrusion 1320 may comprise two second protrusions. The two second protrusions may be spaced apart from each other in the y-axis direction. The two second protrusions may be disposed on the y-axis. The holder 1210 may be tilted around the second protrusion 1320 of the moving plate 1300 by the second driving unit 1420. The holder 1210 may be tilted in the left and right directions with respect to the second protrusion 1320 of the moving plate 1300 by the second driving unit 1420.

As a modified embodiment, the first protrusion 1310 of the moving plate 1300 provides the y-axis tilt center to the holder 1210, and the second protrusion 1320 of the moving plate 1300 may provide the x-axis tilt center.

The reflective member driving device 1000 may comprise grease. Grease may be disposed between the moving plate 1300 and the housing 1110. The grease may be formed of a material different from that of the damper 1500. The grease may be spaced apart from the damper 1500. Grease may be distinguished from the damper 1500. Grease may be applied in a shape different from that of the damper 1500. Grease may be applied at a different location than the damper 1500.

The reflective member driving device 1000 may comprise a driving unit 1400. The driving unit 1400 may move the moving part 1200 against the fixed part 1100. The driving unit 1400 may tilt the moving part 1200 against the fixed part 1100. The driving unit 1400 may tilt the holder 1210. The driving unit 1400 may tilt the moving part 1200 with respect to the x-axis and the y-axis perpendicular to each other and of the moving plate 1300. The driving unit 1400 may comprise a coil and a magnet. The driving unit 1400 may move the moving part 1200 through electromagnetic interaction. In a modified embodiment, the driving unit 1400 may comprise a shape memory alloy (SMA).

The driving unit 1400 may comprise a first driving unit 1410 and a second driving unit 1420. The first driving unit 1410 may comprise a first driving magnet 1411 and a first coil 1412. It may comprise a second driving unit 1420, a second driving magnet 1421, and a second coil 1422. The first driving magnet 1411 and the first coil 1412 may tilt the holder 1210 about the first axis. The second driving magnet 1421 and the second coil 1422 may tilt the holder 1210 about a second axis perpendicular to the first axis. One of the first driving magnet 1411 and the second driving magnet 1421 may be referred to as a third magnet, and the other may be referred to as a fourth magnet.

The driving unit 1400 may comprise a first driving unit 1410. The first driving unit 1410 may tilt the moving part 1200 against the fixed part 1100 about a first axis. The first driving unit 1410 may tilt the holder 1210 with respect to a first axis of the moving plate 1300. The first driving unit 1410 may tilt the moving part 1200 about the x-axis against the fixed part 1100. The first driving unit 1410 may comprise a coil and a magnet. The first driving unit 1410 may move the moving part 1200 through electromagnetic interaction. As a modified embodiment, the first driving unit 1410 may comprise a shape memory alloy (SMA).

The first driving unit 1410 may comprise a first driving magnet 1411. The first driving magnet 1411 may be disposed in the holder 1210. The first driving magnet 1411 may be disposed on a lower surface of the holder 1210. The first driving magnet 1411 may be fixed to the holder 1210. The first driving magnet 1411 may be fixed to the holder 1210 by an adhesive. The first driving magnet 1411 may be disposed between the holder 1210 and the lower surface of the housing 1110. The first driving magnet 1411 may be disposed between the holder 1210 and the lower plate of the housing 1110. The first driving magnet 1411 may move integrally with the holder 1210. The first driving magnet 1411 may tilt the holder 1210. The first driving magnet 1411 may tilt the holder 1210 against the first axis. The first driving magnet 1411 may be disposed to face the first coil 1412. The first driving magnet 1411 may face the first coil 1412. The first driving magnet 1411 may be disposed at a position corresponding to the first coil 1412. The first driving magnet 1411 may interact with the first coil 1412. The first driving magnet 1411 may electromagnetically interact with the first coil 1412. At least a portion of the first driving magnet 1411 may be disposed in the groove 1217 of the holder 1210.

The first driving magnet 1411 may comprise a first surface in a direction toward the reflective member 1220. The second magnet 1120 may comprise a first surface in a direction toward the reflective member 1220. The first surface of the first driving magnet 1411 may comprise a first region closest to the second magnet 1120. The first region of the first driving magnet 1411 may have a polarity different from that of the first surface of the second magnet 1120. The first surface of the first driving magnet 1411 may comprise a second region having a polarity different from that of the first region. A first region of the first driving magnet 1411 has an S pole and a second region may have an N pole. At this time, the first surface of the second magnet 1120 may have an N pole. As a modified embodiment, the first region of the first driving magnet 1411 has an N pole and the second region may have an S pole.

In the present embodiment, magnetic field interference can be minimized through the arrangement of the magnet polarities of the first driving magnet 1411 and the second magnet 1120.

The first driving magnet 1411 may comprise a second surface opposite to the first surface of the first driving magnet 1411. The second surface of the first driving magnet 1411 may comprise a third region having a polarity different from that of the first region. The second surface of the first driving magnet 1411 may comprise a fourth region having a polarity different from that of the second region. The second surface of the first driving magnet 1411 may face the first coil 1412. The third region has an N pole and the fourth region may have an S pole. As a modified embodiment, the third region has an S pole and the fourth region may have an N pole.

The first driving magnet 1411 may comprise a neutral portion disposed between the first region and the second region. The first driving magnet 1411 may comprise a neutral portion disposed between the third region and the fourth region. The neutral portion may be a portion having a polarity close to neutral.

A region of the first driving magnet 1411 closest to the first surface of the second magnet 1120 may have a polarity for generating an attractive force with the first surface of the second magnet 1120. The first surface of the second magnet 1120 and the first region of the first driving magnet 1411 closest to the first surface of the second magnet 1120 may generate an attractive force to each other.

Each of the second magnet 1120 and the first driving magnet 1411 may comprise a first surface facing the central portion of the moving part 1200. The first surface of the first driving magnet 1411 may comprise a first region and a second region having different polarities. The first surface of the second magnet 1120 may be disposed closer to the first driving magnet 1411 than to the second driving magnet 1421. The first region of the first driving magnet 1411 may be disposed closer to the second magnet 1120 than the second region. A first region of the first driving magnet 1411 may have a polarity different from that of the first surface of the second magnet 1120.

Each of the second magnet 1120 and the first driving magnet 1411 may comprise a first surface facing the central portion of the holder 1210. The first surface of the first driving magnet 1411 and the first surface of the second magnet 1120 may comprise regions having different polarities.

The first driving unit 1410 may comprise a first coil 1412. The first coil 1412 may be disposed on the substrate 1130. The first coil 1412 may be disposed in the housing 1110. The first coil 1412 may be disposed on the substrate 1130 at a position corresponding to the first driving magnet 1411. The first coil 1412 may be disposed below the holder 1210. The first coil 1412 may interact with the first driving magnet 1411. When a current is applied to the first coil 1412, an electromagnetic field is formed around the first coil 1412 to interact with the first driving magnet 1411. The first driving magnet 1411 and the first coil 1412 may tilt the holder 1210 with respect to the first axis. At this time, the first axis may be an x-axis.

In the present embodiment, a first direction driving current may be applied to the first coil 1412 to drive the first coil 1412. At this time, the second direction driving current opposite to the first direction driving current may not be used to drive the first coil 1412. That is, only a current in either one of a reverse direction or a forward direction may be supplied to the first coil 1412.

The reflective member driving device 1000 may comprise a Hall sensor 1413. The Hall sensor 1413 may detect the first driving magnet 1411. The Hall sensor 1413 may detect a magnetic force of the first driving magnet 1411. The Hall sensor 1413 may detect the position of the holder 1210. The Hall sensor 1413 may detect the position of the reflective member 1220. The Hall sensor 1413 may detect a tilt amount centered about the x-axis of the holder 1210.

The reflective member driving device 1000 may comprise a yoke 1414. The yoke 1414 may be disposed between the first driving magnet 1411 and the holder 1210. The yoke 1414 may be formed in a shape corresponding to the first driving magnet 1411. The yoke 1414 may increase the interaction force between the first driving magnet 1411 and the first coil 1412.

The driving unit 1400 may comprise a second driving unit 1420. The second driving unit 1420 may tilt the moving part 1200 about the second axis against the fixed part 1100. The second driving unit 1420 may tilt the holder 1210 with respect to a second axis perpendicular to the first axis of the moving plate 1300. The second driving unit 1420 may tilt the moving part 1200 centered about the y-axis against the fixed part 1100. The second driving unit 1420 may comprise a coil and a magnet. The second driving unit 1420 may move the moving part 1200 through electromagnetic interaction. As a modified embodiment, the second driving unit 1420 may comprise shape memory alloy (SMA).

The second driving unit 1420 may comprise a second driving magnet 1421. The second driving magnet 1421 may be disposed in the holder 1210. The second driving magnet 1421 may be disposed on both side surfaces of the holder 1210. The second driving magnet 1421 may be fixed to the holder 1210. The second driving magnet 1421 may be fixed to the holder 1210 by an adhesive. The second driving magnet 1421 may be disposed between the holder 1210 and a side surface of the housing 1110. The second driving magnet 1421 may be disposed between the holder 1210 and a side plate of the housing 1110. The second driving magnet 1421 may move integrally with the holder 1210. The second driving magnet 1421 may tilt the holder 1210. The second driving magnet 1421 may tilt the holder 1210 with respect to a second axis perpendicular to the first axis. The second driving magnet 1421 may be disposed to face the second coil 1422. The second driving magnet 1421 may face the second coil 1422. The second driving magnet 1421 may be disposed at a position corresponding to the second coil 1422. The second driving magnet 1421 may interact with the second coil 1422. The second driving magnet 1421 may electromagnetically interact with the second coil 1422.

The second driving magnet 1421 may comprise a first sub-magnet 1421-1. The first sub-magnet 1421-1 may be disposed on one side of the holder 1210. The first sub-magnet 1421-1 may be disposed to face a first sub-coil 1422-1. The first sub-magnet 1421-1 may face the first sub-coil 1422-1. The first sub-magnet 1421-1 may be disposed at a position corresponding to the first sub-coil 1422-1. The first sub-magnet 1421-1 may interact with the first sub-coil 1422-1. The first sub-magnet 1421-1 may electromagnetically interact with the first sub-coil 1422-1.

The second driving magnet 1421 may comprise a second sub-magnet 1421-2. The second sub magnet 1421-2 may be disposed on the other side of the holder 1210. The second sub-magnet 1421-2 may be disposed at an opposite side of the first sub-magnet 1421-1. The second sub-magnet 1421-2 may have the same size and shape as the first sub-magnet 1421-1. The second sub magnet 1421-2 may be disposed to face the second sub coil 1422-2. The second sub magnet 1421-2 may face the second sub coil 1422-2. The second sub magnet 1421-2 may be disposed at a position corresponding to the second sub coil 1422-2. The second sub magnet 1421-2 may interact with the second sub coil 1422-2. The second sub magnet 1421-2 may electromagnetically interact with the second sub coil 1422-2.

The second driving unit 1420 may comprise a second coil 1422. The second coil 1422 may be disposed on the substrate 1130. The second coil 1422 may be disposed in the housing 1110. The second coil 1422 may be disposed on the second portion of the substrate 1130. The second coil 1422 may be disposed on both side surfaces of the holder 1210. When a current is applied to the second coil 1422, an electromagnetic field is formed around the second coil 1422 to interact with the second driving magnet 1421. The second coil 1422 may comprise two sub-coils 1421-1 and 1421-2 disposed opposite to each other with respect to the holder 1210. The two sub-coils 1421-1 and 1421-2 may be electrically connected to each other. The second driving magnet 1421 and the second coil 1422 may tilt the holder 1210 with respect to a second axis perpendicular to the first axis. At this time, the second axis may be a y-axis. The first axis may be an x-axis, and the z-axis may be an optical axis of the image sensor 3400.

The second coil 1422 may comprise a first sub-coil 1422-1. The first sub coil 1422-1 may be disposed on the substrate 1130. The first sub coil 1422-1 may be disposed in the housing 1110. The first sub-coil 1422-1 may be disposed on the second portion of the substrate 1130. The first sub-coil 1422-1 may be disposed on the side of the holder 1210. When a current is applied to the first sub-coil 1422-1, an electromagnetic field is formed around the first sub-coil 1422-1 to interact with the first sub-magnet 1421-1.

The second coil 1422 may comprise a second sub-coil 1422-2. The second sub coil 1422-2 may be disposed on the substrate 1130. The second sub coil 1422-2 may be disposed in the housing 1110. The second sub-coil 1422-2 may be disposed on the second portion of the substrate 1130. The second sub coil 1422-2 may be disposed on the side of the holder 1210. When a current is applied to the second sub coil 1422-2, an electromagnetic field is formed around the second sub coil 1422-2 to interact with the second sub magnet 1421-2.

The second driving magnet 1421 may comprise a first sub-magnet 1421-1 disposed on a first side surface of the holder 1210 and a second sub-magnet 1421-2 disposed on a second side surface of the holder 1210. The second coil 1422 may comprise a first sub-coil 1422-1 disposed on the substrate and disposed at a position corresponding to the first sub-magnet 1421-1, and a second sub-coil 1422-2 disposed on the substrate and disposed at a position corresponding to the second sub-magnet 1421-2.

The reflective member driving device 1000 may comprise a Hall sensor 1423. The Hall sensor 1423 may detect the second driving magnet 1421. The Hall sensor 1423 may detect a magnetic force of the second driving magnet 1421. The Hall sensor 1423 may detect the position of the holder 1210. The Hall sensor 1423 may detect the position of the reflective member 1220. The Hall sensor 1423 may detect a tilt amount centered about the y-axis of the holder 1210.

The reflective member driving device 1000 may comprise a yoke 1424. The yoke 1424 may be disposed between the second driving magnet 1421 and the holder 1210. The yoke 1424 may be formed to have a shape corresponding to that of the second driving magnet 1421. The yoke 1424 may increase the interaction force between the second driving magnet 1421 and the second coil 1422.

The reflective member driving device 1000 may comprise a damper 1500. The damper 1500 may comprise an adhesive material. The damper 1500 may have viscosity. The damper 1500 may be disposed between the fixed part 1100 and the moving part 1200. The damper 1500 may be disposed between the rigid mover 1230 and the housing 1110. The damper 1500 may connect the rigid mover 1230 and the housing 1110. The damper 1500 may be coupled to the rigid mover 1230 and the housing 1110. The damper 1500 may be disposed in the rigid mover 1230. The damper 1500 may be coupled with the rigid mover 1230. The damper 1500 may be coupled to the rigid mover 1230. The rigid mover 1230 may be coupled to the housing 1110. The housing 1110 and the rigid mover 1230 may be attached to each other by the damper 1500.

The damper 1500 may be disposed on at least one among an upper portion and a lower portion of the first portion 1111 of the housing 1110. The damper 1500 may connect the protruded portion 1231 of the rigid mover 1230 and the housing 1110. At least a portion of the damper 1500 may be disposed in the groove 1119 of the housing 1110 between the protruded portion 1231 of the rigid mover 1230 and the housing 1110. At least a portion of the damper 1500 may be disposed in a second groove being recessed from the first groove portion of the housing 1110.

In the present embodiment, a bond of a gel component that acts as a damper between the housing 1110 and the rigid mover 1230 may be applied. Through this, it is possible to increase the responsiveness of the actuator by securing a phase margin while maintaining a gain value. That is, FRA characteristics may be improved. In particular, a response characteristic of a tilt centered about the x-axis may be improved. The tilt centered about the y-axis (yaw) can also be enhanced.

Figure 30:
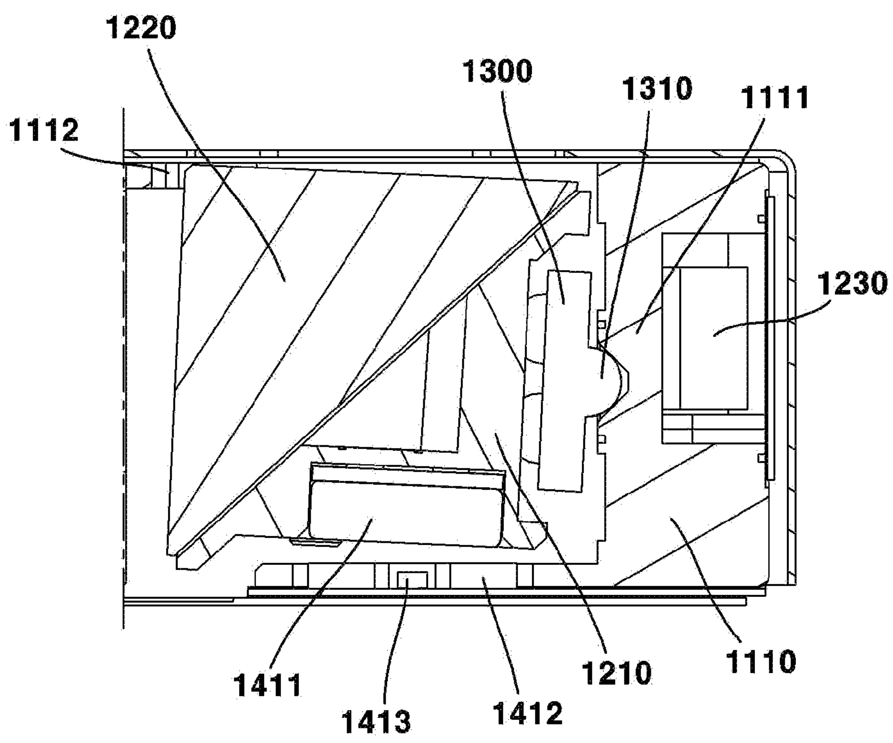
FIGS. 30 and 31 are diagrams for explaining the tilt about the x-axis of a reflective member driving device according to the present embodiment.
Figure 31:
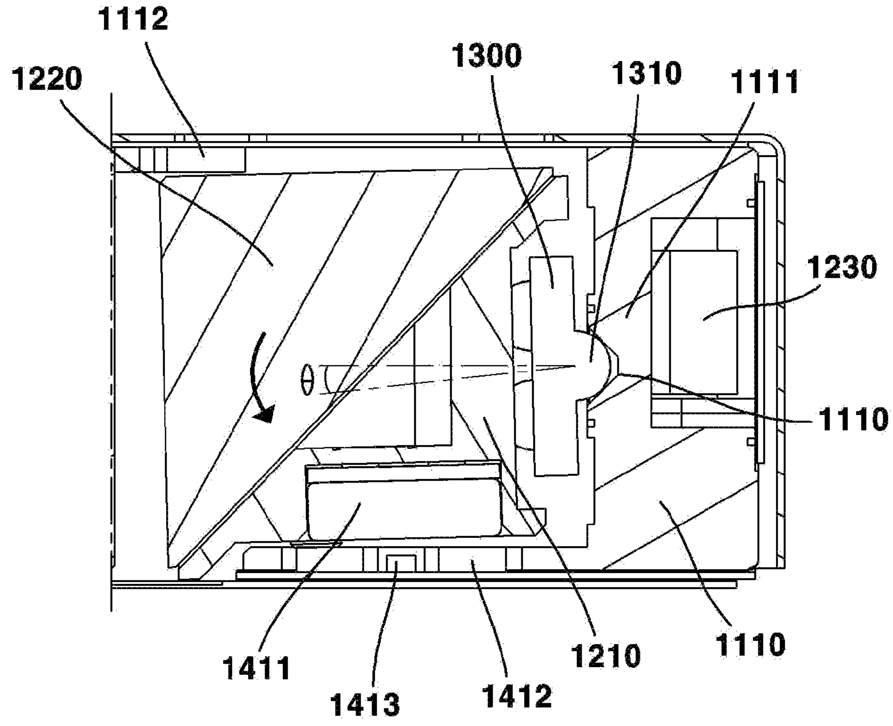

FIGS. 30 and 31 are diagrams for explaining the tilt about the x-axis of a reflective member driving device according to the present embodiment.

In the present embodiment, the holder 1210 may be disposed between the upper plate and the lower plate of the housing 1110 in an initial state in which current is not supplied to the first driving unit 1410. At this time, the holder 1210 may be in contact with the upper plate of the housing 1110 (refer to FIG. 30).

At this time, when a current in the first direction is applied to the first coil 1412, the holder 1210 may be tilted downward centered about the first protrusion 1310 of the moving plate 1300 by the electromagnetic interaction between the first coil 1412 and the first driving magnet 1411 (refer to θ of FIG. 31).

That is, current is applied to the first coil 1412 so that the holder 1210 may be tilted downward against the housing 1110 centered about the x-axis. At this time, since the reflective member 1220 is also tilted together with the holder 1210, the optical path is changed, so that the shaking detected by the gyro sensor 1150 can be offset.

In the present embodiment, only the current in the first direction may be used for controlling the first coil 1412 and the current in the first direction opposite to the first direction may not be used. Through this, the detachment and removal problem of the moving plate 1300 that may occur when the current in the second direction is applied to the first coil 1412 can be fundamentally blocked.

In more detail, as a comparative example, when the centers of the first magnet 1240 and the second magnet 1120 are disposed at the same height as the first protrusion 1310 of the moving plate 1300, the moving part 1200 is slid by the electromagnetic force and the moving plate 1300 may be separated and removed when the repulsive force between the first magnet 1240 and the second magnet 1120 and the electromagnetic force between the first coil 1412 and the first driving magnet 1411 are non-uniform. When the electromagnetic force between the first coil 1412 and the first driving magnet 1411 is greater than the repulsive force between the first magnet 1240 and the second magnet 1120, a phenomenon in that the rigid mover 1230 falls out as much as the gap between the first magnet 1240 and the second magnet 1120 occurs and the moving plate 1300 may be separated. This may be a cause of poor Hall calibration dynamic characteristics.

In the present embodiment, the center axis of the repulsive force and the center axis of the x-axis driving force may deviate by a certain distance. Through this, the reflective member 1220 may be mechanically shifted in an upward direction. At this time, the upward direction may be a direction opposite to gravity.

In the present embodiment, it can be controlled by code rather than current control. In the pivot structure like the present embodiment, it is difficult to know the initial position in the open state for reasons such as deflection due to gravity, so the closed method (a method in which the moving part 1200 is in contact with the fixed part 1100 in the initial state) may be required. In the present embodiment, since it is controlled by a closed method, more precise driving can be performed. Furthermore, in the present embodiment, the noise generated by the moving part 1200 moving here and there can also be minimized by the closed method.

Figure 32:
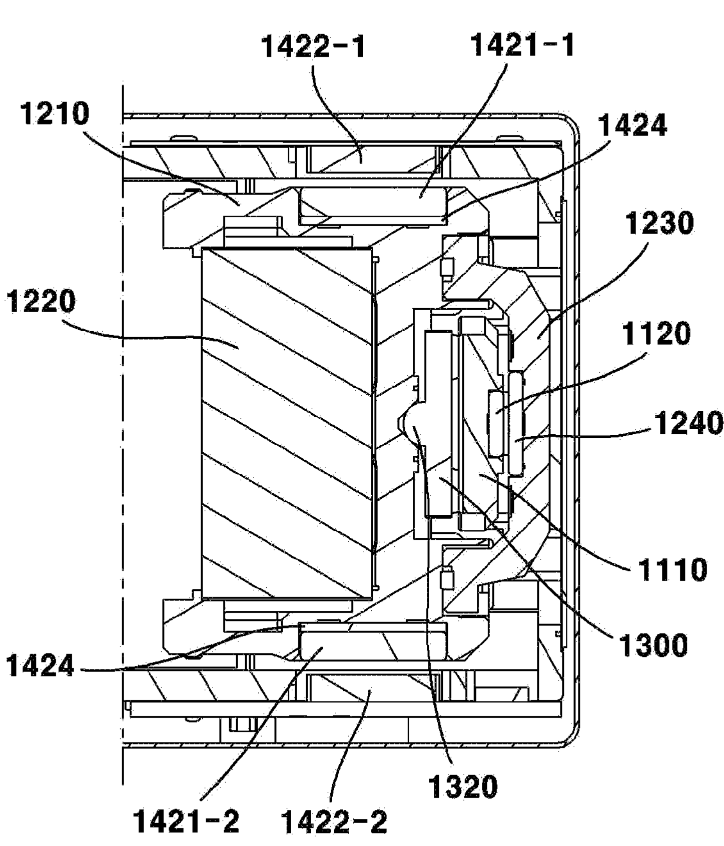
FIGS. 32 to 34 are views for explaining a tilt about the y-axis of a reflective member driving device according to the present embodiment.
Figure 33:
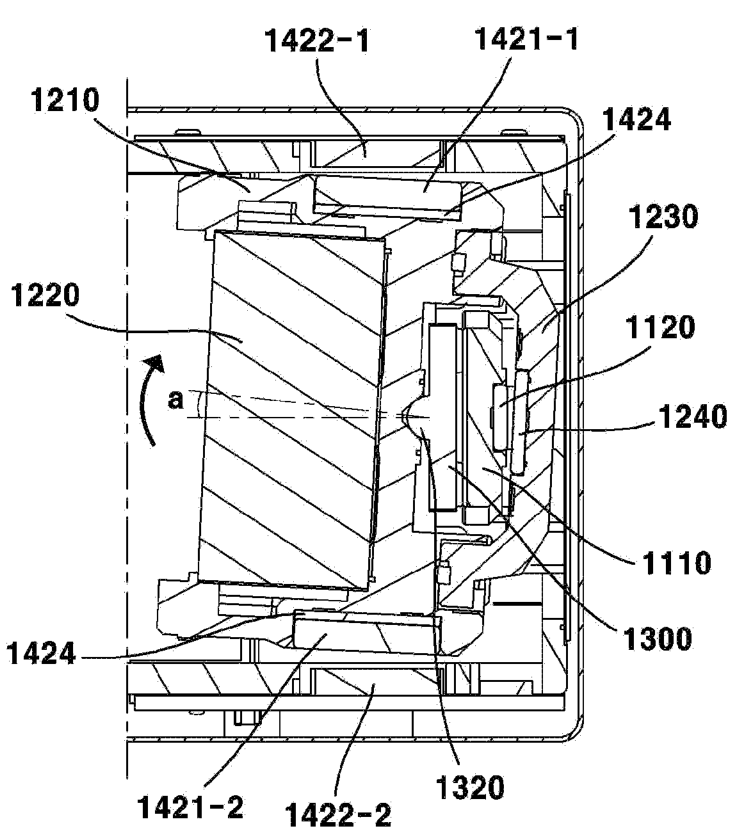
Figure 34:
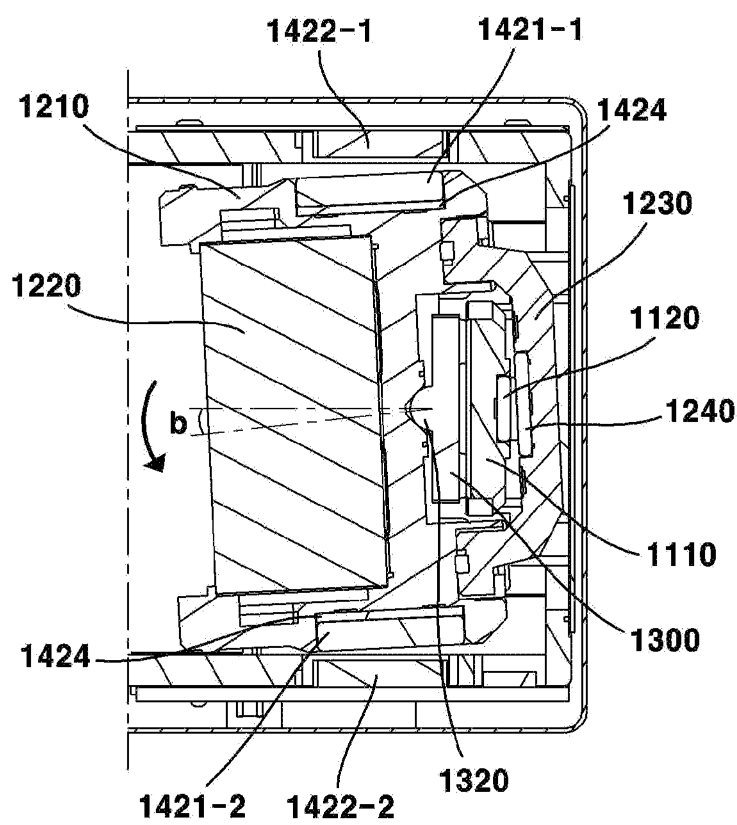

FIGS. 32 to 34 are views for explaining a tilt about the y-axis of a reflective member driving device according to the present embodiment.

In the present embodiment, in an initial state in which current is not supplied to the second driving unit 1420, the holder 1210 may be disposed between the both side plates of the housing 1110. At this time, the holder 1210 may be in a state of being spaced apart from all of the both side plates of the housing 1110 (refer to FIG. 32).

At this time, when a current in the first direction is applied to the second coil 1422, the holder 1210 may be tilted to one side centered about the second protrusion 1320 of the moving plate 1300 due to the electromagnetic interaction between the second coil 1422 and the second driving magnet 1421 (refer to a of FIG. 33).

Meanwhile, when a current in a second direction opposite to the first direction is applied to the second coil 1422, the holder 1210 may be tilted to the other side centered about the second protrusion 1320 of the moving plate 1300 due to the electromagnetic interaction between the second coil 1422 and the second driving magnet 1421 (refer to b of FIG. 34).

That is, current is selectively applied to the second coil 1422 in both directions so that the holder 1210 can be tilted in the left and right directions against the housing 1110 centered about the y-axis. At this time, since the reflective member 1220 is also tilted together with the holder 1210, the optical path is changed, so that the shaking detected by the gyro sensor 1150 may be offset. Therefore, in the present embodiment, hand shake correction for the x-axis tilting and the y-axis tilting, that is, the 2-axis tilting can be performed.

Hereinafter, a lens driving device according to the present embodiment will be described with reference to the drawings.

Figure 35:
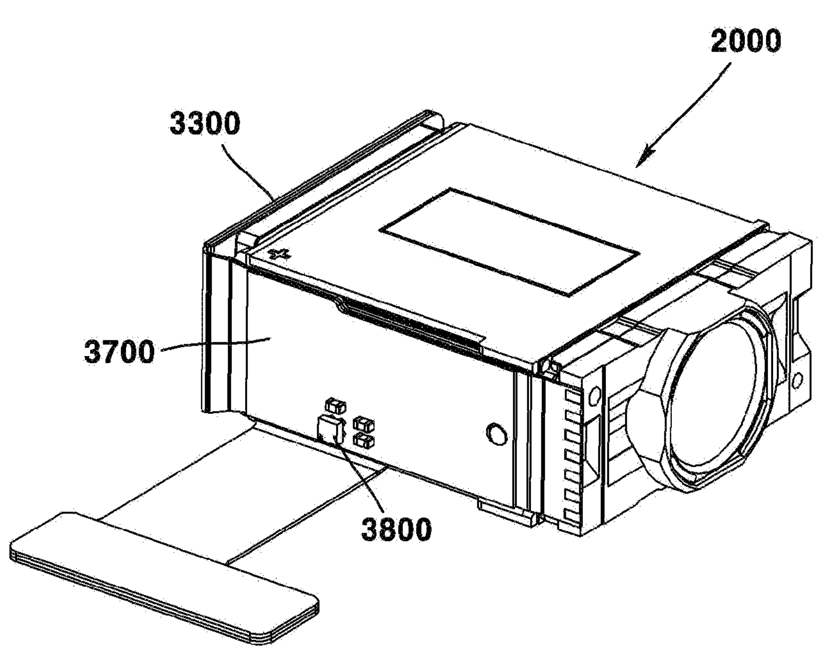
FIG. 35 is a perspective view of a lens driving device according to the present embodiment.
Figure 36:
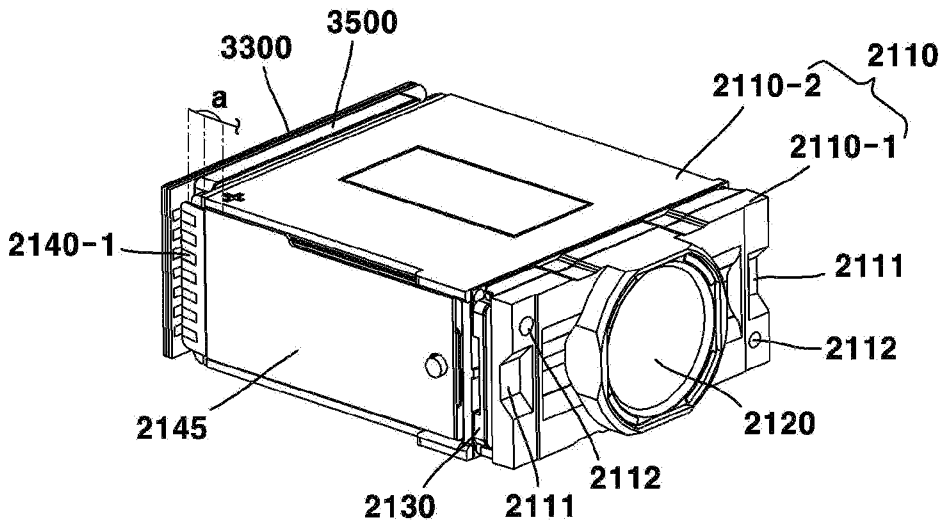
FIG. 36 is a perspective view in which some configurations of a lens driving device according to the present embodiment are omitted.
Figure 37:
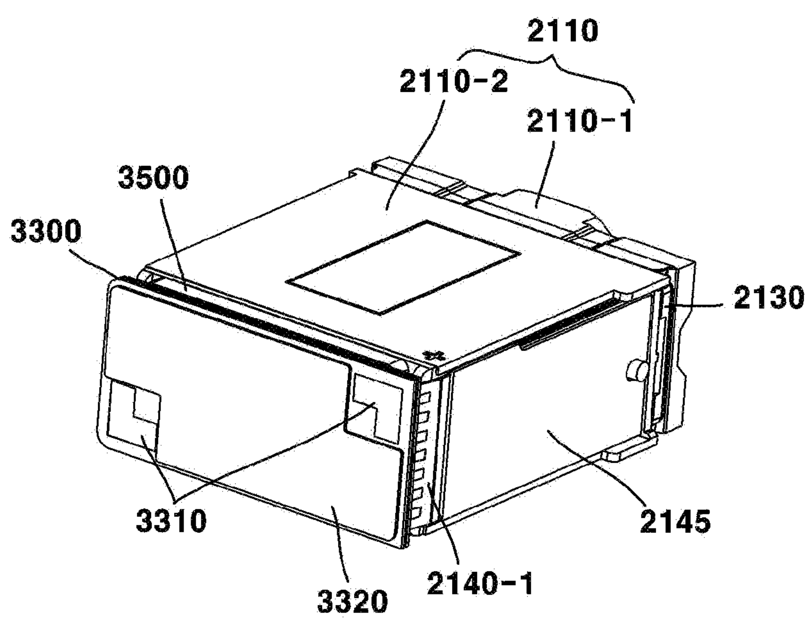
FIG. 37 is a perspective view of a lens driving device in the state illustrated in FIG. 36 as viewed from another direction.
Figure 38:
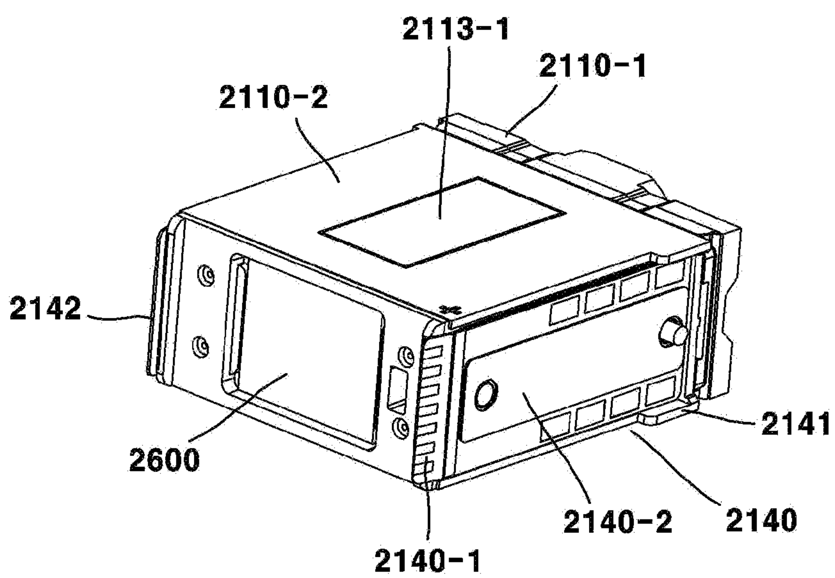
FIG. 38 is a perspective view in which some configurations of a lens driving device according to the present embodiment are omitted.
Figure 39:
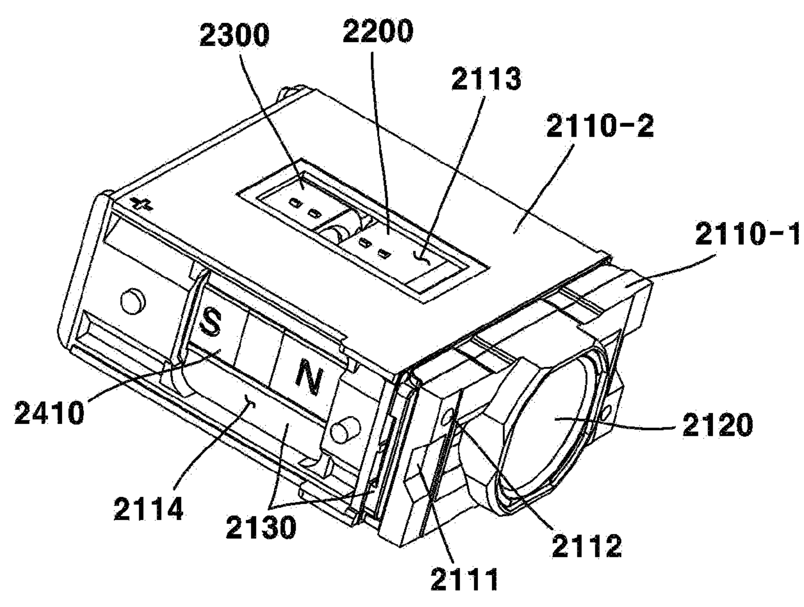
FIG. 39 is a perspective view of a state in which configurations such as a substrate and a coil are omitted in a lens driving device according to the present embodiment.
Figure 40:
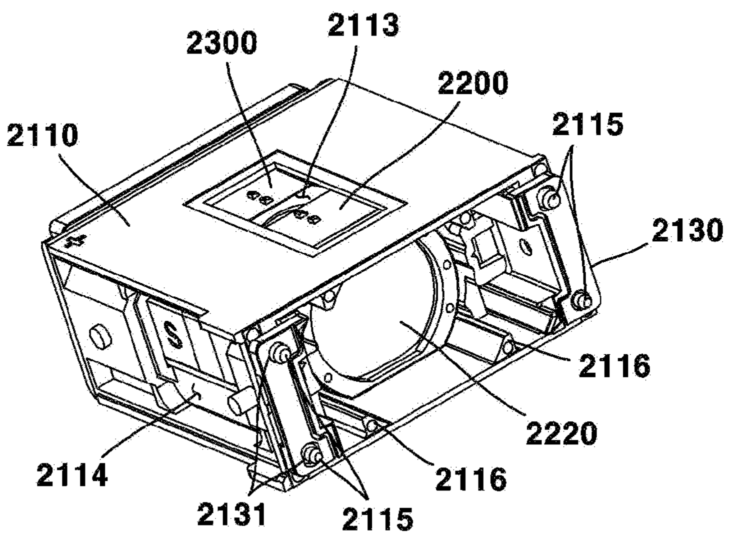
FIG. 40 is a perspective view of a state in which the first lens and related components are omitted in the lens driving device of the state illustrated in FIG. 39.
Figure 41:
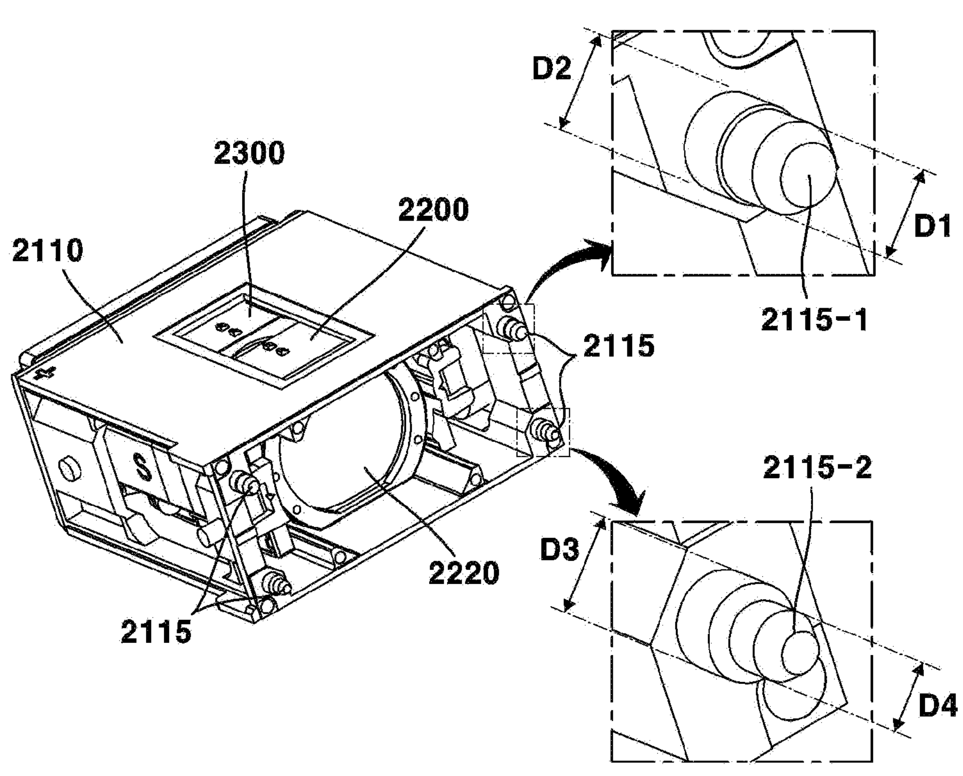
FIG. 41 is a perspective view and a partially enlarged view of a part of a lens driving device according to the present embodiment.
Figure 42:
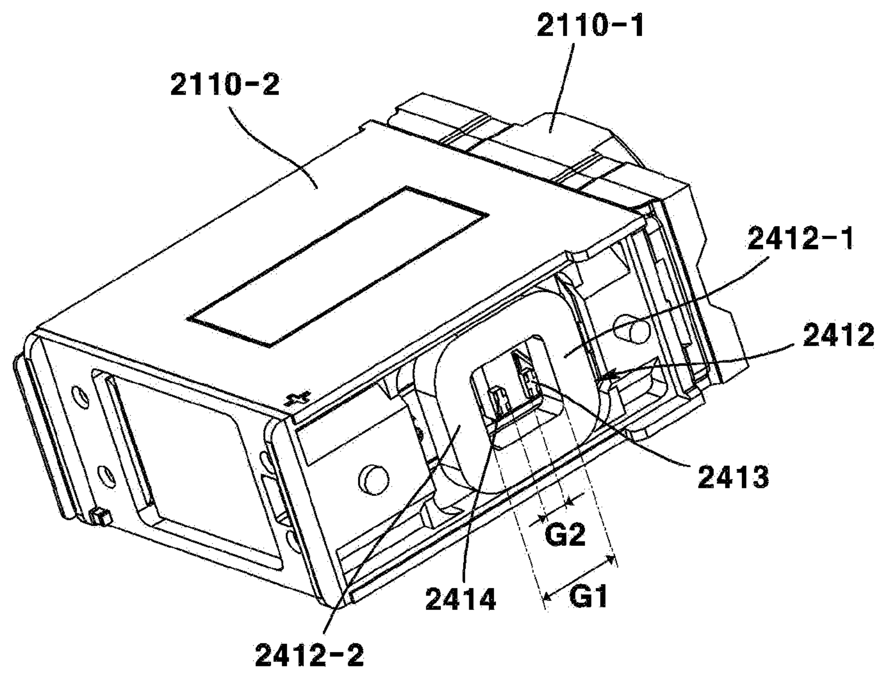
FIG. 42 is a diagram for explaining an arrangement structure of a coil and a sensor of a lens driving device according to the present embodiment.
Figure 43:
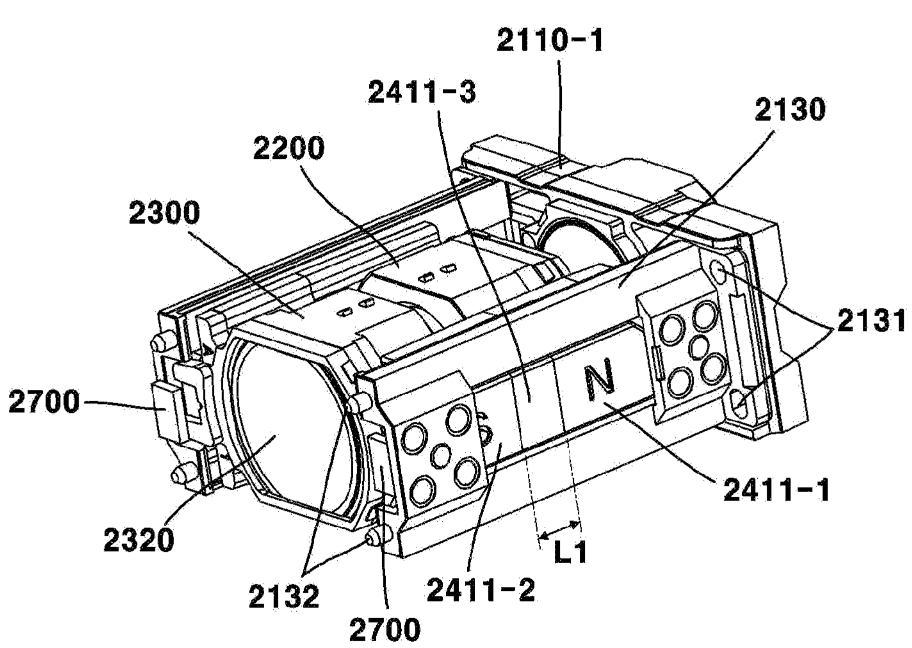
FIG. 43 is a perspective view illustrating a state in which the second housing is omitted in the lens driving device of the state illustrated in FIG. 39.
Figure 44:
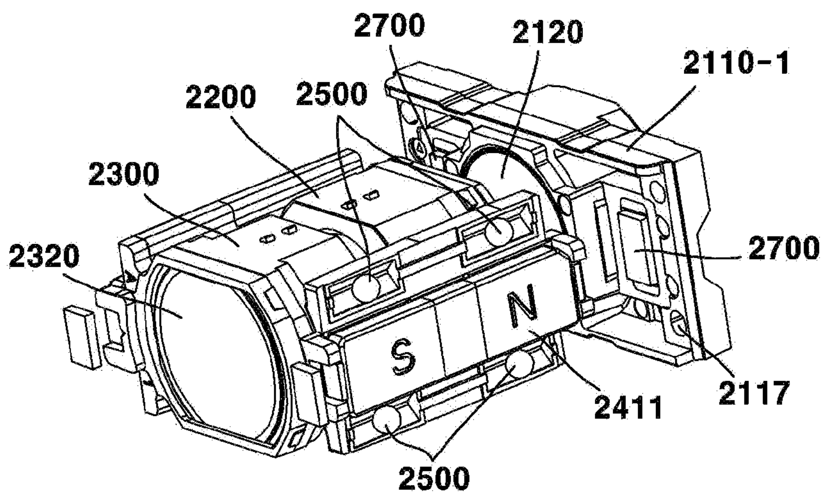
FIG. 44 is a perspective view of a state in which a guide rail is omitted from the lens driving device of the state illustrated in FIG. 43.
Figure 45:
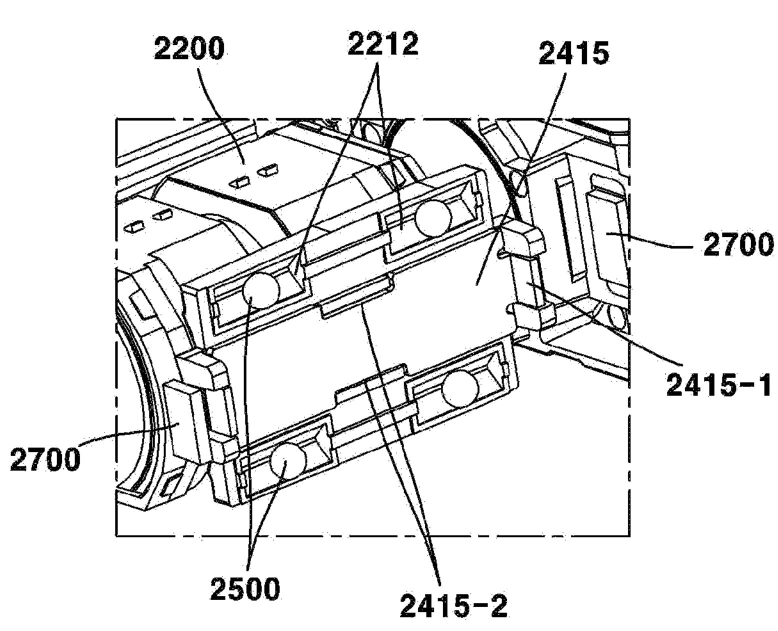
FIG. 45 is an enlarged view of some configurations of a lens driving device according to the present embodiment.
Figure 46:
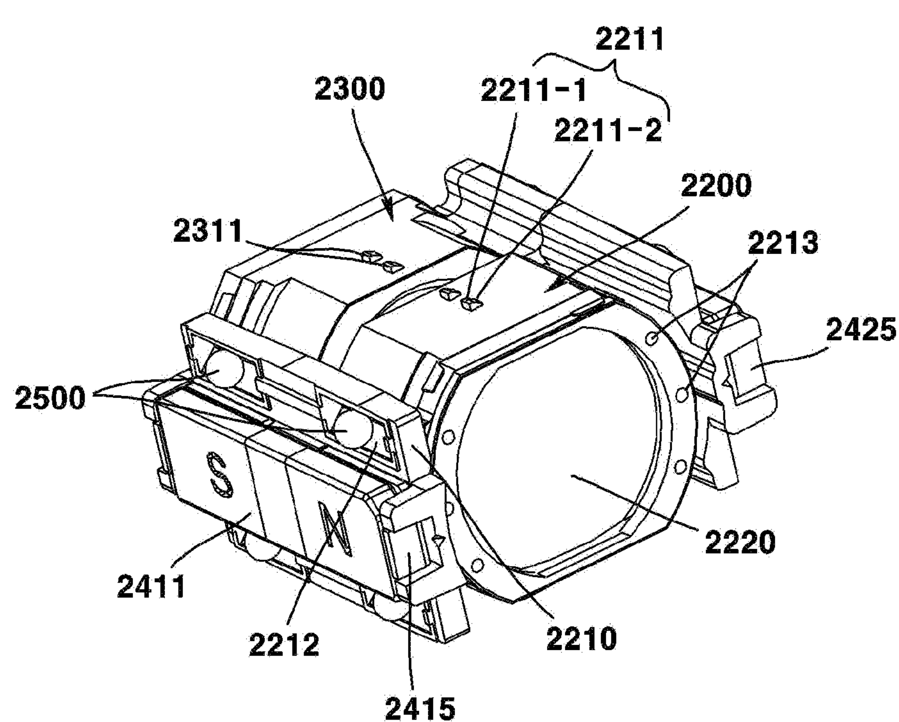
FIG. 46 is a perspective view of a first moving part and a second moving part of a lens driving device according to the present embodiment, and a related configuration thereof.
Figure 47:
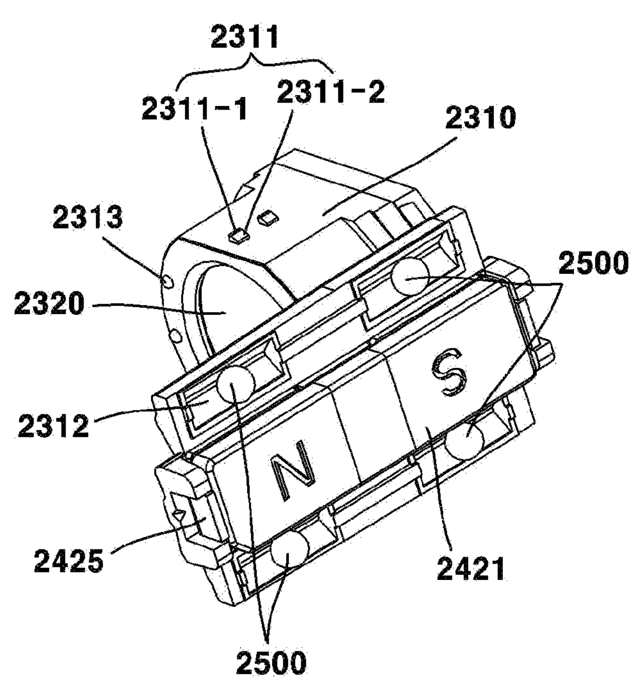
FIG. 47 is a perspective view of a second moving part of the lens driving device according to the present embodiment and a related configuration.
Figure 48:
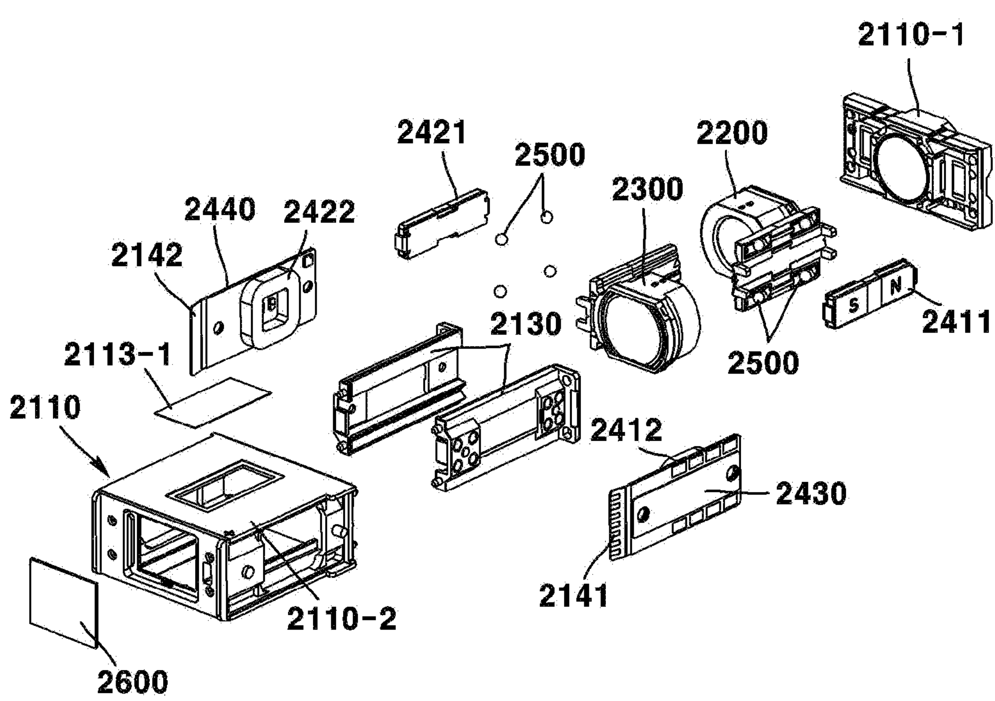
FIG. 48 is an exploded perspective view of a lens driving device according to the present embodiment.
Figure 49:
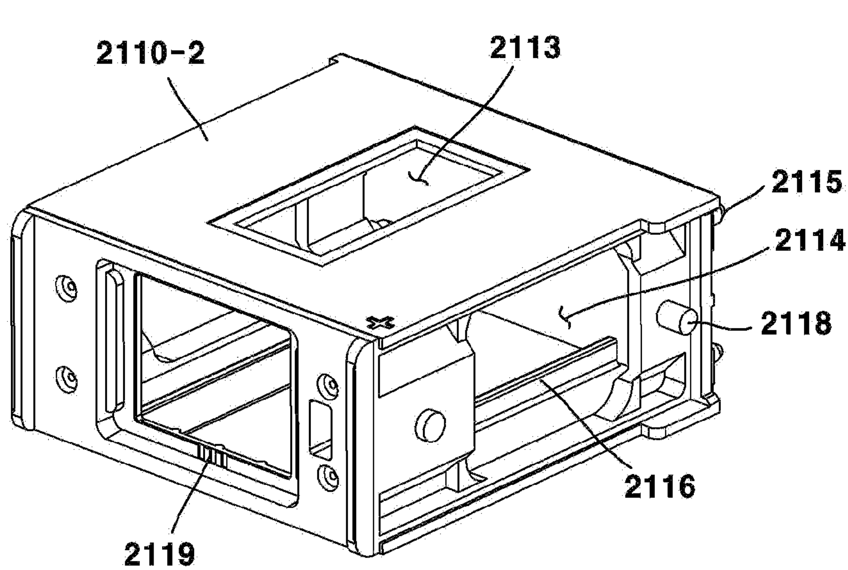
FIG. 49 is a perspective view of a second housing of a lens driving device according to the present embodiment.
Figure 50:
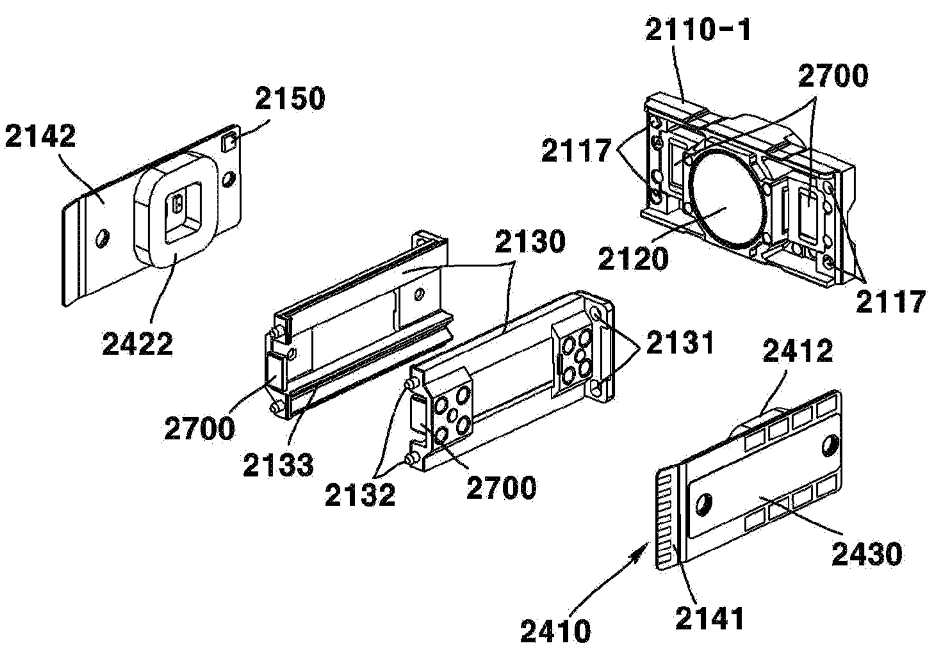
FIGS. 50 and 51 are exploded perspective views of some configurations of a lens driving device according to the present embodiment.
Figure 51:
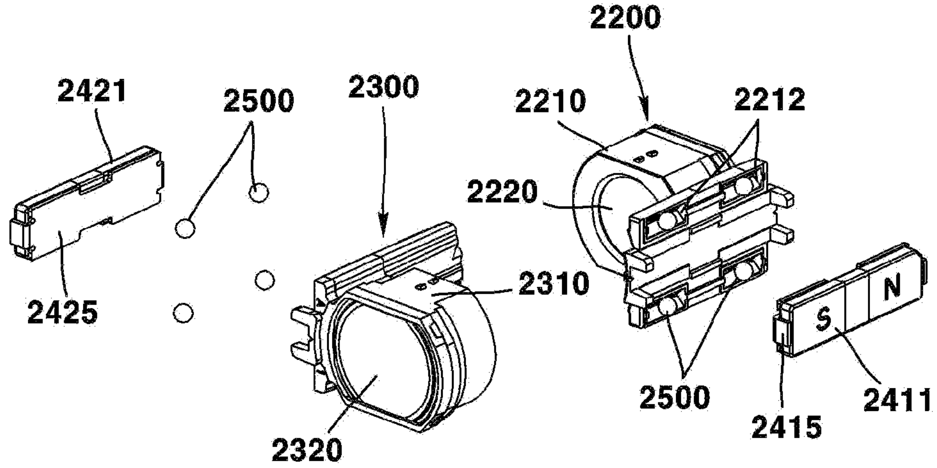
Figure 52:
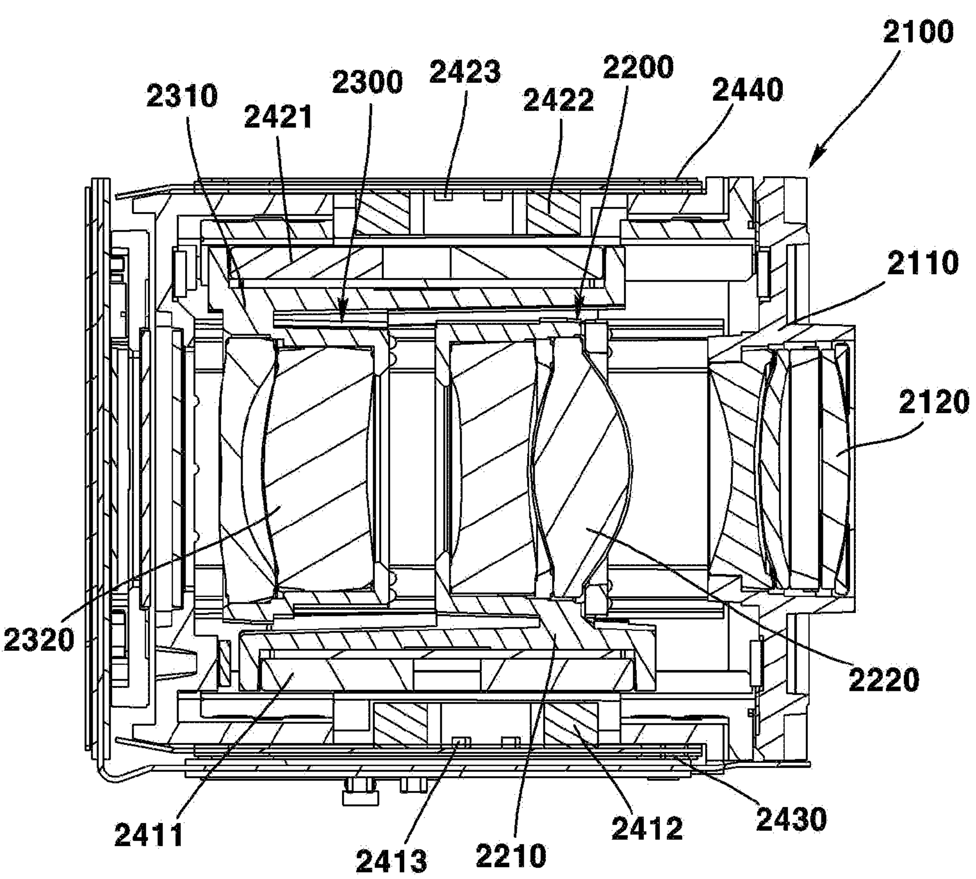
FIG. 52 is a cross-sectional view of a lens driving device according to the present embodiment.
Figure 53:
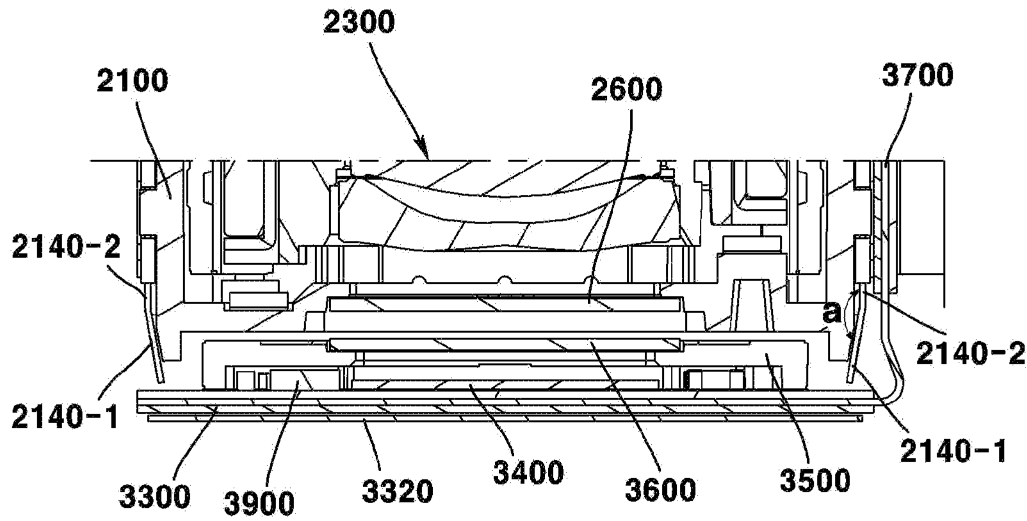
FIG. 53 is a cross-sectional view of a part of a lens driving device according to the present embodiment.
Figure 54:
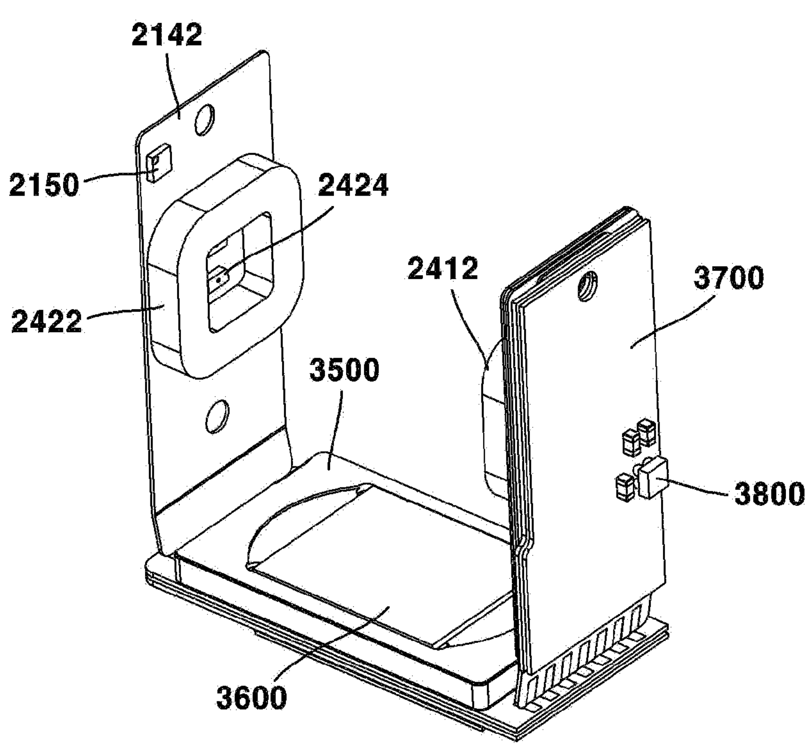
FIG. 54 is a diagram illustrating an arrangement of an EEPROM of a lens driving device according to the present embodiment.
Figure 55:
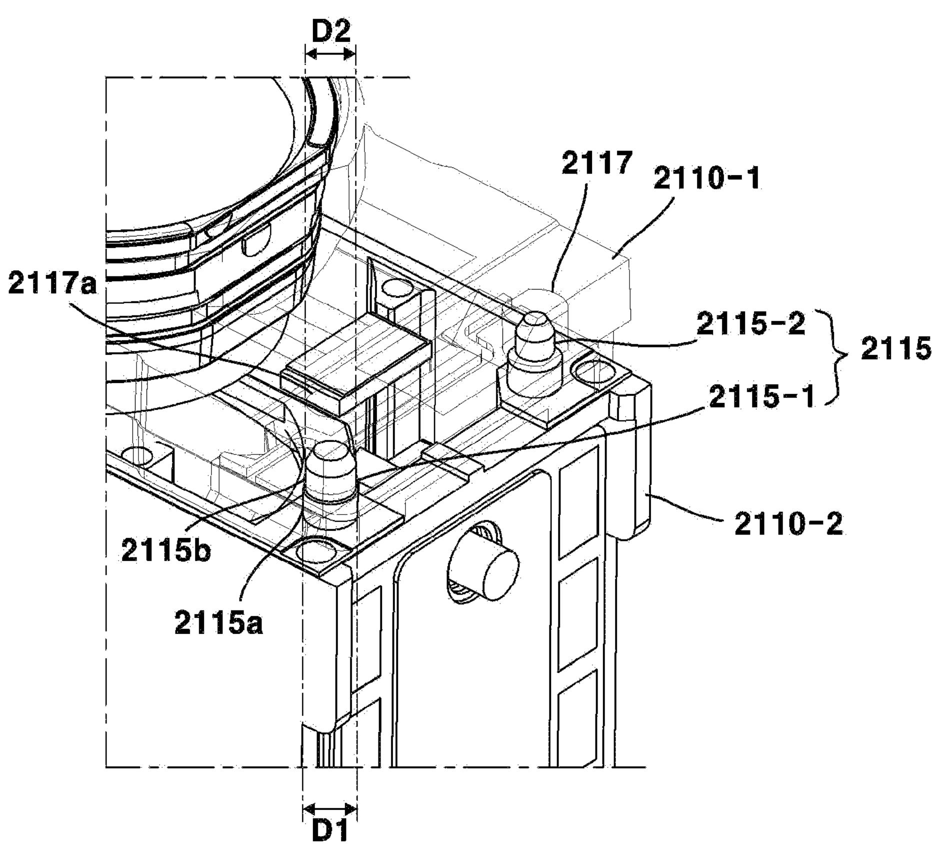
FIG. 55 is a view illustrating a double-stage protrusion of a housing of a lens driving device and a related coupling structure according to the present embodiment.
Figure 56:
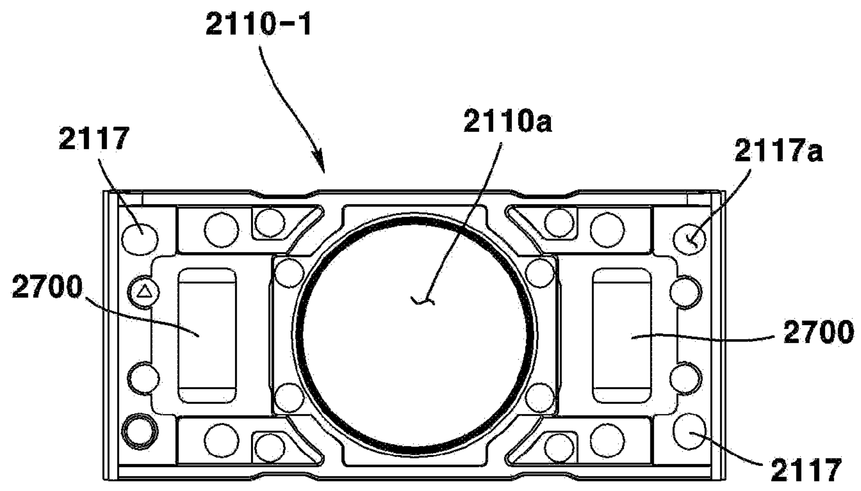
FIG. 56 is a diagram illustrating a cover of a lens driving device according to the present embodiment.
Figure 57:
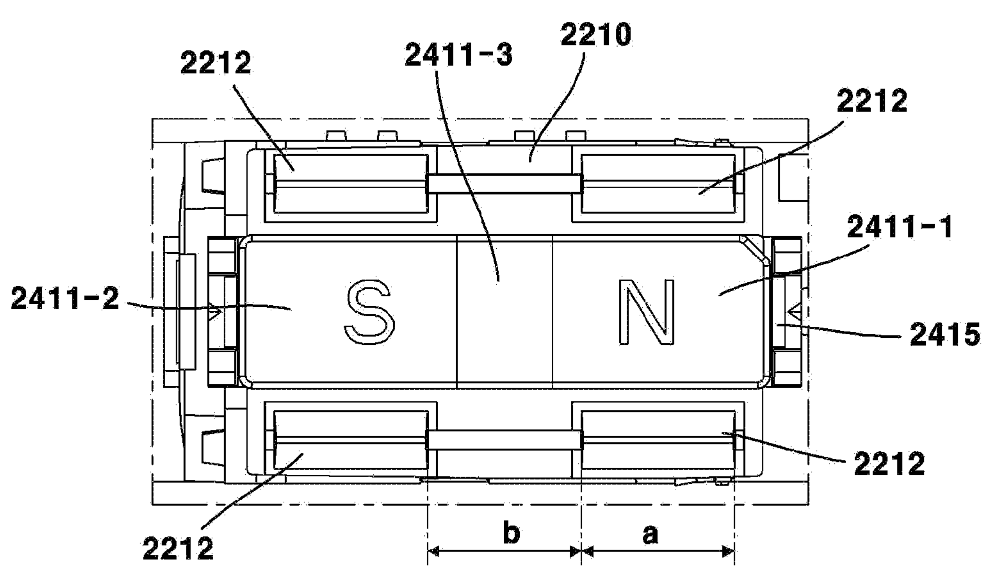
FIG. 57 is a side view of a moving part and a driving magnet of a lens driving device according to the present embodiment as viewed from the side.
Figure 58:
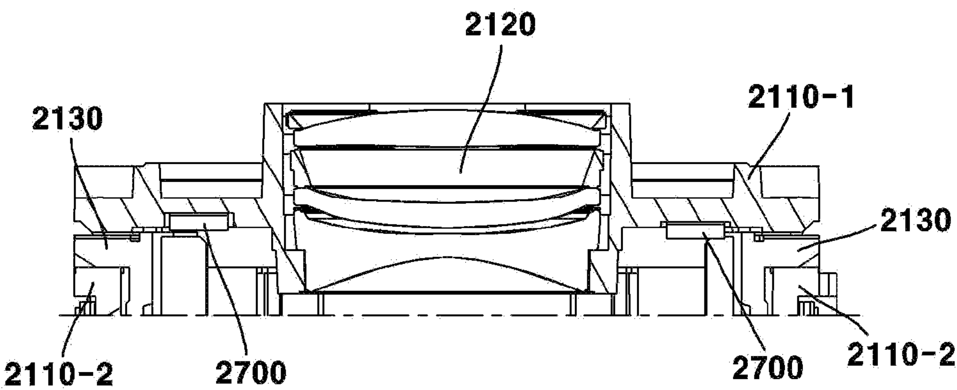
FIG. 58 is a cross-sectional view illustrating a cover and related configuration of a lens driving device according to the present embodiment.
Figure 59:
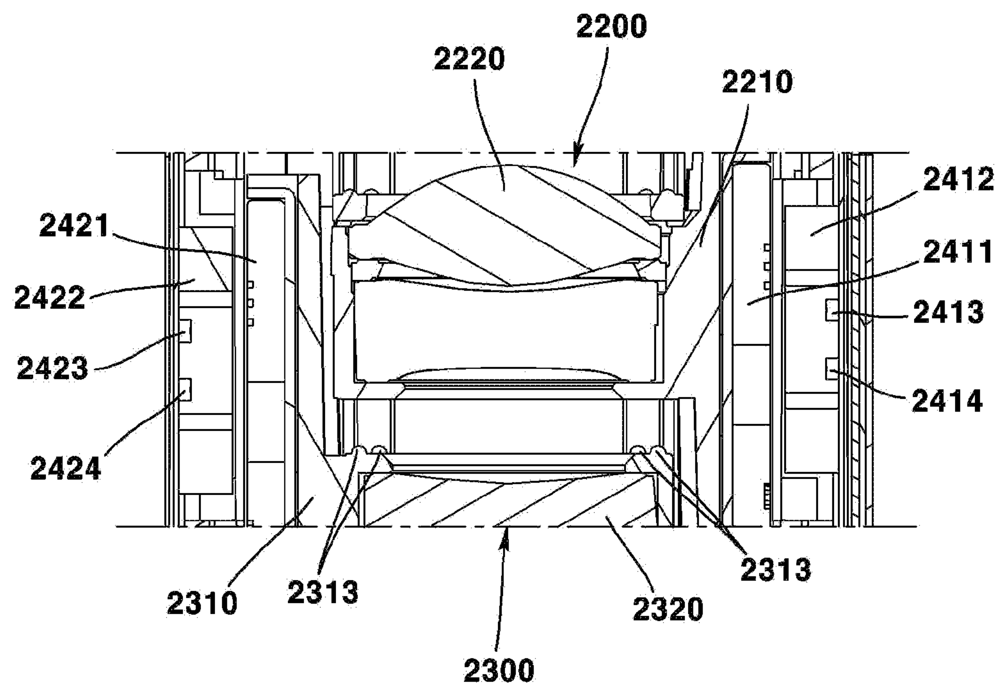
FIG. 59 is a cross-sectional view illustrating a first moving part of a lens driving device according to the present embodiment and a related configuration.
Figure 60:
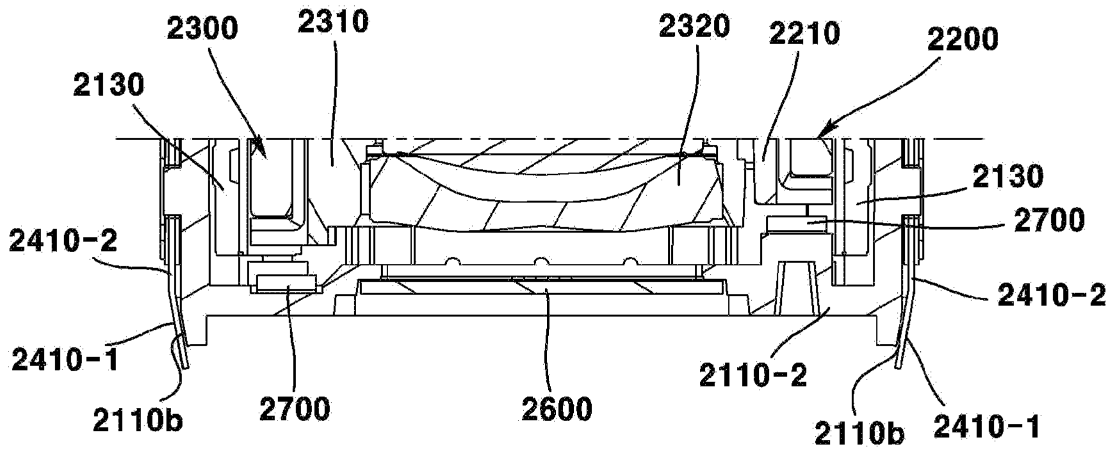
FIG. 60 is a cross-sectional view illustrating a second moving part and related configuration of a lens driving device according to the present embodiment.
Figure 61:
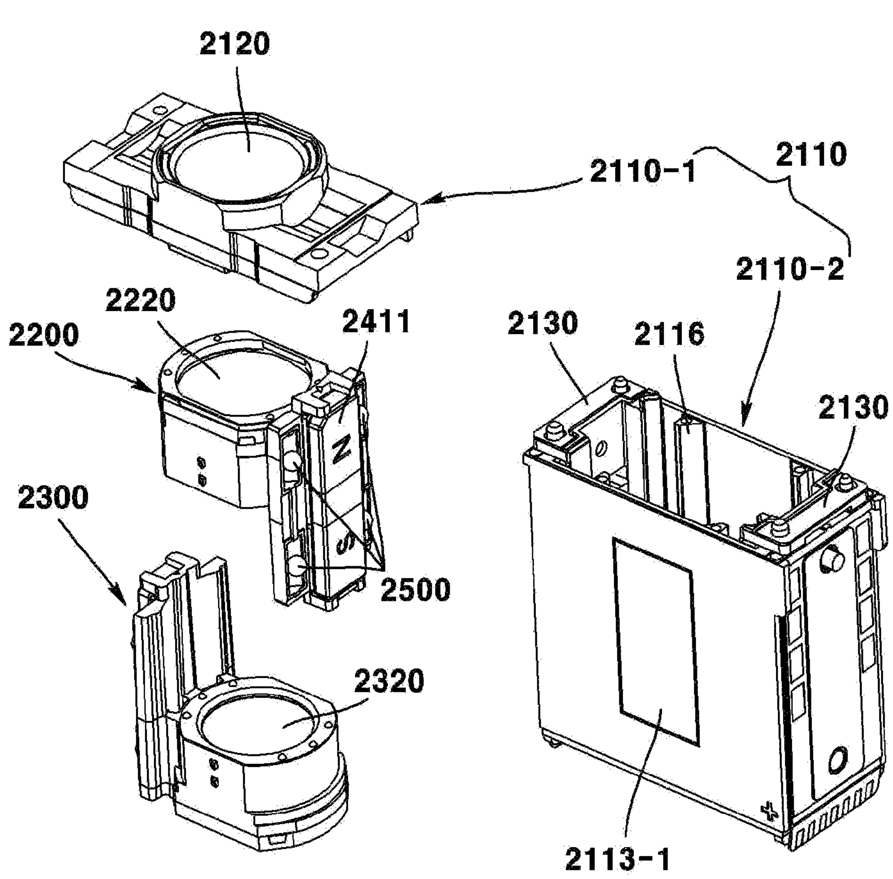
FIG. 61 is an exploded perspective view of a lens driving device according to the present embodiment.
Figure 62:
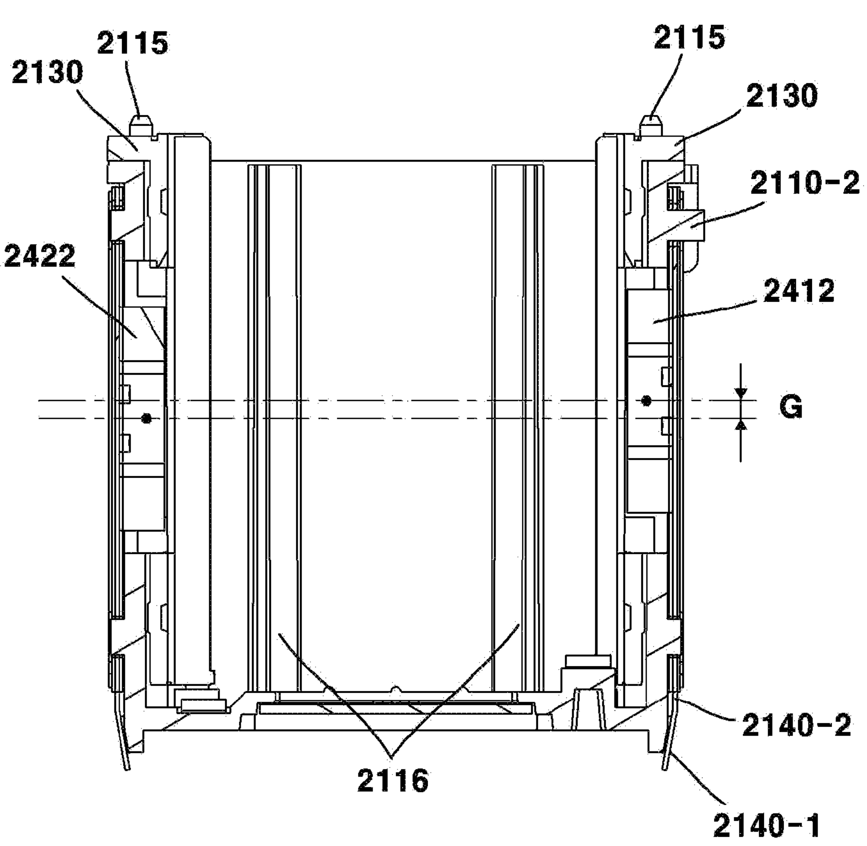
FIG. 62 is a cross-sectional view illustrating a height difference between a first coil and a second coil of a lens driving device according to the present embodiment.
Figure 63:
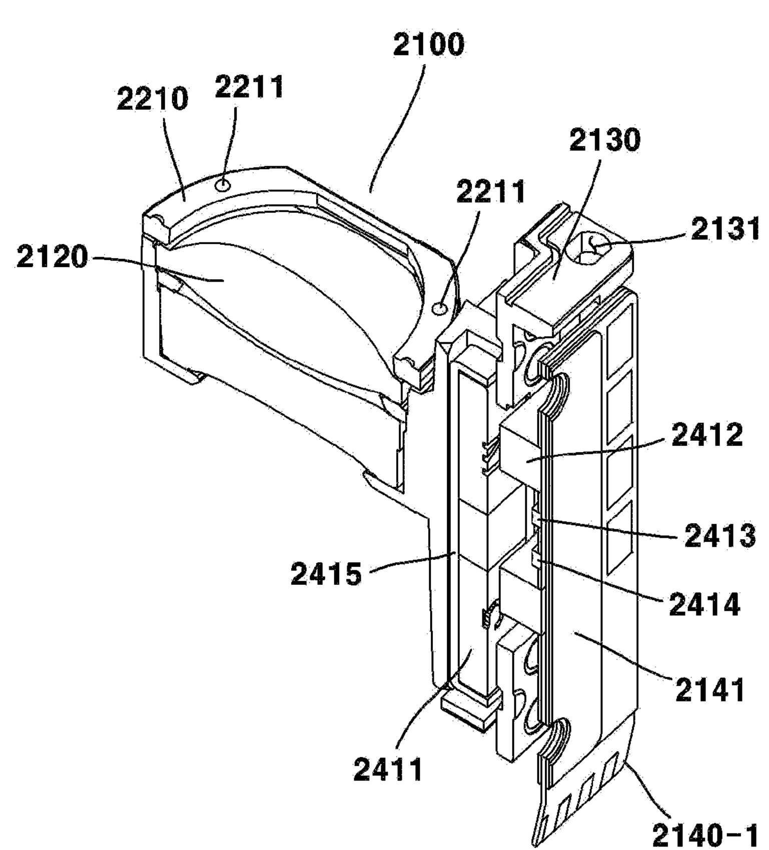
FIG. 63 is a cross-sectional perspective view of a first moving part and a first driving part of a lens driving device according to the present embodiment.
Figure 64:
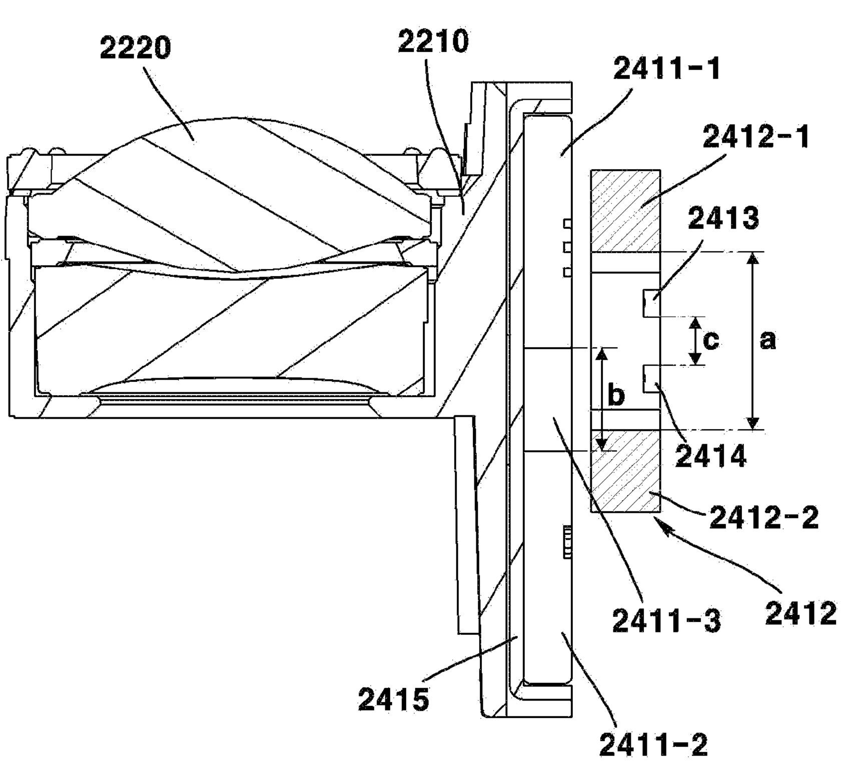
FIG. 64 is a cross-sectional view of a first moving part and a first driving part of a lens driving device according to the present embodiment.
Figure 65:
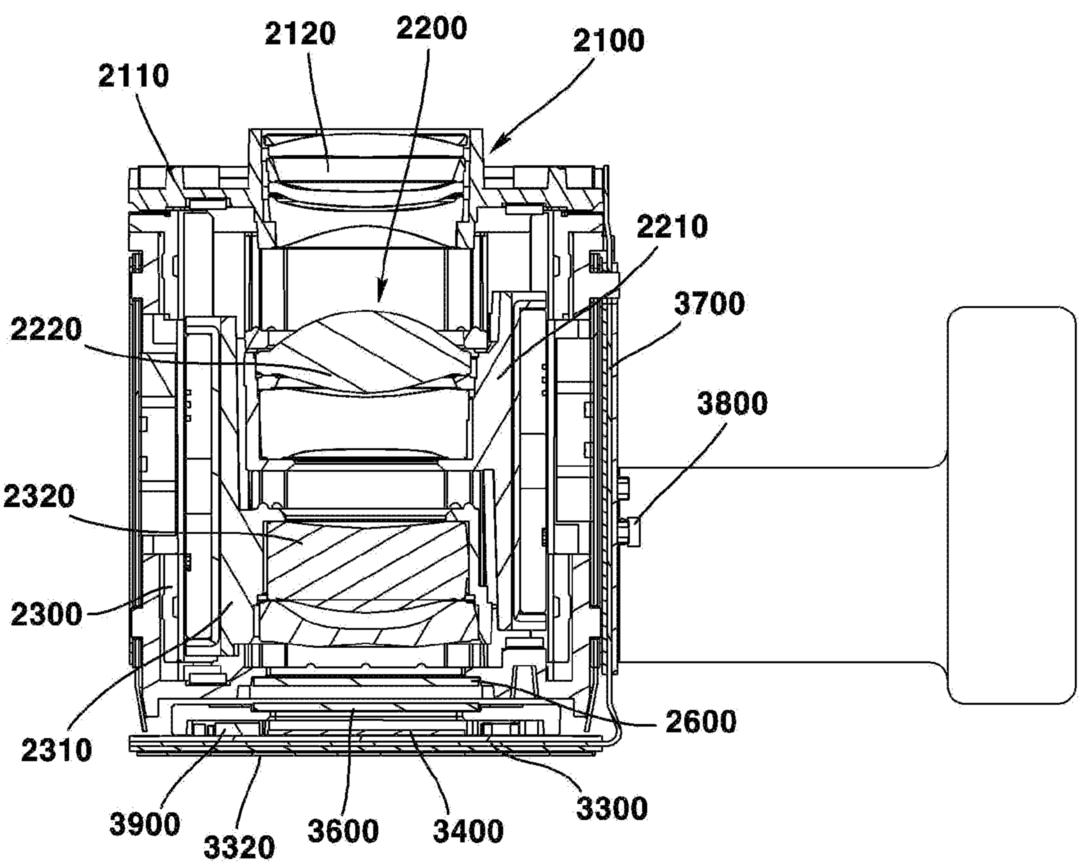
FIG. 65 is a cross-sectional view of a lens driving device according to the present embodiment.

FIG. 35 is a perspective view of a lens driving device according to the present embodiment; FIG. 36 is a perspective view in which some configurations of a lens driving device according to the present embodiment are omitted; FIG. 37 is a perspective view of a lens driving device in the state illustrated in FIG. 36 as viewed from another direction; FIG. 38 is a perspective view in which some configurations of a lens driving device according to the present embodiment are omitted; FIG. 39 is a perspective view of a state in which configurations such as a substrate and a coil are omitted in a lens driving device according to the present embodiment; FIG. 40 is a perspective view of a state in which the first lens and related components are omitted in the lens driving device of the state illustrated in FIG. 39; FIG. 41 is a perspective view and a partially enlarged view of a part of a lens driving device according to the present embodiment; FIG. 42 is a diagram for explaining an arrangement structure of a coil and a sensor of a lens driving device according to the present embodiment; FIG. 43 is a perspective view illustrating a state in which the second housing is omitted in the lens driving device of the state illustrated in FIG. 39; FIG. 44 is a perspective view of a state in which a guide rail is omitted from the lens driving device of the state illustrated in FIG. 43; FIG. 45 is an enlarged view of some configurations of a lens driving device according to the present embodiment; FIG. 46 is a perspective view of a first moving part and a second moving part of a lens driving device according to the present embodiment, and a related configuration thereof; FIG. 47 is a perspective view of a second moving part of the lens driving device according to the present embodiment and a related configuration; FIG. 48 is an exploded perspective view of a lens driving device according to the present embodiment; FIG. 49 is a perspective view of a second housing of a lens driving device according to the present embodiment; FIGS. 50 and 51 are exploded perspective views of some configurations of a lens driving device according to the present embodiment; FIG. 52 is a cross-sectional view of a lens driving device according to the present embodiment; FIG. 53 is a cross-sectional view of a part of a lens driving device according to the present embodiment; FIG. 54 is a diagram illustrating an arrangement of an EEPROM of a lens driving device according to the present embodiment; FIG. 55 is a view illustrating a double-stage protrusion of a housing of a lens driving device and a related coupling structure according to the present embodiment; FIG. 56 is a diagram illustrating a cover of a lens driving device according to the present embodiment; FIG. 57 is a side view of a moving part and a driving magnet of a lens driving device according to the present embodiment as viewed from the side; FIG. 58 is a cross-sectional view illustrating a cover and related configuration of a lens driving device according to the present embodiment; FIG. 59 is a cross-sectional view illustrating a first moving part of a lens driving device according to the present embodiment and a related configuration; FIG. 60 is a cross-sectional view illustrating a second moving part and related configuration of a lens driving device according to the present embodiment; FIG. 61 is an exploded perspective view of a lens driving device according to the present embodiment; FIG. 62 is a cross-sectional view illustrating a height difference between a first coil and a second coil of a lens driving device according to the present embodiment; FIG. 63 is a cross-sectional perspective view of a first moving part and a first driving part of a lens driving device according to the present embodiment; FIG. 64 is a cross-sectional view of a first moving part and a first driving part of a lens driving device according to the present embodiment; and FIG. 65 is a cross-sectional view of a lens driving device according to the present embodiment.

The lens driving device 2000 may perform a zoom function. The lens driving device 2000 may perform a continuous zoom function. The lens driving device 2000 may perform an auto focus (AF) function. The lens driving device 2000 may move a lens. The lens driving device 2000 may move the lens along an optical axis. The lens driving device 2000 may move lenses formed in a plurality of groups by each group. The lens driving device 2000 may move a second group lens. The lens driving device 2000 may move a third group lens. The lens driving device 2000 may be a lens actuator. The lens driving device 2000 may be an AF actuator. The lens driving device 2000 may be a zoom actuator. The lens driving device 2000 may comprise a voice coil motor (VCM). The lens driving device 2000 may be an actuator device.

The lens driving device 2000 may comprise a lens. Or, the lens may be described as one configuration of the camera device 10 rather than one configuration of the lens driving device 2000. The lens may be disposed in an optical path formed by the reflective member 1220 and the image sensor 3400 of the reflective member driving device 1000. The lens may comprise a plurality of lenses. The plurality of lenses may form a plurality of groups. The lenses may form three groups. The lens may comprise first to third lens groups. A first lens group, a second lens group, and a third lens group may be sequentially disposed between the reflective member 1220 and the image sensor 3400. The first lens group may comprise a first lens 2120. The second lens group may comprise a second lens 2220. The third lens group may comprise a third lens 2320.

The lens driving device 2000 may comprise a fixed part 2100. The fixed part 2100 may be a relatively fixed part when the first moving part 2200 and the second moving part 2300 are moved.

The lens driving device 2000 may comprise a housing 2110. The fixed part 2100 may comprise a housing 2110. The housing 2110 may be disposed outside the first holder 2210 and the second holder 2310. The housing 2110 may accommodate at least a portion of the first holder 2210 and the second holder 2310. The housing 2110 may comprise a front plate, a rear plate, and a plurality of connection plates. At this time, the front plate may be referred to as an upper plate, the rear plate may be referred to as a lower plate, and the connection plate may be referred to as a side plate.

The housing 2110 may comprise a first housing 2110-1. The first housing 2110-1 may be a cover. The first housing 2110-1 may form a front plate of the housing 2110. The first housing 2110-1 may be coupled to the first lens 2120. The first housing 2110-1 may be a cover. The first housing 2110-1 may be coupled to the reflective member driving device 1000. A first lens 2120 may be fixed to the first housing 2110-1. The first housing 2110-1 may be coupled to a protrusion 2115 of a second housing 2110-2.

The housing 2110 may comprise a second housing 2110-2. The second housing 2110-2 may be a housing. The second housing 2110-2 may form a rear plate and a connection plate of the housing 2110. The second housing 2110-2 may be open forward. The first housing 2110-1 may be coupled to the front of the second housing 2110-2. A portion of a guide rail 2130 may be disposed between the first housing 2110-1 and the second housing 2110-2. The first housing 2110-1 may be referred to as a cover, and the second housing 2110-2 may be referred to as a housing.

The housing 2110 may comprise a first groove 2111. The first groove 2111 may be coupled to the protruded portion 1116 of the housing 1110 of the reflective member driving device 1000. The first groove 2111 may be formed in a shape corresponding to the protruded portion 1116 of the reflective member driving device 1000. An adhesive for coupling the reflective member driving device 1000 to the lens driving device 2000 may be disposed in the first groove 2111.

The housing 2110 may comprise a second groove 2112. The second groove 2112 may be coupled to the protrusion 1117 of the housing 1110 of the reflective member driving device 1000. The protrusion 1117 of the reflective member driving device 1000 may be inserted into the second groove 2112. The second groove 2112 may be formed in a shape corresponding to the protrusion 1117 of the reflective member driving device 1000. An adhesive for coupling the reflective member driving device 1000 to the lens driving device 2000 may be disposed in the second groove 2112.

The housing 2110 may comprise a first hole 2113. The first hole 2113 may expose the protrusion 2211 of the first holder 2210 and the protrusion 2311 of the second holder 2310. The first hole 2113 may be formed in the connection plate of the housing 2110. In the manufacturing test step, by checking the protrusion 2211 of the first holder 2210 and the protrusion 2311 of the second holder 2310 being exposed through the first hole 2113, it can be checked whether the lens driving device 2000 is operating normally.

The housing 2110 may comprise a plate 2113-1. The plate 2113-1 may cover the first hole 2113. The plate 2113-1 is disposed in the first hole 2113 and may close the first hole 2113.

The housing 2110 may comprise a second hole 2114. The second hole 2114 may be a coil accommodating hole in which a first coil 2412 and a second coil 2422 are disposed. The first coil 2412 and the second coil 2422 may be disposed in the second hole 2114. The second hole 2114 may be formed to be larger than the first coil 2412 and the second coil 2422.

The housing 2110 may comprise a protrusion 2115. The protrusion 2115 may be formed in the second housing 2110-2. The protrusion 2115 may be formed as a two-step protrusion. The protrusion 2115 may be coupled to a guide rail 2130. The protrusion 2115 may be coupled to the first housing 2110-1. The guide rail 2130 may be coupled to a portion having a large diameter of the protrusion 2115 and the first housing 2110-1 may be coupled to a portion having a small diameter of the protrusion 2115.

The protrusion 2115 may pass through the guide rail 2130 and be inserted into the first housing 2110-1. The protrusion 2115 may be formed to have two steps. The protrusion 2115 may comprise two regions or portions having different widths or diameters. The protrusion 2115 may comprise a first portion **2115*a*. The first portion 2115*a* may be disposed on the guide rail 2130. The protrusion 2115 may comprise a second portion 2115*b*. The second portion 2115*b* may be extended from the first portion 2115*a*. The second portion 2115*b* may be disposed in the first housing 2110-1. The second portion 2115*b* may have a smaller width than the first portion 2115*a*. The second portion 2115*b* may have a smaller diameter than the first portion 2115*a*. As illustrated in FIG. 55, the first diameter D1 of the first portion 2115*a* may be larger than the second diameter D2 of the second portion 2115*b***.

The protrusion 2115 may comprise a plurality of protrusions. The protrusion 2115 may comprise four protrusions. The protrusion 2115 may comprise first to fourth protrusions. The protrusion 2115 may comprise a first protrusion 2115-1 and a second protrusion 2115-2. The second portion **2115*b* of the first protrusion 2115-1 may have a greater width than the second portion 2115*b* of the second protrusion 2115-2. In a modified embodiment, the second portion 2115*b* of the first protrusion 2115-1 may have a smaller width than the second portion 2115*b* of the second protrusion 2115-2. The first portion 2115*a* of the first protrusion 2115-1 and the first portion 2115*a* of the second protrusion 2115-2 may have the same width. In a modified embodiment, the first portion 2115*a* of the first protrusion 2115-1 and the first portion 2115*a* of the second protrusion 2115-2 may have different widths. The width of the protrusion 2115** may be a diameter.

The protrusion 2115 may comprise a first protrusion 2115-1. The first protrusion 2115-1 may comprise a first portion **2115*a* having a first diameter D2 and a second portion 2115*b* being protruded from the first portion 2115*a* and having a second diameter D1. The protrusion 2115 may comprise a second protrusion 2115-2. The second protrusion 2115-2 may comprise a third portion having a third diameter D3 and a fourth portion being protruded from the third portion and having a fourth diameter D4. The third portion of the second protrusion 2115-2 may be referred to as a first portion, and a fourth portion of the second protrusion 2115-2 may be referred to as a second portion. At this time, the fourth diameter D4 may be smaller than the second diameter D1. Through this, the first protrusion 2115-1 may be more tightly coupled to the first housing 2110-1 than the second protrusion 2115-2**.

The housing 2110 may comprise a guide protrusion 2116. The guide protrusion 2116 may be formed on an inner surface of the housing 2110. The guide protrusion 2116 may be formed in a shape corresponding to the shape of at least a portion of the first holder 2210 and the second holder 2310.

Through this, the guide protrusion 2116 may guide the movement of the first holder 2210 and the second holder 2310 in an optical axis direction. At this time, the optical axis direction may be a z-axis direction perpendicular to the x-axis and the y-axis. The guide protrusion 2116 may be disposed in the optical axis direction. The guide protrusion 2116 may be extended in an optical axis direction. The guide protrusion 2116 may inhibit the first holder 2210 and the second holder 2310 from being separated and removed in a direction opposite to the direction in which the ball 2500 is disposed.

The housing 2110 may comprise a groove 2117. The groove 2117 may be formed in the first housing 2110-1. The groove 2117 of the first housing 2110-1 may be coupled to the protrusion 2115 of the second housing 2110-2. The first housing 2110-1 may comprise a hole 2117*a* in which the protrusion 2115 of the second housing 2110-2 is disposed. The first housing 2110-1 may comprise a groove 2117 in which the protrusion 2115 of the second housing 2110-2 is disposed. The first housing 2110-1 may comprise a hole 2117*a* and a groove 2117 in which the protrusion 2115 is disposed. The first housing 2110-1 may comprise a plurality of holes 2117*a* and grooves 2117 in which the protrusions 2115 are being disposed.

The first housing 2110-1 may comprise two holes 2117*a* and two grooves 2117 in which the protrusion 2115 is disposed. One of the two holes of the first housing 2110-1 may be formed in a shape and diameter corresponding to the protrusion 2115 of the second housing 2110-2. The other one of the two holes of the first housing 2110-1 may be formed to have a different shape from the protrusion 2115 of the second housing 2110-2 or a larger diameter than the protrusion 2115 of the second housing 2110-2. Each of the two grooves of the first housing 2110-1 may be formed in a shape different from the protrusion 2115 of the second housing 2110-2 or a diameter larger than the protrusion 2115 of the second housing 2110-2. Only one among the four holes and grooves of the first housing 2110-1 may be formed in a shape and size corresponding to the protrusion 2115 of the second housing 2110-2. As a modified embodiment, two or more among the four holes and grooves of the first housing 2110-1 may be formed in a shape and size corresponding to the protrusion 2115 of the second housing 2110-2.

The housing 2110 may comprise a protrusion 2118. The protrusion 2118 may be coupled to the substrate 2140. The protrusion 2118 may be inserted into the groove of the substrate 2140. The protrusion 2118 may be formed to have a corresponding size and shape to fit into the groove of the substrate 2140.

The housing 2110 may comprise a vent hole 2119. The vent hole 2119 may be formed in the rear plate of the housing 2110. The vent hole 2119 may form a gap between the housing 2110 and the dummy glass 2600. Air may flow into the gap between the housing 2110 and the dummy glass 2600. A gas generated during the curing process of the adhesive may escape through the vent hole 2119.

The lens driving device 2000 may comprise a first lens 2120. Or, the first lens 2120 may be described as one configuration of the camera device 10 rather than one configuration of the lens driving device 2000. The fixed part 2100 may comprise a first lens 2120. The first lens 2120 may be disposed on an optical axis. The first lens 2120 may be disposed between the reflective member 1220 and the image sensor 3400. The first lens 2120 may be disposed between the reflective member 1220 and the second lens 2220. The first lens 2120 may be disposed in the first housing 2110-1. The first lens 2120 may be fixed to the first housing 2110-1. The first lens 2120 may maintain a fixed state even when the second lens 2220 and the third lens 2320 are being moved.

The first lens 2120 may be a first lens group. The first lens 2120 may comprise a plurality of lenses. The first lens 2120 may comprise three lenses.

The lens driving device 2000 may comprise a guide rail 2130. The fixed part 2100 may comprise a guide rail 2130. The guide rail 2130 may be coupled to the fixed part 2100. The guide rail 2130 may be coupled between the first housing 2110-1 and the second housing 2110-2. The guide rail 2130 may be coupled to the protrusion 2115 of the second housing 2110-2. The guide rail 2130 may guide the movement of the first holder 2210 and the second holder 2310. The guide rail 2130 may guide the first holder 2210 and the second holder 2310 to move in an optical axis direction. The guide rail 2130 may comprise a rail disposed in the optical axis direction. The guide rail 2130 may comprise a rail being extended in the optical axis direction. The guide rail 2130 may comprise a rail formed so that the ball 2500 rolls. The guide rail 2130 may be provided separately from the housing 2110 for flatness management.

The guide rail 2130 may comprise a hole 2131. The protrusion 2115 of the second housing 2110-2 may be disposed in the hole 2131. The protrusion 2115 of the second housing 2110-2 may pass through the hole 2131. The protrusion 2115 of the second housing 2110-2 may be inserted into the hole 2131.

The hole 2131 may comprise a plurality of holes. The hole 2131 may comprise first to fourth holes. The hole 2131 may comprise four holes.

Two among the four holes of the guide rail 2130 may be formed in a shape and diameter corresponding to the protrusion 2115 of the second housing 2110-2. The other two holes among the four holes of the guide rail 2130 may be formed to have a different shape from the protrusion 2115 of the second housing 2110-2 or have a larger diameter than the protrusion 2115 of the second housing 2110-2. The guide rail 2130 may comprise one or more holes formed in a shape and diameter corresponding to the protrusion 2115 of the second housing 2110-2. The guide rail 2130 may comprise one or more holes formed in a shape different from that of the protrusion 2115 of the second housing 2110-2 or with a larger diameter than the protrusion 2115 of the second housing 2110-2.

The guide rail 2130 may comprise a plurality of holes in which the protrusions 2115 of the second housing 2110-2 are disposed. Some of the plurality of holes of the guide rail 2130 may be formed as a regular hole being formed to have a shape and diameter corresponding to the protrusion 2115 of the second housing 2110-2. However, a regular hole may be a regular groove formed in a groove shape. Some of the remaining part of the plurality of holes of the guide rail 2130 may be formed as a lengthy hole formed in a shape different from that of the protrusion 2115 of the second housing 2110-2. However, the lengthy hole may be formed in a groove shape as a lengthy groove. The protrusion 2115 may be a boss pin.

In the present embodiment, the protrusion 2115 is formed in a two-step structure, so that when the guide rail 2130 is inserted, the misalignment of the first housing 2110-1 caused by the breakage of the protrusion 2115 can be alleviated. On the other hand, since the reference position of the first housing 2110-1 is determined by a regular hole and the rest is formed as a lengthy hole, assembly property is enhanced and rotation of the first housing 2110-1 can be inhibited.

The first housing 2110-1 may comprise a hole 2117*a* or a groove 2117 in which the protrusion 2115 of the second housing 2110-2 is disposed. The diameter of the hole 2131 of the guide rail 2130 may be larger than the diameter of the hole 2117*a* or the groove 2117 of the first housing 2110-1.

The guide rail 2130 may comprise a protrusion 2132. The protrusion 2132 may be protruded from a rear surface of the guide rail 2130. The protrusion 2132 may be inserted into a groove of the second housing 2110-2.

The guide rail 2130 may comprise a rail groove 2133. The rail grooves 2212 and 2312 of the moving parts 2200 and 2300 may comprise: a first rail groove and a second rail groove disposed on one side of the driving magnets 2411 and 2421; and a third rail groove and a fourth rail groove disposed on the other side of the driving magnets 2411 and 2421. The rail groove 2133 may be formed at a position corresponding to the first rail groove and the second rail groove of the moving parts 2200 and 2300. The guide rail 2130 may be formed as a flat surface at positions corresponding to the third and fourth rail grooves of the moving parts 2200 and 2300. The rail groove 2133 may be a V-shaped groove. Through this, the rail groove 2133 may make two-point contact with the ball 2500.

The lens driving device 2000 may comprise a substrate 2140. The fixed part 2100 may comprise a substrate 2140. The substrate 2140 may be disposed in the fixed part 2100. The substrate 2140 may be disposed on both side surfaces of the housing 2110. The substrate 2140 may be an FPCB. A first coil 2412 and a second coil 2422 may be disposed on the substrate 2140. The substrate 2140 may be electrically connected to the printed circuit board 3300 through a conductive member. The substrate 2140 may electrically connect the printed circuit board 3300 and the reflective member driving device 1000. Or, a substrate separate from the substrate 2140 for electrically connecting the printed circuit board 3300 and the reflective member driving device 1000 may be provided. The substrate 2140 may comprise a printed circuit board (PCB). The substrate 2140 may comprise a rigid PCB (RPCB). The substrate 2140 may comprise a flexible PCB (FPCB). The substrate 2140 may comprise an RFPCB in which an FPCB and an RPCB are coupled. The substrate 2140 may comprise a two-layer RPCB and an FPCB being disposed between the two-layer RPCBs. The board 2140 may comprise a terminal being coupled with the printed circuit board 3300. The printed circuit board 3300 may comprise a terminal being coupled with the board 2140. The substrate 2140 may be formed separately from the printed circuit board 3300. The substrate 2140 may be manufactured as a separate member from the printed circuit board 3300.

The substrate 2140 may comprise a first region 2140-1. The first region 2140-1 may be formed at an end of the substrate 2140. A terminal may be disposed in the first region 2140-1. The substrate 2140 may comprise a second region 2140-2. The first region 2140-1 of the substrate 2140 may be bent inward with respect to the second region 2140-2. Through this, the size of the printed circuit board 3300 can be minimized while securing a region for soldering arrangement that connects the terminals of the board 2140 and the printed circuit board 3300. The first region 2140-1 may form an obtuse angle with the second region 2140-2.

The substrate 2140 may comprise a plurality of terminals coupled to the printed circuit board 3300 through a conductive member. The substrate 2140 may comprise a first region 2140-1 in which a plurality of terminals are disposed. The substrate 2140 may comprise a second region 2140-2 in which coils 2412 and 2422 is disposed. A plurality of terminals may be coupled to the printed circuit board 3300 in a state in which the first region 2140-1 is bent inward with respect to the second region 2140-2. The fixed part 2100 may comprise a housing 2110 comprising an inclined surface 2110*b*. The first region 2140-1 may be extended along the inclined surface 2110*b* of the housing 2110 to be inclined with respect to the second region 2140-2.

The substrate 2140 may comprise a first region 2140-1 for connecting with the sensor package. The first region 2140-1 of the substrate 2140 may be bent to enhance the workability of soldering. In addition, an inclined surface 2110*b* of the housing 2110 may be provided for consistency in bending for each product.

The substrate 2140 may comprise a plurality of substrates. The substrate 2140 may comprise two substrates. The substrate 2140 may comprise a first substrate 2141 and a second substrate 2142. The substrate 2140 may comprise a first substrate 2141 and a second substrate 2142 disposed at the opposite sides of the moving parts 2200 and 2300 to be spaced apart from each other. The first substrate 2141 and the second substrate 2142 may be disposed in the housing 2110. The first substrate 2141 and the second substrate 2142 may be disposed at the opposite sides with respect to the first holder 2210 and the second holder 2310 to be spaced apart from each other.

The substrate 2140 may comprise a first substrate 2141. The first substrate 2141 may be disposed at one side of the housing 2110. A first coil 2412 may be disposed on the first substrate 2141. First and second Hall sensors 2413 and 2414 may be disposed on the first substrate 2141.

The substrate 2140 may comprise a second substrate 2142. The second substrate 2142 may be disposed at the other side of the housing 2110. The second substrate 2142 may be disposed at an opposite side of the first substrate 2141. A second coil 2422 may be disposed on the second substrate 2142. Third and fourth Hall sensors 2423 and 2424 may be disposed on the second substrate 2142.

The lens driving device 2000 may comprise a suspension (SUS) 2145. The suspension 2145 may be disposed on the substrate 2140. The suspension 2145 may reinforce the strength of the substrate 2140. The suspension 2145 may dissipate heat generated by the substrate 2140.

The lens driving device 2000 may comprise an EEPROM 2150. The EEPROM 2150 may be a memory. The EEPROM 2150 may be a memory member. The EEPROM 2150 may be a data storage member. The EEPROM 2150 may be disposed on the substrate 2140. The EEPROM 2150 may be disposed on an inner surface of the substrate 2140. The EEPROM 2150 may be disposed on an inner surface of the second substrate 2142. At this time, the second coil 2422 may also be disposed on the inner surface of the second substrate 2142. The EEPROM 2150 may be disposed outside the coils 2412 and 2422. The EEPROM 2150 may be electrically connected to the coils 2412 and 2422. The EEPROM 2150 may be electrically connected to the first coil 2412 and the second coil 2422. The EEPROM 2150 may be disposed on one or more of the first substrate 2141 and the second substrate 2142. The EEPROM 2150 may individually control the first coil 2412 and the second coil 2422. The fixed part 2100 may comprise a housing 2110 comprising a groove. The EEPROM 2150 may be disposed in the groove of the housing 2110.

Since the calibration data (Cal. Data) performed in the previous process is used in the manufacturing stage through the EEPROM 2150, the time required for porting the software can be minimized. Through this, the mass productivity of the camera device 10 may be enhanced. The EEPROM 2150 may be used to control currents applied to the first coil 2412 and the second coil 2422 before connecting the lens driving device 2000 to the driver IC 3900 in the manufacturing stage. That is, the EEPROM 2150 may be used to test whether the lens driving device 2000 operates normally. In the present embodiment, there are separate PCBs for driving, and it may comprise an EEPROM 2150 for driving when active alignment is in progress.

In the present embodiment, the PCBs for implementing the zoom and autofocus functions may be separate components. When the sensor package and the lens driving device 2000 are coupled, each assembly is driven and coupling at an optimal position may be required. Therefore, it may be necessary to control the driver IC 3900 for driving. The driver IC 3900 may be disposed in a sensor package. An external driver IC can be used for driving in a state where soldering is not performed. In order to use the calibration data (Cal. Data) performed in the previous process, a separate EEPROM 2150 may exist. By reading the information in the EEPROM 2150 and applying the calibration data (Cal. Data), control is performed by using an external driver IC, thereby coupling the sensor package and the lens driving device 2000.

The lens driving device 2000 may comprise moving parts 2200 and 2300. The moving parts 2200 and 2300 may be disposed in the fixed part 2100. The moving parts 2200 and 2300 may comprise a plurality of moving parts. The moving parts 2200 and 2300 may comprise a first moving part 2200 and a second moving part 2300.

The moving parts 2200 and 2300 may comprise holders 2210 and 2310 and lenses 2220 and 2320 disposed on the holders 2210 and 2310. The holders 2210 and 2310 may be disposed inside the second housing 2110-2. The first holder 2210 and the second holder 2310 may be disposed inside the housing 2110.

The fixed part 2100 may comprise a housing 2110 and a first lens 2120 disposed in the housing 2110. The first moving part 2200 may comprise a first holder 2210 and a second lens 2220 disposed in the first holder 2210. The second moving part 2300 may comprise a second holder 2310 and a third lens 2320 disposed in the second holder 2310. The first moving part 2200 and the second moving part 2300 may move individually. The first moving part 2200 may be a second group. The first moving part 2200 may perform a zoom function. The second moving part 2300 may be a third group. The second moving part 2300 may perform an auto focus (AF) function. Separate actuators may be built in so that the first moving part 2200 and the second moving part 2300 can be individually driven.

The first moving part 2200 may comprise a first holder 2210 disposed in the housing 2110 and a second lens 2220 disposed in the first holder 2210. The second moving part 2300 may comprise a second holder 2310 disposed in the housing 2110 and a third lens 2320 disposed in the second holder 2310. The second lens 2220 may be disposed between the first lens 2120 and the third lens 2320.

Each of the first to third lenses 2120, 2220, and 2320 may comprise a plurality of lenses. The second lens 2220 and the third lens 2320 may be formed of a D-cut lens. The first lens 2120 may be formed of a lens having a circular cross-section. As a modified embodiment, the first lens 2120 may be formed as a D-cut lens.

Holders 2210 and 2310 may comprise a plurality of protrusions 2211 and 2311. The holders 2210 and 2310 may comprise two protrusions 2211 and 2311 spaced apart from each other in the optical axis direction. The upper surfaces of each of the two protrusions 2211 and 2311 may comprise flat surfaces 2211-1 and 2311-1 and inclined surfaces 2211-2 and 2311-2 inclined from the flat surfaces 2211-1 and 2311-1.

The moving parts 2200 and 2300 may comprise rail grooves 2212 and 2312 in which the balls 2500 are disposed. The length of the rail grooves 2212 and 2312 of the moving parts 2200 and 2300 (refer to a of FIG. 57) may be two to four times the diameter of the ball 2500. The length of the rail grooves 2212 and 2312 of the moving parts 2200 and 2300 may be 2.5 to 3.5 times the diameter of the ball 2500. The length of the rail grooves 2212 and 2312 of the moving parts 2200 and 2300 may be approximately three times the diameter of the ball 2500. The ball 2500 may move with a certain degree of freedom in the lengthy direction. Through this, the rolling properties of the ball 2500 may be enhanced. That is, a phenomenon in which the ball 2500 is being pushed without being rolled may be minimized. Through this, the driving performance of the moving parts 2200 and 2300 such as linearity and hysteresis may be enhanced.

The rail grooves 2212 and 2312 of the moving parts 2200 and 2300 may comprise a first rail groove and a second rail groove disposed on one side of the driving magnets 2411 and 2421, and a third rail groove and a fourth rail groove disposed on the other side of the driving magnets 2411 and 2421. The first rail groove and the second rail groove may be spaced apart from each other by a distance of one to four times the diameter of the ball 2500. The third rail groove and the fourth rail groove may be spaced apart by a distance of two to three times the diameter of the ball 2500. The third rail groove and the fourth rail groove may be spaced apart by a distance of 1.5 to 3.5 times the diameter of the ball 2500. If the distance between the rail grooves is too short, a plurality of balls may gather and cause tilting of the moving parts 2200 and 2300. That is, the present embodiment can inhibit a phenomenon in which a plurality of balls may be gathered and induce tilting of the moving parts 2200 and 2300.

The lens driving device 2000 may comprise a first moving part 2200. The first moving part 2200 may move against the fixed part 2100. At least a portion of the first moving part 2200 may be disposed between the fixed part 2100 and the second moving part 2300. The first moving part 2200 may move between the fixed part 2100 and the second moving part 2300.

The lens driving device 2000 may comprise a first holder 2210. The first moving part 2200 may comprise a first holder 2210. The first holder 2210 may be disposed inside the housing 2110. The first holder 2210 may move against the housing 2110. At least a portion of the first holder 2210 may be spaced apart from the housing 2110. The first holder 2210 may be in contact with the housing 2110. The first holder 2210 may be in contact with the housing 2110 when moving. Or, in the initial state, the first holder 2210 may be in contact with the housing 2110.

The first holder 2210 may comprise a protrusion 2211. The protrusion 2211 may be a test protrusion. The protrusion 2211 may be formed on the outer surface of the first holder 2210. The protrusion 2211 may be protruded from the first holder 2210. The protrusion 2211 can be seen from the outside through the first hole 2113 of the housing 2110. The protrusion 2211 may be used to test whether the lens driving device 2000 operates normally. The protrusion 2211 may comprise a flat surface 2211-1 and an inclined surface 2211-2.

The first holder 2210 may comprise a rail groove 2212. A ball 2500 may be disposed in the rail groove 2212. In the rail groove 2212, the ball 2500 may be moved by rolling. The rail groove 2212 and the ball 2500 may be in contact at two points. The rail groove 2212 may be disposed in an optical axis direction. The rail groove 2212 may be extended in an optical axis direction.

The rail groove 2212 may comprise a plurality of rail grooves. The rail groove 2212 may comprise four rail grooves. The rail groove 2212 may comprise first to fourth rail grooves. One or more balls 2500 may be disposed in each of the plurality of rail grooves 2212.

The first holder 2210 may comprise a protrusion 2213. The protrusion 2213 may be formed on the surface facing the first housing 2110-1 of the first holder 2210. The first holder 2210 may comprise a first surface facing the first housing 2110-1, and a plurality of protrusions 2213 formed on the first surface and being in contact with the first housing 2110-1. The protrusion 2213 may be in contact with the first housing 2110-1 when the first holder 2210 moves in a direction getting closer to the first housing 2110-1. At this time, when the protrusion 2213 is formed, the contact area between the first holder 2210 and the first housing 2110-1 can be reduced compared to the case where the protrusion 2213 is omitted. Through this, shock and noise generated due to the contact between the first holder 2210 and the first housing 2110-1 can be minimized.

The lens driving device 2000 may comprise a second lens 2220. Or, the second lens 2220 may be described as one configuration of the camera device 10 rather than one configuration of the lens driving device 2000. The first moving part 2200 may comprise a second lens 2220. The second lens 2220 may be disposed in an optical axis. The second lens 2220 may be disposed between the reflective member 1220 and the image sensor 3400. The second lens 2220 may be disposed between the first lens 2120 and the third lens 2320. The second lens 2220 may be disposed in the first holder 2210. The second lens 2220 may be coupled to the first holder 2210. The second lens 2220 may be fixed to the first holder 2210. The second lens 2220 may move against the first lens 2120. The second lens 2220 may move separately from the third lens 2320.

The second lens 2220 may be a second lens group. The second lens 2220 may comprise a plurality of lenses. The second lens 2220 may comprise two lenses.

The lens driving device 2000 may comprise a second moving part 2300. The second moving part 2300 may move against the fixed part 2100. The second moving part 2300 may move separately from the first moving part 2200. The second moving part 2300 may be disposed at a rear side of the first moving part 2200. The second moving part 2300 may move in a direction getting closer to and away from the first moving part 2200.

The lens driving device 2000 may comprise a second holder 2310. The second moving part 2300 may comprise a second holder 2310. The second holder 2310 may be disposed inside the housing 2110. The second holder 2310 may move against the housing 2110. At least a portion of the second holder 2310 may be spaced apart from the housing 2110. The second holder 2310 may be in contact with the housing 2110. The second holder 2310 may be in contact with the housing 2110 when moving. Or, in the initial state, the second holder 2310 may be in contact with the housing 2110. The second holder 2310 may be in contact with the first holder 2210. The second holder 2310 may be spaced apart from the first holder 2210. The second holder 2310 may be in contact with the first holder 2210 when moving. Or, in the initial state, the second holder 2310 may be in contact with the first holder 2210.

The second holder 2310 may comprise a protrusion 2311. The protrusion 2311 may be a test protrusion. The protrusion 2311 may be formed on an outer surface of the second holder 2310. The protrusion 2311 may be protruded from the second holder 2310. The protrusion 2311 can be seen from the outside through the first hole 2113 of the housing 2110. The protrusion 2311 may be used to test whether the lens driving device 2000 operates normally. The protrusion 2311 may comprise a flat surface 2311-1 and an inclined surface 2311-2.

The second holder 2310 may comprise a rail groove 2312. A ball 2500 may be disposed in the rail groove 2312. In the rail groove 2312, the ball 2500 may move by rolling. The rail groove 2312 and the ball 2500 may be in contact at two points. The rail groove 2312 may be disposed in an optical axis direction. The rail groove 2312 may be extended in an optical axis direction.

The rail groove 2312 may comprise a plurality of rail grooves. The rail groove 2312 may comprise four rail grooves. The rail groove 2312 may comprise first to fourth rail grooves. One or more balls 2500 may be disposed in each of the plurality of rail grooves 2312.

The second holder 2310 may comprise a protrusion 2313. The protrusion 2313 may be formed on a surface facing the first holder 2210 of the second holder 2310. The second holder 2310 may comprise a second surface facing the first holder 2210 and a plurality of protrusions 2313 formed on a second surface and being in contact with the second holder 2310. The protrusion 2313 may be in contact with the first holder 2210 when the second holder 2310 moves in a direction getting closer to the first holder 2210. At this time, when the protrusion 2313 is formed, the contact area between the second holder 2310 and the first holder 2210 can be reduced compared to the case where the protrusion 2313 is omitted. Through this, the impact and noise generated due to the contact between the second holder 2310 and the first holder 2210 can be minimized.

The lens driving device 2000 may comprise a third lens 2320. Or, the third lens 2320 may be described as one configuration of the camera device 10 rather than one configuration of the lens driving device 2000. The second moving part 2300 may comprise a third lens 2320. The third lens 2320 may be disposed in an optical axis. The third lens 2320 may be disposed between the reflective member 1220 and the image sensor 3400. The third lens 2320 may be disposed between the second lens 2220 and the image sensor 3400. The third lens 2320 may be disposed in the second holder 2310. The third lens 2320 may be coupled to the second holder 2310. The third lens 2320 may be fixed to the second holder 2310. The third lens 2320 may move against the first lens 2120. The third lens 2320 may move separately from the second lens 2220.

The third lens 2320 may be a third lens group. The third lens 2320 may comprise a plurality of lenses. The third lens 2320 may comprise two lenses.

The lens driving device 2000 may comprise a driving unit 2400. The driving unit 2400 may move at least some of the plurality of lenses. The driving unit 2400 may move the first moving part 2200 and the second moving part 2300 against the fixed part 2100. The driving unit 2400 may comprise a coil and a magnet. The driving unit 2400 may move the first moving part 2200 and the second moving part 2300 through electromagnetic interaction. In a modified embodiment, the driving unit 2400 may comprise a shape memory alloy.

The driving unit 2400 may comprise driving magnets 2411 and 2421. The driving magnets 2411 and 2421 may be disposed in the moving parts 2200 and 2300. The driving magnets 2411 and 2421 may be disposed on the holders 2210 and 2310. The driving magnets 2411 and 2421 may comprise a first driving magnet 2411 disposed in the first moving part 2200 and a second driving magnet 2421 disposed in the second moving part 2300.

The driving unit 2400 may comprise coils 2412 and 2422. The coils 2412 and 2422 may be disposed on the substrate 2140. The coils 2412 and 2422 may be disposed at positions corresponding to the driving magnets 2411 and 2421.

The coils 2412 and 2422 may comprise a first coil 2412 disposed on the first substrate 2141 and being disposed at a position corresponding to the first driving magnet 2411. The coils 2412 and 2422 may comprise a second coil 2422 being disposed on the second substrate 2142 and being disposed at a position corresponding to the second driving magnet 2421.

When a current is applied to the first coil 2412, the first moving part 2200 may move to perform a zoom function. When a current is applied to the second coil 2422, the second moving part 2300 may move to perform an autofocus function.

The camera device 10 may comprise a driver IC 3900 electrically connected to the coils 2412 and 2422. The driver IC 3900 may be disposed on the printed circuit board 3300. That is, the driver IC 3900 may be disposed on a separate substrate from the substrate 2140 on which the coils 2412 and 2422 are disposed. Accordingly, the driver IC 3900 may not be electrically connected to the coils 2412 and 2422 before the printed circuit board 3300 is coupled to the lens driving device 2000.

The driving unit 2400 may comprise a first driving unit 2410. The first driving unit 2410 may move the first moving part 2200 against the fixed part 2100. The first driving unit 2410 may move the first moving part 2200 against the second moving part 2300. The first driving unit 2410 may be used to drive a zoom function. Or, the first driving unit 2410 may be used to drive an autofocus function.

The first driving unit 2410 may comprise a first driving magnet 2411. The first driving magnet 2411 may be disposed in the first moving part 2200. The first driving magnet 2411 may be disposed in the first holder 2210. The first driving magnet 2411 may be disposed on a side surface of the first holder 2210. The first driving magnet 2411 may be coupled to the first holder 2210. The first driving magnet 2411 may be fixed to the first holder 2210. The first driving magnet 2411 may be fixed to the first holder 2210 by an adhesive. The first driving magnet 2411 may move integrally with the first holder 2210. The first driving magnet 2411 may be disposed to face the first coil 2412. The first driving magnet 2411 may face the first coil 2412. The first driving magnet 2411 may be disposed at a position corresponding to the first coil 2412. The first driving magnet 2411 may interact with the first coil 2412. The first driving magnet 2411 may electromagnetically interact with the first coil 2412.

A portion of the first driving magnet 2411 may be overlapped with the second driving magnet 2421 in a first direction. A portion of the first driving magnet 2411 may be overlapped with the second driving magnet 2421 in a first direction perpendicular to the optical axis direction. The first driving magnet 2411 may comprise a portion not being overlapped with the second driving magnet 2421 in a first direction.

The first driving magnet 2411 may be formed to have the same size as the second driving magnet 2421. The first driving magnet 2411 may be disposed closer to the first lens 2120 than the second driving magnet 2421.

The first driving magnet 2411 may comprise a first magnet portion 2411-1. The first magnet portion 2411-1 may have a first polarity. The first driving magnet 2411 may comprise a second magnet portion 2411-2. The second magnet portion 2411-2 may have a second polarity different from the first polarity. At this time, the first polarity may be an N pole and the second polarity may be an S pole. Conversely, the first polarity may be an S pole and the second polarity may be an N pole.

The first driving magnet 2411 may comprise a neutral portion 2411-3. The neutral portion 2411-3 may be disposed between the first magnet portion 2411-1 and the second magnet portion 2411-2. The neutral portion 2411-3 may have a neutral polarity. The neutral portion 2411-3 may be a portion not being magnetized. In the present embodiment, the performance of the sensitivity and linearity of the output signal can be enhanced with the two Hall sensors and a void of the magnet. The void of the magnet may be smaller than the hollow of the coil. As a modified embodiment, two single-pole magnets can be used without a neutral portion and a void.

The first driving magnet 2411 may comprise a first magnet portion 2411-1 having an N pole and an S pole. The first driving magnet 2411 may comprise a second magnet portion 2411-2 having an N pole and an S pole. The first driving magnet 2411 may comprise a neutral portion 2411-3 or a void disposed between the first magnet portion 2411-1 and the second magnet portion 2411-2. The first magnet portion 2411-1 may comprise a region having an N pole and a region having an S pole. The second magnet portion 2411-2 may comprise a region having an N pole and a region having an S pole. The neutral portion 2411-3 or void may have a neutral polarity. In an optical axis direction, the size of the neutral portion 2411-3 or void (refer to b of FIG. 64) is smaller than the size of the hollow of the first coil 2412 (refer to a of FIG. 64) and may be greater than the distance between the first Hall sensor 2413 and the second Hall sensors 2414 (refer to c of FIG. 64).

The first driving unit 2410 may comprise a first coil 2412. The first coil 2412 may be disposed in the fixed part 2100. The first coil 2412 may be disposed at a position corresponding to the first driving magnet 2411. The first coil 2412 may be disposed on the substrate 2140. The first coil 2412 may be disposed on the first substrate 2141. The first coil 2412 may be disposed in the housing 2110. The first coil 2412 may be disposed at an outer side of the first holder 2210. When a current is applied to the first coil 2412, an electromagnetic field is formed around the first coil 2412 to interact with the first driving magnet 2411.

As a modified embodiment, the first coil 2412 may be disposed on the first holder 2210 and the first driving magnet 2411 may be disposed in the housing 2110.

In an optical axis direction, the center of the first coil 2412 may be disposed further forward than the center of the second coil 2422. A portion of the first coil 2412 may be overlapped with the second coil 2422 in a first direction perpendicular to the optical axis direction. The first coil 2412 may comprise a portion not being overlapped with the second coil 2422 in a first direction. Another portion of the first coil 2412 may not be overlapped with the second coil 2422 in a first direction. The first coil 2412 may be formed to have the same size as the second coil 2422. The first coil 2412 may be disposed closer to the first lens 2120 than the second coil 2422. In an optical axis direction and a second direction perpendicular to the first direction, the center of the first coil 2412 may be disposed at a height corresponding to the center of the second coil 2422. At this time, the first direction may be an x-axis direction. The second direction may be a y-axis direction.

The centers of the coils 2412 and 2422 may be located at the center of the driving region. Since the strokes of the first moving part 2200 and the second moving part 2300 for implementing the function in the present embodiment are different, the position of the first coil 2412 and the position of the second coil 2422 may not be symmetrical.

The first coil 2412 may be formed in a ring shape. The first coil 2412 may be formed as a square ring or a circular ring. Even when the first coil 2412 is formed in a rectangular ring shape, the corner portion may be formed to be curved. The first coil 2412 may comprise a first portion 2412-1 and a second portion 2412-2 having a gap G1 therebetween. First and second Hall sensors 2413 and 2414 may be disposed in the gap G1 of the first coil 2412.

The first coil 2412 may comprise a first portion 2412-1 facing the first magnet portion 2411-1. The first coil 2412 may comprise a second portion 2412-2 facing the second magnet portion 2411-2. The first portion 2412-1 of the first coil 2412 may not be overlapped with the second magnet portion 2411-2 in a first direction. The second portion 2412-2 of the first coil 2412 may not be overlapped with the first magnet portion 2411-1 in a first direction. At this time, the first direction may be an x-axis direction.

The lens driving device 2000 may comprise a Hall sensor. The Hall sensor may detect the first driving magnet 2411. The Hall sensor may comprise a plurality of Hall sensors. The Hall sensor may comprise a first Hall sensor 2413 and a second Hall sensor 2414. The first Hall sensor 2413 and the second Hall sensor 2414 may be spaced apart from each other. The first Hall sensor 2413 and the second Hall sensor 2414 may be spaced apart to form a gap G2 therebetween. The first Hall sensor 2413 and the second Hall sensor 2414 may detect the first driving magnet 2411. The first Hall sensor 2413 and the second Hall sensor 2414 may detect a magnetic force of the first driving magnet 2411. The first Hall sensor 2413 and the second Hall sensor 2414 may detect the position of the first holder 2210. The first Hall sensor 2413 and the second Hall sensor 2414 may detect the position of the second lens 2220. The Hall sensor may be disposed on the substrate 2140. The Hall sensor may be disposed in the hollow of the coils 2412 and 2422.

The lens driving device 2000 may comprise a yoke 2415. The yoke 2415 may be disposed between the first driving magnet 2411 and the first holder 2210. The yoke 2415 may be disposed between the first driving magnet 2411 and the first moving part 2200. The yoke 2415 may be formed in a shape corresponding to the first driving magnet 2411. The yoke 2415 may increase the interaction force between the first driving magnet 2411 and the first coil 2412. The yoke 2415 may surround at least three surfaces of the first driving magnet 2411.

The yoke 2415 may comprise an extension portion 2415-1. The extension portion 2415-1 may surround the front and rear side surfaces of the first driving magnet 2411. The yoke 2415 may comprise a groove 2415-2. The groove 2415-2 may be formed in the central portion of the body portion of the yoke 2415.

The driving unit 2400 may comprise a second driving unit 2420. The second driving unit 2420 may move the second moving part 2300 against the fixed part 2100. The second driving unit 2420 may move the second moving part 2300 against the first moving part 2200. The second driving unit 2420 may be used to drive the auto focus function. Or, the second driving unit 2420 may be used to drive the zoom function.

The second driving unit 2420 may comprise a second driving magnet 2421. The second driving magnet 2421 may be disposed in the second moving part 2300. The second driving magnet 2421 may be disposed in the second holder 2310. The second driving magnet 2421 may be disposed on a side surface of the second holder 2310. The second driving magnet 2421 may be coupled to the second holder 2310. The second driving magnet 2421 may be fixed to the second holder 2310. The second driving magnet 2421 may be fixed to the second holder 2310 by an adhesive. The second driving magnet 2421 may move integrally with the second holder 2310. The second driving magnet 2421 may be disposed to face the second coil 2422. The second driving magnet 2421 may face the second coil 2422. The second driving magnet 2421 may be disposed at a position corresponding to the second coil 2422. The second driving magnet 2421 may interact with the second coil 2422. The second driving magnet 2421 may electromagnetically interact with the second coil 2422.

The second driving unit 2420 may comprise a second coil 2422. The second coil 2422 may be disposed in the fixed part 2100. The second coil 2422 may be disposed at a position corresponding to the second driving magnet 2421. The second coil 2422 may be disposed on the substrate 2140. The second coil 2422 may be disposed on the second substrate 2142. The second coil 24222 may be disposed in the housing 2110. The second coil 2422 may be disposed outside the second holder 2310. When a current is applied to the second coil 2422, an electromagnetic field is formed around the second coil 2422 to interact with the second driving magnet 2421.

As a modified embodiment, the second coil 2422 may be disposed on the second holder 2310 and the second driving magnet 2421 may be disposed on the housing 2110.

The lens driving device 2000 may comprise a Hall sensor. The Hall sensor may detect the second driving magnet 2421. The Hall sensor may comprise a plurality of Hall sensors. The Hall sensor may comprise a third Hall sensor 2423 and a fourth Hall sensor 2424. The third Hall sensor 2423 and the fourth Hall sensor 2424 may be spaced apart from each other. The third Hall sensor 2423 and the fourth Hall sensor 2424 may be spaced apart to form a gap G2 therebetween. The third Hall sensor 2423 and the fourth Hall sensor 2424 may detect the second driving magnet 2421. The third Hall sensor 2423 and the fourth Hall sensor 2424 may detect a magnetic force of the second driving magnet 2421. The third Hall sensor 2423 and the fourth Hall sensor 2424 may detect the position of the second holder 2310. The third Hall sensor 2423 and the fourth Hall sensor 2424 may detect the position of the third lens 2320.

The lens driving device 2000 may comprise a yoke 2425. The yoke 2425 may be disposed between the second driving magnet 2421 and the second holder 2310. The yoke 2425 may be formed to have a shape corresponding to that of the second driving magnet 2421. The yoke 2425 may increase the interaction force between the second driving magnet 2421 and the second coil 2422.

The lens driving device 2000 may comprise a first yoke 2430. The first yoke 2430 may be a magnetic material. The first yoke 2430 may be disposed such that an attractive force acts between the first yoke 2430 and the first driving magnet 2411. The first yoke 2430 may be disposed in the housing 2110. The first yoke 2430 may be disposed on the substrate 2140. The first yoke 2430 may be disposed on the first substrate 2141. The first holder 2210 may press the ball 2500 toward the guide rail 2130 by an attractive force between the first driving magnet 2411 and the first yoke 2430. That is, the ball 2500 may be maintained between the first holder 2210 and the guide rail 2130 without being separated and removed by the attractive force between the first driving magnet 2411 and the first yoke 2430.

In a second direction perpendicular to the optical axis direction and a first direction, the width of the first yoke 2430 may be greater than the width of the first surface of the first driving magnet 2411 facing the first surface of the first yoke 2430.

The lens driving device 2000 may comprise a second yoke 2440. The second yoke 2440 may be a magnetic material. The second yoke 2440 may be disposed such that an attractive force acts between the second yoke 2440 and the second driving magnet 2421. The second yoke 2440 may be disposed in the housing 2110. The second yoke 2440 may be disposed on the substrate 2140. The second yoke 2440 may be disposed on the second substrate 2142. The second holder 2310 may press the ball 2500 toward the guide rail 2130 by an attractive force between the second driving magnet 2421 and the second yoke 2440. That is, the ball 2500 may be maintained between the second holder 2310 and the guide rail 2130 without being separated and removed by the attractive force between the second driving magnet 2421 and the second yoke 2440.

In a second direction perpendicular to the optical axis direction and the first direction, the width of the second yoke 2440 may be greater than the width of the first surface of the second driving magnet 2421 facing the first surface of the second yoke 2440.

The lens driving device 2000 may comprise a ball 2500. The ball 2500 may guide the movement of the first holder 2210. The ball 2500 may be disposed between the guide rail 2130 and the moving parts 2200 and 2300. The ball 2500 may be disposed between the first holder 2210 and the guide rail 2130. The ball 2500 may guide the movement of the second holder 2310. The ball 2500 may be disposed between the second holder 2310 and the guide rail 2130. The ball 2500 may be formed in a spherical shape. The ball 2500 may roll over the rail groove 2212 of the first holder 2210 and the rail 2133 of the guide rail 2130. The ball 2500 may move in an optical axis direction between the rail groove 2212 of the first holder 2210 and the rail 2133 of the guide rail 2130. The ball 2500 may roll over the rail groove 2312 of the second holder 2310 and the rail 2133 of the guide rail 2130. The ball 2500 may move in an optical axis direction between the rail groove 2312 of the second holder 2310 and the rail 2133 of the guide rail 2130. The ball 2500 may comprise a plurality of balls. The ball 2500 may be provided a total of eight, four in the first holder 2210 and four in the second holder 2310.

The lens driving device 2000 may comprise a dummy glass 2600. The dummy glass 2600 may be disposed in the housing 2110. The dummy glass 2600 may close the rear opening of the housing 2110. The dummy glass 2600 may be formed to be transparent to allow light to pass therethrough.

The lens driving device 2000 may comprise a poron 2700. The poron 2700 may be a shock absorbing member. The poron 2700 may be disposed in the fixed part 2100. The poron 2700 may be disposed in the housing 2110. The poron 2700 may be disposed in the first housing 2110-1. The poron 2700 may be in contact with the first holder 2210. The poron 2700 may be in contact with the second holder 2310. The poron 2700 may be disposed in the second housing 2110-2. The poron 2700 can minimize the shock and noise generated by the movement of the first holder 2210 and the second holder 2310. The poron 2700 may be disposed at a portion where the first holder 2210 collides with the housing 2110. The poron 2700 may be disposed at a portion where the second holder 2310 collides with the housing 2110.

The lens driving device 2000 may comprise a shock absorbing member. The shock absorbing member may be formed of rubber. The shock absorbing member may be formed of silicon.

In the present embodiment, it is possible to minimize noise and inhibit damage to the injection product by using poron tape as a stopper. Due to the structure, where it is difficult to attach poron tape such as between the first moving part 2200 and the second moving part 2300 and between the moving part 1200 of the reflective member driving device 1000, noise can be minimized and inhibit damage to the injection molding product through a protrusion structure.

Figure 66:
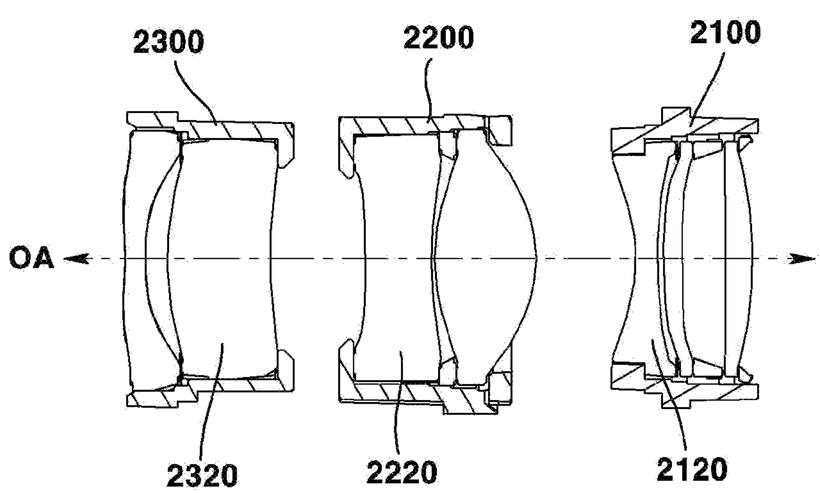
FIGS. 66 to 68 are diagrams for explaining implementation of a zoom function and an autofocus function of a lens driving device according to the present embodiment.
Figure 67:
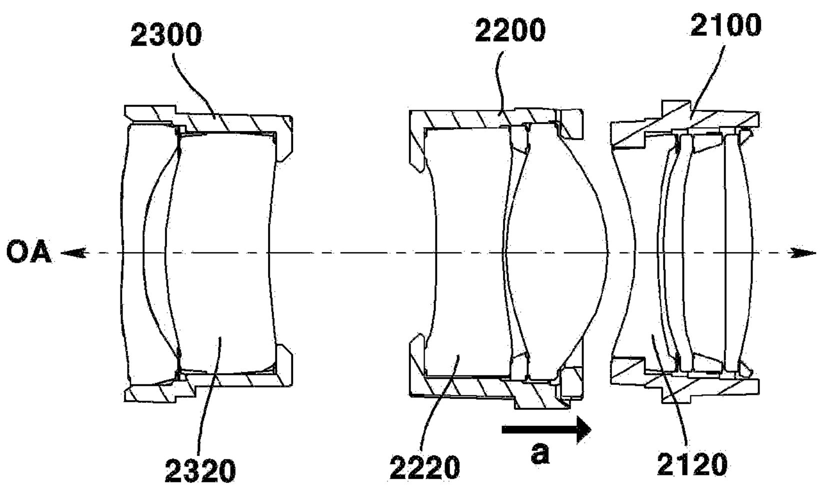
Figure 68:
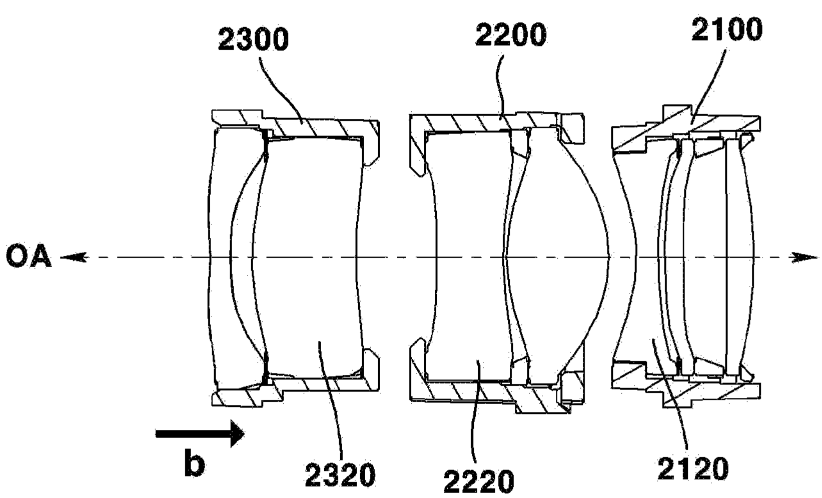

FIGS. 66 to 68 are diagrams for explaining implementation of a zoom function and an autofocus function of a lens driving device according to the present embodiment.

In the present embodiment, the first lens 2120, the second lens 2220, and the third lens 2320 may be disposed in a state aligned with the optical axis OA in the initial state in which current is not supplied to the driving unit 2400 (refer to FIG. 66).

At this time, when a current is applied to the first coil 2412, the second lens 2220 may move along the optical axis OA due to electromagnetic interaction between the first coil 2412 and the first driving magnet 2411 (refer to a of FIG. 67). As the second lens 2220 moves while the first lens 2120 is being fixed, a zoom function may be performed. When a current in a first direction is applied to the first coil 2412, the second lens 2220 may move in a direction getting closer to the first lens 2120. When a current in a second direction opposite to the first direction is applied to the first coil 2412, the second lens 2220 may move in a direction getting away from the first lens 2120.

Meanwhile, when a current is applied to the second coil 2422, the third lens 2320 may move along the optical axis OA due to electromagnetic interaction between the second coil 2422 and the second driving magnet 2421 (refer to FIG. 68 *b*). An auto focus (AF) function may be performed by relative movement of the third lens 2320 against the first lens 2120 and the second lens 2220. When a current in a first direction is applied to the second coil 2422, the third lens 2320 may move in a direction getting closer to the first lens 2120, and when a current in a second direction opposite to the first direction is applied to the second coil 2422, the third lens 2320 may move in a direction getting away from the first lens 2120.

The lens driving device 2000 described above may be replaced with the lens driving device of FIGS. 73 to 79, which will be described later. That is, the reflective member driving device 1000 of the present embodiment and the lens driving device of FIGS. 73 to 79 may be disposed together.

Hereinafter, a camera device according to the present embodiment will be described with reference to the drawings.

Figure 1:
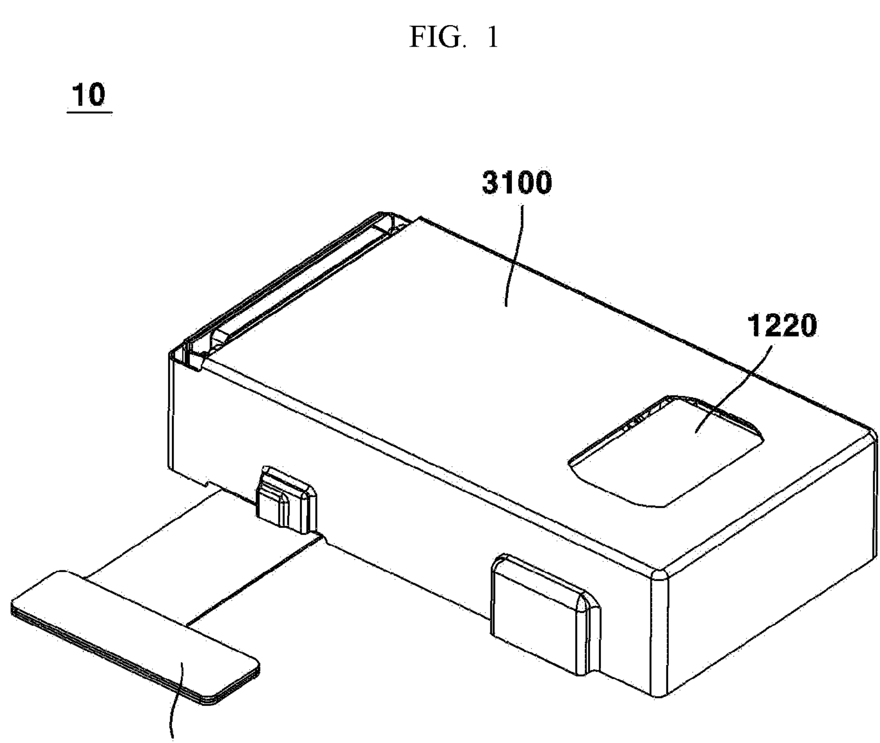
FIG. 1 is a perspective view of a camera device according to the present embodiment.
Figure 2:
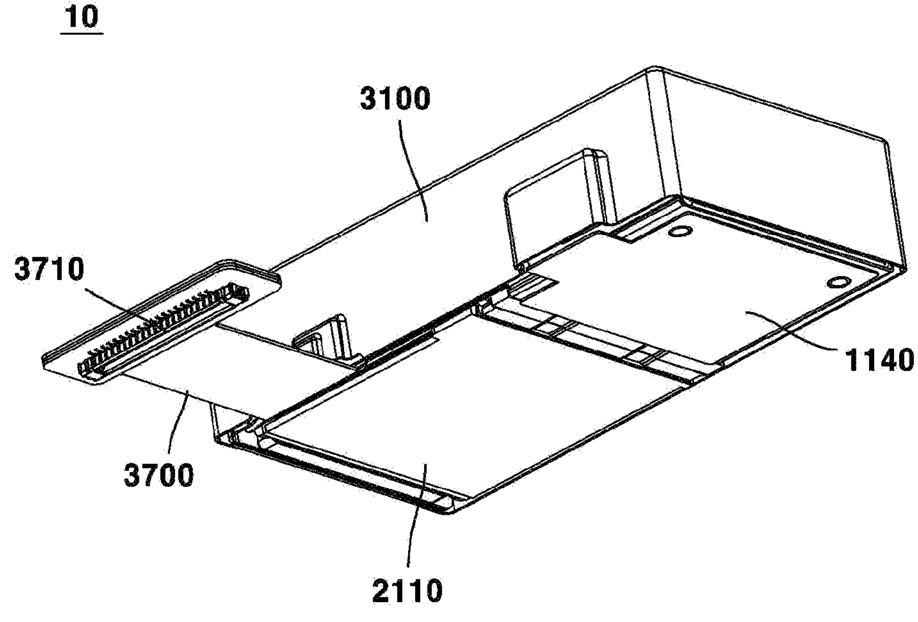
FIG. 2 is a bottom perspective view of a camera device according to the present embodiment.
Figure 3:
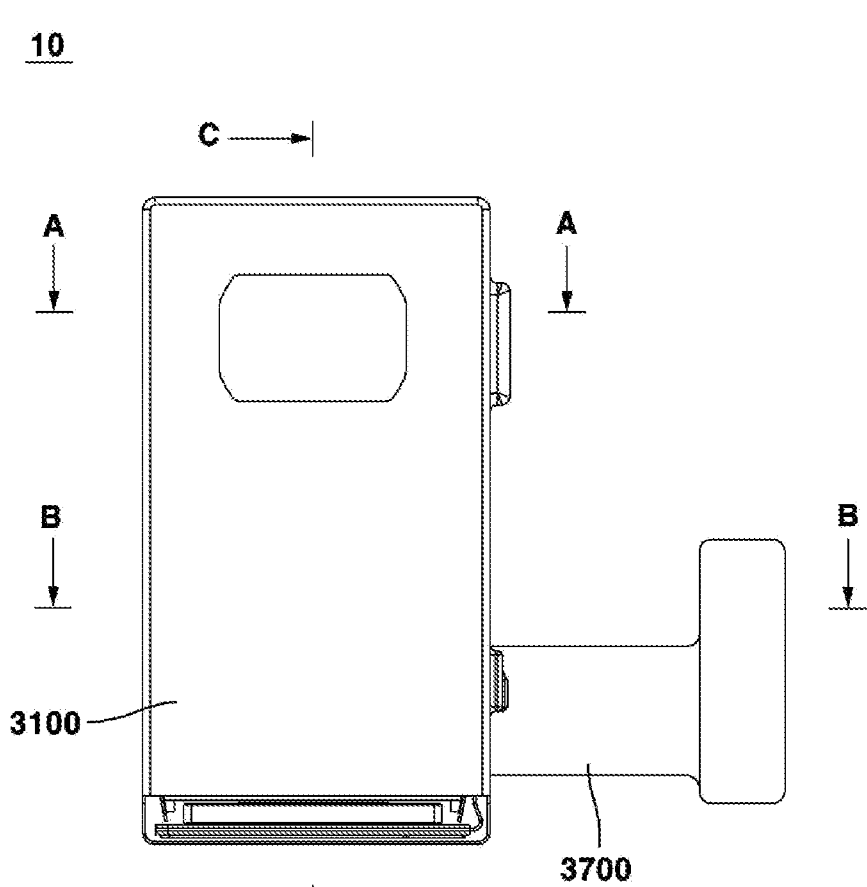
FIG. 3 is a flat surface diagram of a camera device according to the present embodiment.
Figure 4:
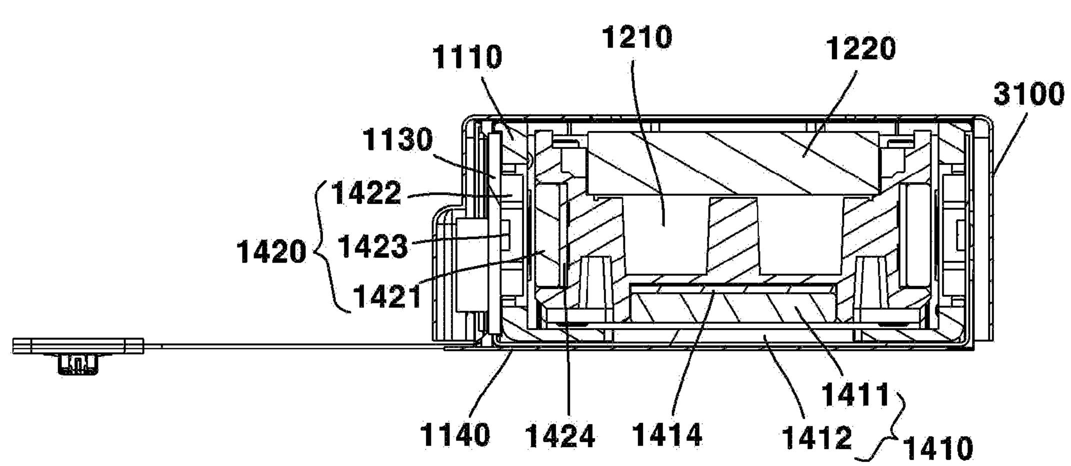
FIG. 4 is a cross-sectional view taken along line A-A of FIG. 3.
Figure 5:
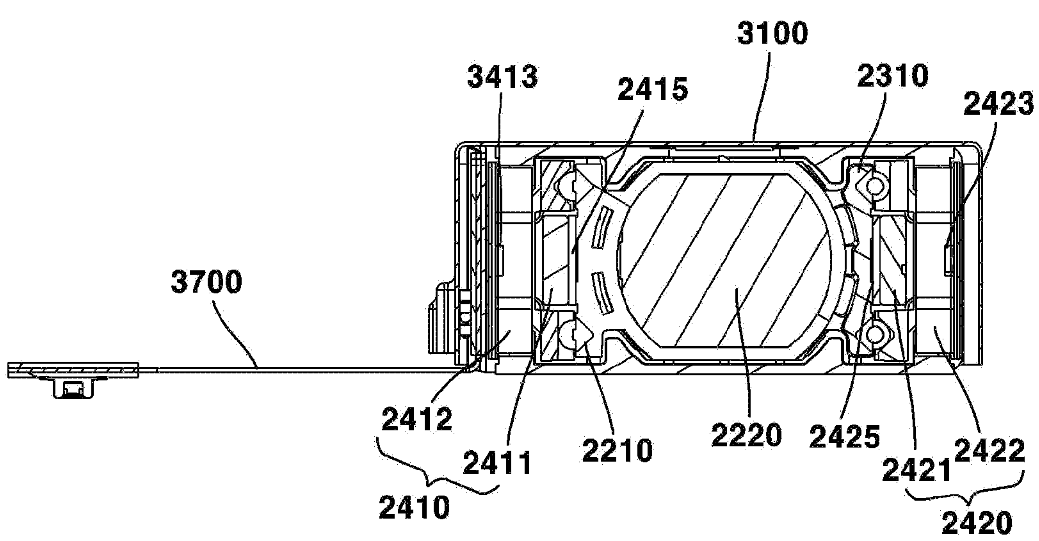
FIG. 5 is a cross-sectional view taken along line B-B of FIG. 3.
Figure 6:
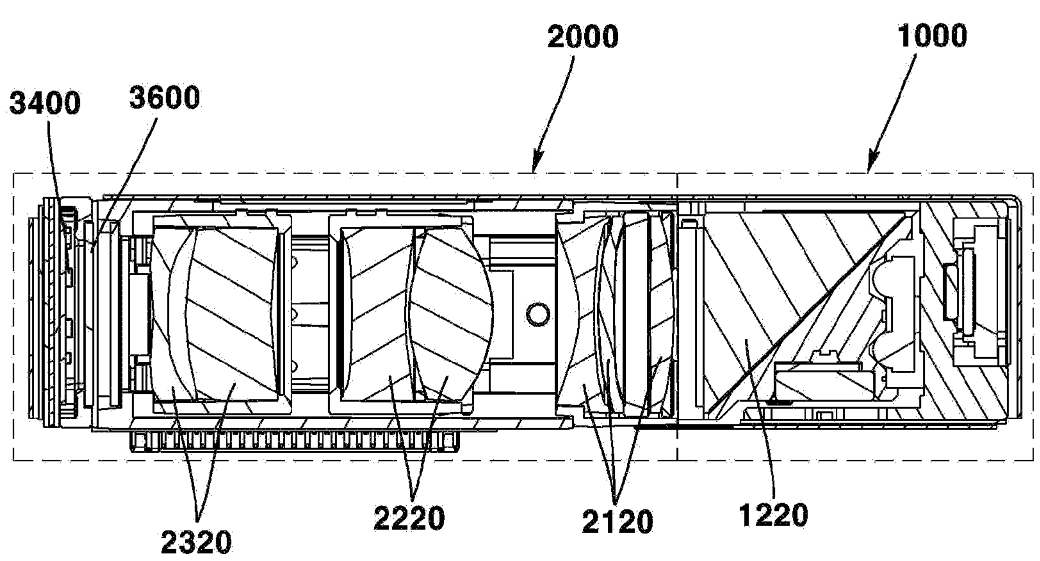
FIG. 6 is a cross-sectional view taken along line C-C of FIG. 3.
Figure 7:
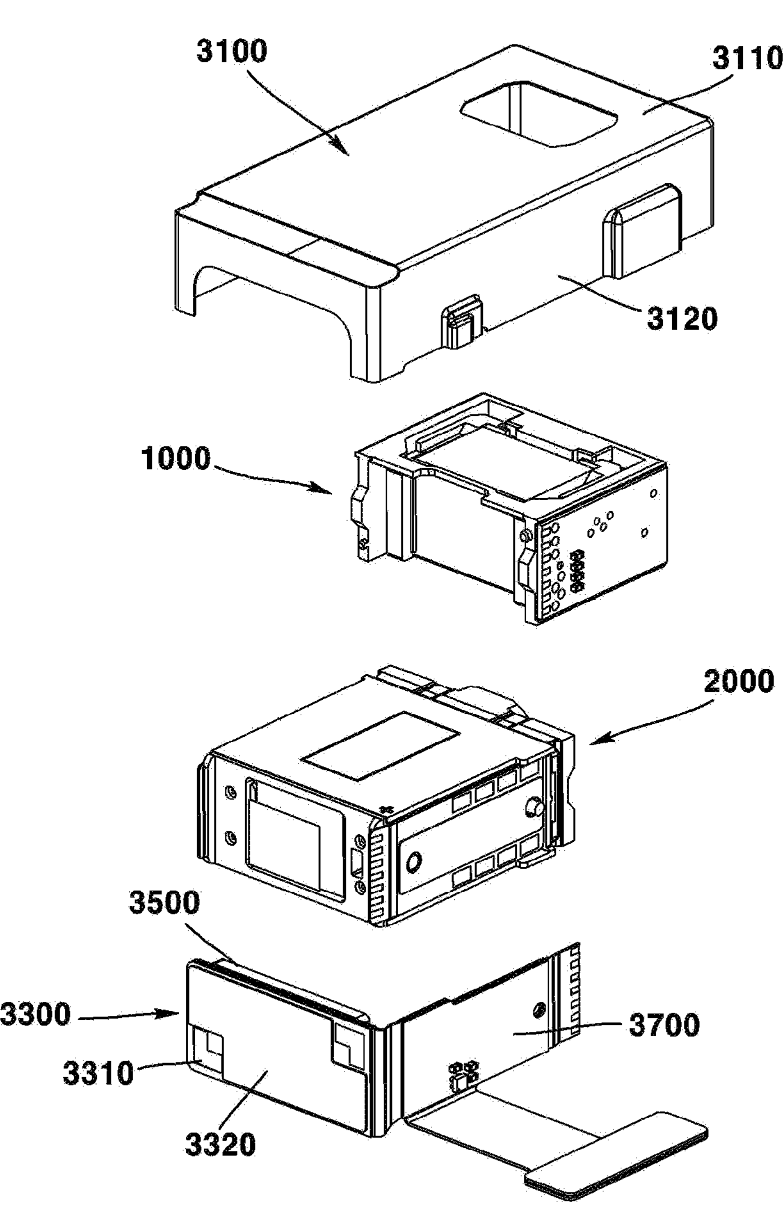
FIG. 7 is an exploded perspective view of a camera device according to the present embodiment.
Figure 8:
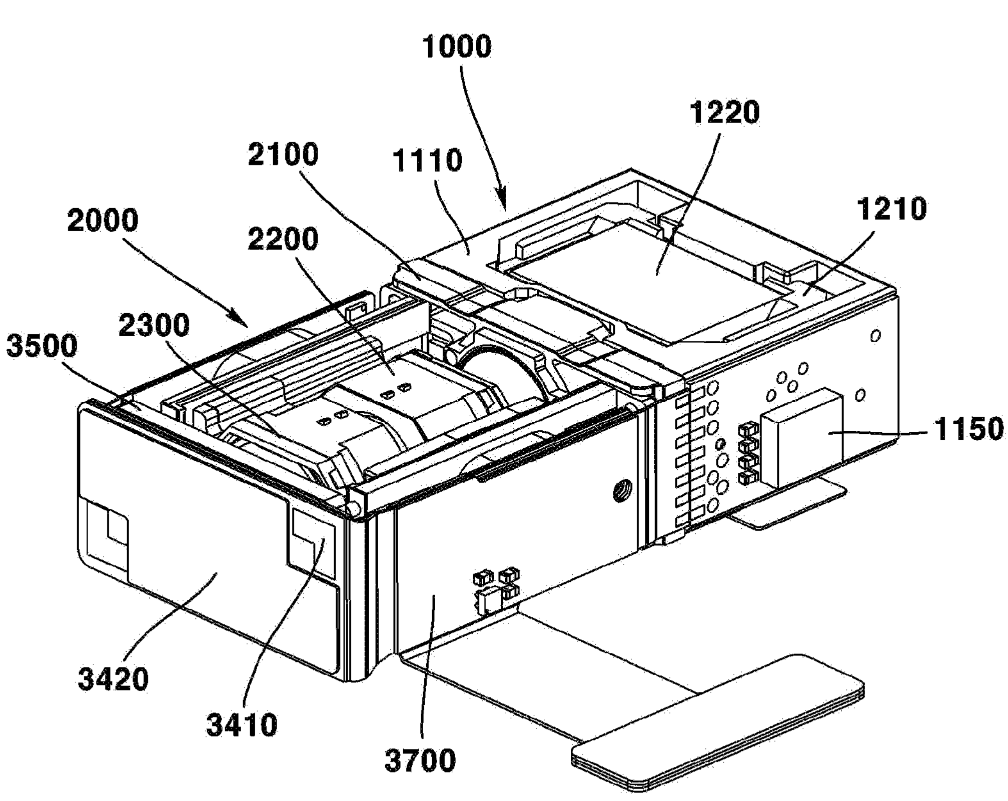
FIG. 8 is a perspective view in which the cover member is omitted from a camera device according to the present embodiment.
Figure 69:
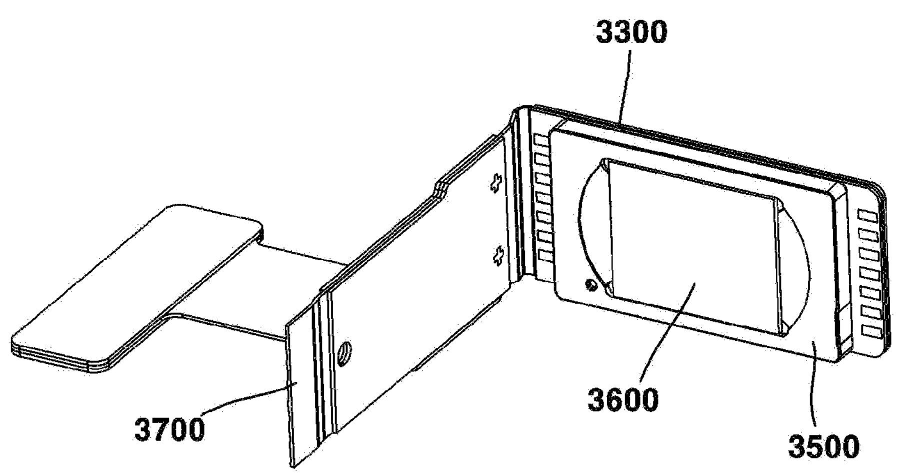
FIG. 69 is a perspective view of a partial configuration of a camera device according to the present embodiment.
Figure 70:
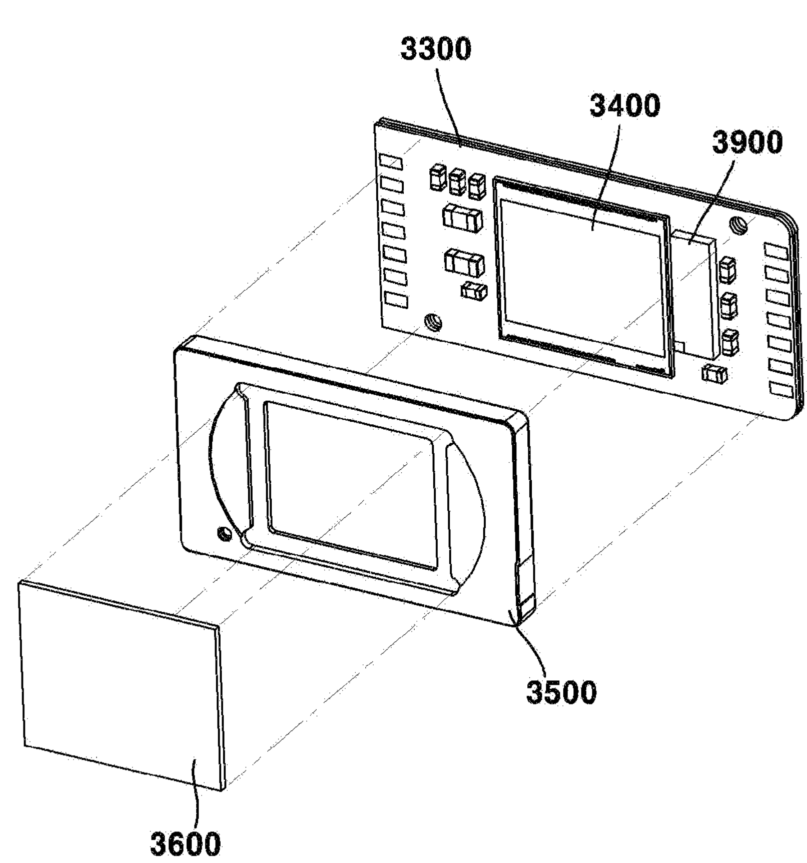
FIG. 70 is an exploded perspective view of an image sensor, a filter, and a related configuration of a camera device according to the present embodiment.

FIG. 1 is a perspective view of a camera device according to the present embodiment; FIG. 2 is a bottom perspective view of a camera device according to the present embodiment; FIG. 3 is a flat surface diagram of a camera device according to the present embodiment; FIG. 4 is a cross-sectional view taken along line A-A of FIG. 3; FIG. 5 is a cross-sectional view taken along line B-B of FIG. 3; FIG. 6 is a cross-sectional view taken along line C-C of FIG. 3; FIG. 7 is an exploded perspective view of a camera device according to the present embodiment; FIG. 8 is a perspective view in which the cover member is omitted from a camera device according to the present embodiment; FIG. 69 is a perspective view of a partial configuration of a camera device according to the present embodiment; and FIG. 70 is an exploded perspective view of an image sensor, a filter, and a related configuration of a camera device according to the present embodiment.

The camera device 10 may comprise a cover member 3100. The cover member 3100 may be a 'cover can' or a 'shield can'. The cover member 3100 may be disposed to cover the reflective member driving device 1000 and the lens driving device 2000. The cover member 3100 may be disposed at an outer side of the reflective member driving device 1000 and the lens driving device 2000. The cover member 3100 may surround the reflective member driving device 1000 and the lens driving device 2000. The cover member 3100 may accommodate the reflective member driving device 1000 and the lens driving device 2000. The cover member 3100 may be formed of a metal material. The cover member 3100 may block electromagnetic interference (EMI). An insulating epoxy may be applied to inhibit contact between the solder and the shield can.

The cover member 3100 may comprise an upper plate 3110. The upper plate 3110 may comprise an opening or a hole. Light may be incident through the opening or hole of the upper plate 3110. An opening or a hole in the upper plate 3110 may be formed at a position corresponding to the reflective member 1220.

The cover member 3100 may comprise a side plate 3120. The side plate 3120 may comprise a plurality of side plates. The side plate 3120 may comprise four side plates. The side plate 3120 may comprise first to fourth side plates. The side plate 3120 may comprise first and second side plates disposed opposite to each other, and third and fourth side plates disposed opposite to each other.

The camera device 10 may comprise a printed circuit board 3300 (PCB). The printed circuit board 3300 may be a board or a circuit board. A sensor base 3500 may be disposed on the printed circuit board 3300. The printed circuit board 3300 may be electrically connected to the reflective member driving device 1000 and the lens driving device 2000. The printed circuit board 3300 may be provided with various circuits, elements, control units, and the like to convert an image formed on the image sensor 3400 into an electrical signal and transmit it to an external device.

The printed circuit board 3300 may comprise a marking unit 3310. The marking unit 3310 may be disposed on the rear surface of the printed circuit board 3300.

The camera device 10 may comprise a suspension (SUS) 3320. The suspension 3320 may be disposed on a rear surface of the printed circuit board 3300. The suspension 3320 may reinforce the strength of the printed circuit board 3300. The suspension 3320 may radiate heat generated in the printed circuit board 3300.

The camera device 10 may comprise an image sensor 3400. The image sensor 3400 may be disposed on the printed circuit board 3300. Light passing through the lens and filter 3600 may be incident to the image sensor 3400 to form an image. The image sensor 3400 may be electrically connected to the printed circuit board 3300. For example, the image sensor 3400 may be coupled to the printed circuit board 3300 by a surface mounting technology (SMT). As another example, the image sensor 3400 may be coupled to the printed circuit board 3300 by flip chip technology. The image sensor 3400 may be disposed so that the lens and the optical axis coincide. The optical axis of the image sensor 3400 and the optical axis of the lens may be aligned. The image sensor 3400 may convert light irradiated to the effective image area of the image sensor 3400 into an electrical signal. The image sensor 3400 may comprise any one or more among a charge coupled device (CCD), a metal oxide semi-conductor (MOS), a CPD, and a CID.

The camera device 10 may comprise a sensor base 3500. The sensor base 3500 may be disposed on the printed circuit board 3300. A filter 3600 may be disposed on the sensor base 3500. An opening may be formed in a portion of the sensor base 3500 where the filter 3600 is disposed so that light passing through the filter 3600 may be incident on the image sensor 3400.

The camera device 10 may comprise a filter 3600. The filter 3600 may serve to block light of a specific frequency band from being incident on the image sensor 3400 in light passing through the lens. The filter 3600 may be disposed between the lens and the image sensor 3400. The filter 3600 may be disposed on the sensor base 3500. The filter 3600 may comprise an infrared filter. The infrared filter may block light in the infrared region from being incident on the image sensor 3400. The filter 3600 may be disposed opposite to the image sensor 3400 with respect to the sensor base 3500. A part of the filter 3600 may be protruded from the sensor base 3500.

The camera device 10 may comprise a substrate 3700. The substrate 3700 may be connected to the printed circuit board 3300. The substrate 3700 may be extended from the printed circuit board 3300. The substrate 3700 may comprise a terminal electrically connected to the reflective member driving device 1000. The substrate 3700 may comprise an extension portion being extended outward.

The camera device 10 may comprise a connector 3710. The connector 3710 may be disposed on the board 3700. The connector 3710 may be disposed on a lower surface of the extension portion of the board 3700. The connector 3710 may be connected to, for example, a power supply unit of a smartphone.

The camera device 10 may comprise a temperature sensor 3800. The temperature sensor 3800 may be disposed on the substrate 2140. The temperature sensor 3800 may be disposed adjacent to the coils 2412 and 2422. The temperature sensor 3800 may be disposed to be overlapped with the coils 2412 and 2422. The coils 2412 and 2422 may be driven and generate heat. The temperature sensor 3800 may detect heat generated by the coils 2412 and 2422. The temperature sensor 3800 is disposed adjacent to the coils 2412 and 2422 to check the degree of heat generation. The temperature sensor 3800 may detect a temperature. A compensation value may be applied to the zoom and/or auto focus (AF) operation according to the degree of heat detected by the temperature sensor 3800. The temperature detected by the temperature sensor 3800 may be used for more accurate control of any one or more among a handshake correction function, an autofocus function, and a zoom function.

The camera device 10 may comprise a driver IC 3900. The driver IC 3900 may be electrically connected to the lens driving device 2000. The driver IC 3900 may be described as one configuration of the lens driving device 2000. The driver IC 3900 may be electrically connected to the first coil 2412 and the second coil 2422 of the lens driving device 2000. The driver IC 3900 may supply current to the first coil 2412 and the second coil 2422 of the lens driving device 2000. The driver IC 3900 may control at least one of a voltage or a current applied to each of the first coil 2412 and the second coil 2422 of the lens driving device 2000. The driver IC 3900 may be electrically connected to the Hall sensors 2413, 2414, 2423, and 2424. The driver IC 3900 may perform feedback control of the voltage and current applied to the first coil 2412 and the second coil 2422 through the positions of the second lens 2220 and the third lens 2320 detected by the Hall sensors 2413, 2414, 2423, and 2424.

Hereinafter, an optical device according to the present embodiment will be described with reference to the drawings.

Figure 71:
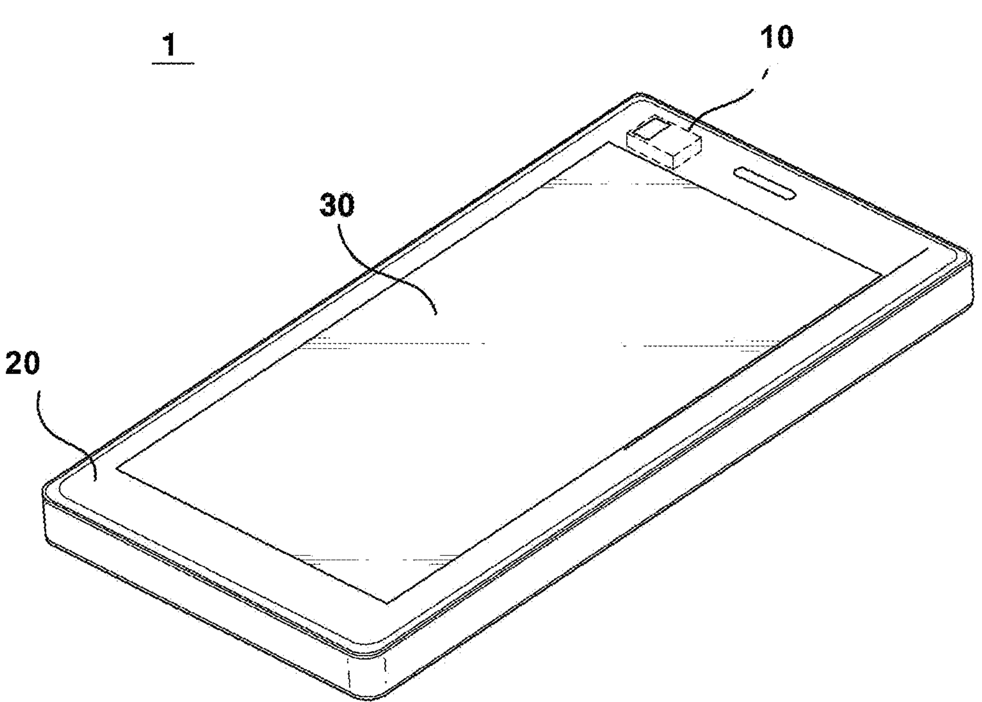
FIG. 71 is a perspective view of the front side of an optical device according to the present embodiment.
Figure 72:
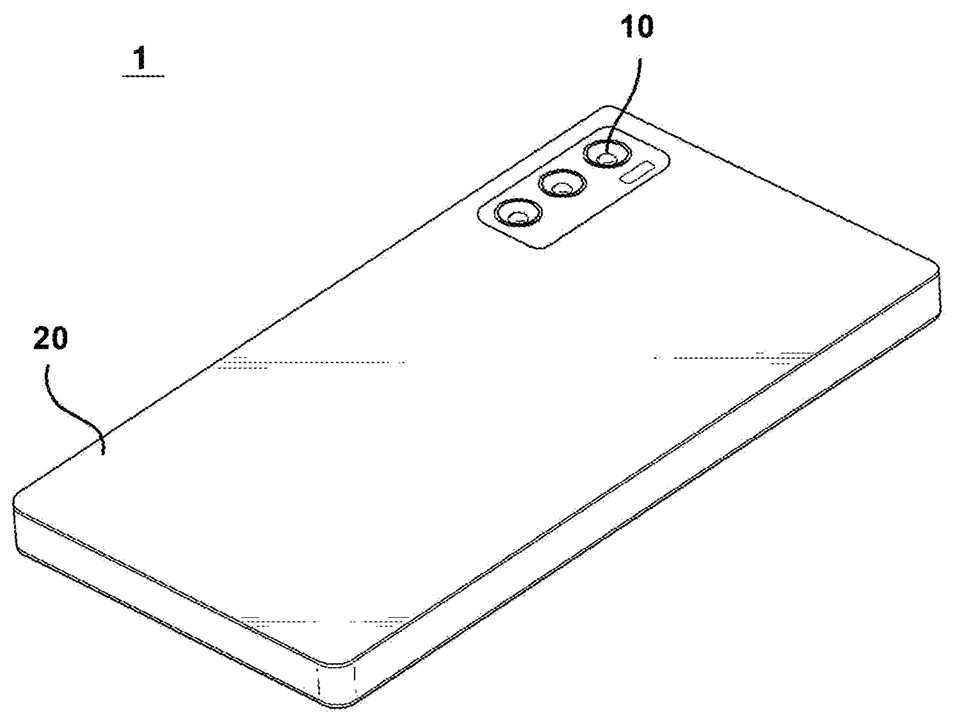
FIG. 72 is a perspective view of a rear surface of an optical device according to the present embodiment.

FIG. 71 is a perspective view of the front side of an optical device according to the present embodiment; and FIG. 72 is a perspective view of a rear surface of an optical device according to the present embodiment.

The optical device 1 may comprise any one or more among a hand phone, a mobile phone, a portable terminal, a mobile terminal, a smart phone, a smart pad, a portable smart device, a digital camera, a laptop computer, a digital broadcasting terminal, personal digital assistants (PDA), portable multimedia player (PMP), and navigation. The optical device 1 may comprise any device for photographing an image or a photo.

The optical device 1 may comprise a main body 20. The optical device 1 may comprise a camera device 10. The camera device 10 may be disposed in the main body 20. The camera device 10 may photograph a subject. The optical device 1 may comprise a display 30. The display 30 may be disposed on the main body 20. The display 30 may output any one or more of a video and an image photographed by the camera device 10. The display 30 may be disposed on a first surface of the main body 20. The camera device 10 may be disposed on any one or more of the first surface of the main body 20 and the second surface opposite to the first surface.

The camera device 10 according to the present embodiment may be a folded camera module. The folded camera module may have an angle of view of 15 degrees to 40 degrees. The folded camera module may have a focal length of 18 mm to 20 mm or more. The folded camera module may be used as a rear camera of the optical device 1. A main camera having an angle of view of 70 degrees to 80 degrees may be disposed on the rear surface of the optical device 1. At this time, the folded camera can be disposed next to the main camera. That is, the camera device 10 according to the present embodiment may be applied to any one or more of a plurality of rear cameras of the optical device 1. The camera device 10 according to the present embodiment may be applied to one camera among the rear cameras such as two, three, four or more of the optical device 1.

Meanwhile, the camera device 10 according to the present embodiment may be disposed on the front surface of the optical device 1. However, when the front camera of the optical device 1 is one, a wide-angle camera may be applied. When there are two or more of front cameras in the optical device 1, one of them may be a telescopic camera as in the present embodiment. However, since the focal length is shorter than that of the rear telescopic camera, a normal camera module that does not comprise a reflective member rather than a folded camera module may be applied.

Figure 73:
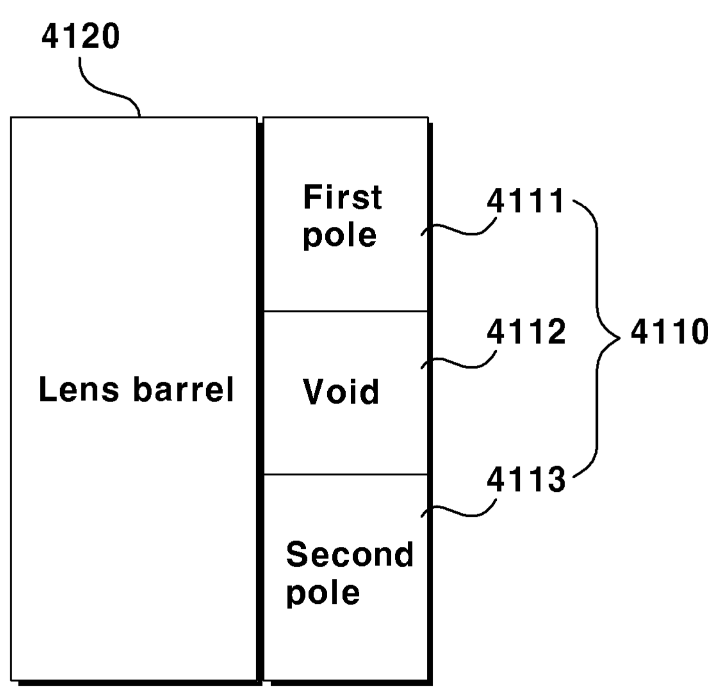
FIG. 73 is a block diagram of a lens driving device according to an embodiment of the present invention.

FIG. 73 is a block diagram of a lens driving device according to an embodiment of the present invention.

The lens driving device 4100 according to an embodiment of the present invention is composed of a lens barrel 4120 and a magnet 4110 disposed in the lens barrel 4120, and may comprise a position measuring unit 4130, a control unit 4150, a coil 4160, and a memory (not shown) for storing control algorithm or calibration information.

The magnet 4110 may be a magnetic material disposed on a lens barrel (not shown). The magnet 4110 may move together with the lens barrel, and the position of the lens barrel may be known by detecting the position of the magnet 4110. A distance that the magnet 4110 moves when it is driven is referred to as a movement stroke. One or more lenses may be coupled to the lens barrel, and a first lens group comprising a plurality of lenses may be coupled, and may comprise a plurality of lens groups. One or more magnets 4110 may be disposed for each lens or lens group to be driven or to detect a position. A plurality of magnets 4110 may be disposed to drive the lens in a plurality of directions or detect a position. A movement stroke of the magnet 4110 may be set according to a moving distance to control the position of the lens. The magnet 4110 may perform zoom, autofocus (AF), and handshake prevention (OIS) functions according to the purpose of driving the lens.

The magnet of the lens driving device can be divided into: a driving magnet that drives to move the position of the lens or lens barrel; and a sensing magnet for measuring the position of the position measuring unit 4130 such as a Hall sensor in order to measure the position of the lens or the lens barrel.

The magnet 4110 according to an embodiment of the present invention may simultaneously perform functions of a driving magnet and a sensing magnet. That is, a driving magnet and a sensing magnet may be implemented with one magnet 4110. Through this, the number of magnets can be reduced and the product can be miniaturized. The position measuring unit 4130 may be a Hall sensor. The Hall sensor is a sensor that detects a position by sensing a change in magnetism, and may detect the position of the magnet 4110 by using a change in magnetism that occurs according to the movement in the position of the magnet 4110.

The magnet 4110 may comprise a first pole 4111, a void 4112, and a second pole 4113. Here, one of the first pole 4111 and the second pole 4113 may be an N pole and the other may be an S pole. The void 4112 is a neutral zone (N.Z) and may be a region having no polarity. The magnet 4110 is formed through magnetization in which a magnetic material is magnetized to have a polarity. At this time, in performing magnetization using a magnetizing jig, the magnet 4110 may be formed by forming a void having no polarity between the N pole and the S pole.

Figure 74:
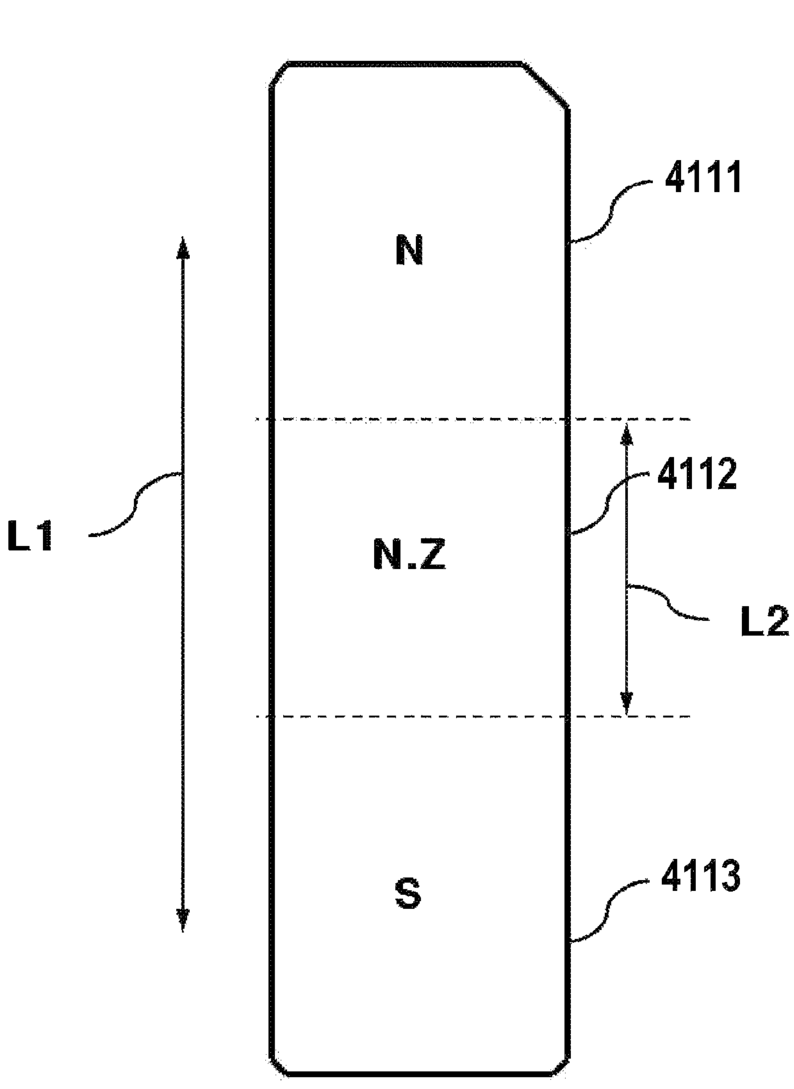
FIG. 74 illustrates a magnet according to an embodiment of the present invention.
Figure 75:
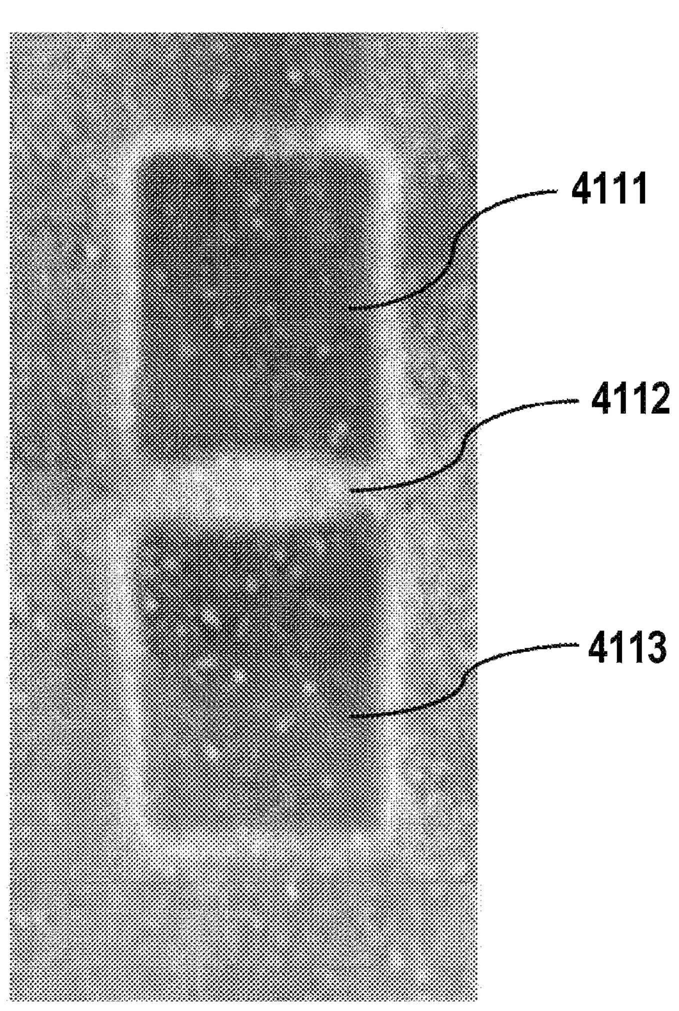
FIGS. 75 and 76 are diagrams for explaining a magnet according to an embodiment of the present invention.

In forming a void 4112 of the magnet 4110, the length of the void is set according to the length of the movement stroke of the magnet 4110. As illustrated in FIG. 74, a void 4112 is formed between the first pole 4111 and the second pole 4113, but the length of the void 4112 may be set according to the length of the movement stroke of the magnet 4110. FIG. 75 is an actual implementation example of the magnet, and a void 4112 having a predetermined length in the longitudinal direction can be confirmed between the first pole 4111 and the second pole 4113.

Figure 76:
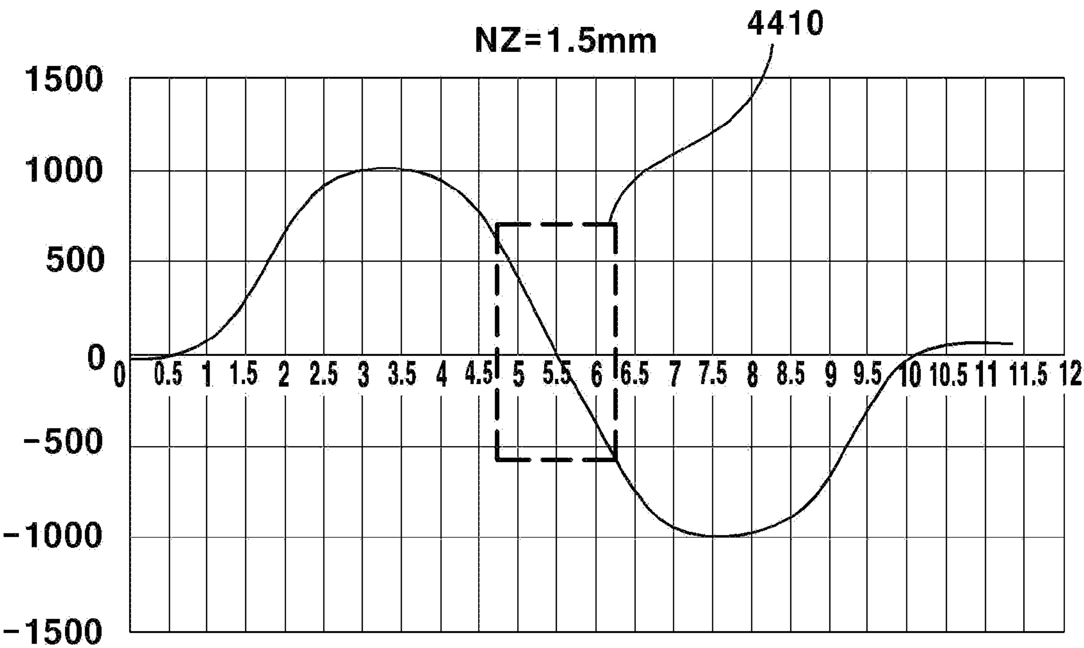

When the movement stroke of the magnet 4110 is formed as a long stroke, linearity may be deteriorated due to the characteristics of the flux of the magnet 4110. It affects not only linearity, but also hysteresis and resolution. The magnet flux may be as shown in FIG. 76. Here, the graph may be a graph of a signal measured by a position measuring unit measuring the position of the magnet 4110. As shown in FIG. 76, it does not have linearity at all positions according to the movement position of the magnet 4110, but has linearity for a predetermined section 4410 and if it is out of the section, there is a non-linear section. It may have a cubic function form in the nonlinear section. When a signal in a non-linear section is used, control performance is deteriorated. Accordingly, in order to measure the position of the magnet 4110 using the linearity section 4410 in the graph of FIG. 76, it is necessary to form the corresponding section long. To this end, a void 4112 having a predetermined length may be formed in the magnet 4110. As the length of the void 4112 increases, the linearity may increase, but if it is too long, the magnitude of the magnetic flux of the magnet 4110 may be reduced, and thus, the driving force may be reduced. That is, in order to implement the long stroke of the magnet 4110, it is important to form the void 4112 and, at the same time, form the optimal length of the void 4112 according to the length of the movement stroke.

The length of the void 4112 may be set in proportion to the length of the movement stroke of the magnet 4110. The longer the movement stroke, the longer the length of the void 4112 can be set.

At this time, the length of the void 4112 may be set to ¼ to ¾ of the movement stroke length in the movement direction of the magnet 4110, in the movement direction of the magnet 4110. For example, when the length of the movement stroke is 3 mm, the length of the void 4112 may be set within the range of 0.75 mm to 2.25 mm.

Ideally, the length of void 4112 could be set to ½ the length of the movement stroke. For example, when the length of the movement stroke is 3 mm, the length of the void 4112 may be set to 1.5 mm.

At this time, since a tolerance may occur in the manufacturing process of the lens driving device, the length of the void 4112 may be set in consideration of the tolerance. That is, the length of the void 4112 may be set within a tolerance range of ½ of the movement stroke length in the movement direction of the magnet 4110. Here, when considering the tolerance, the manufacturing tolerance of the magnet manufacturing tolerance and the manufacturing tolerance of the SMT for the printed circuit board (PCB) of the position measuring unit measuring the position of the magnet 4110. For example, the tolerance range may be 10%. When the tolerance is considered, the length L2 of the void 4112 may be set as follows.

$$L2 = L1/2 \pm E \quad \text{[Equation 1]}$$

Here, L1 is a movement stroke length of the magnet 4110, and E may be 10% as a tolerance range. If the tolerance range is applied as 10%, the length of the void 4112 may be set to 0.45 to 0.55 times the length of the movement stroke. For example, when the length of the movement stroke is 3 mm, the length of the void 4112 may be set within the range of 1.35 mm to 1.65 mm. It is natural that the tolerance range may be set by a user or may be set differently in consideration of a tolerance of a magnet or a tolerance of a Hall sensor.

Figure 77:
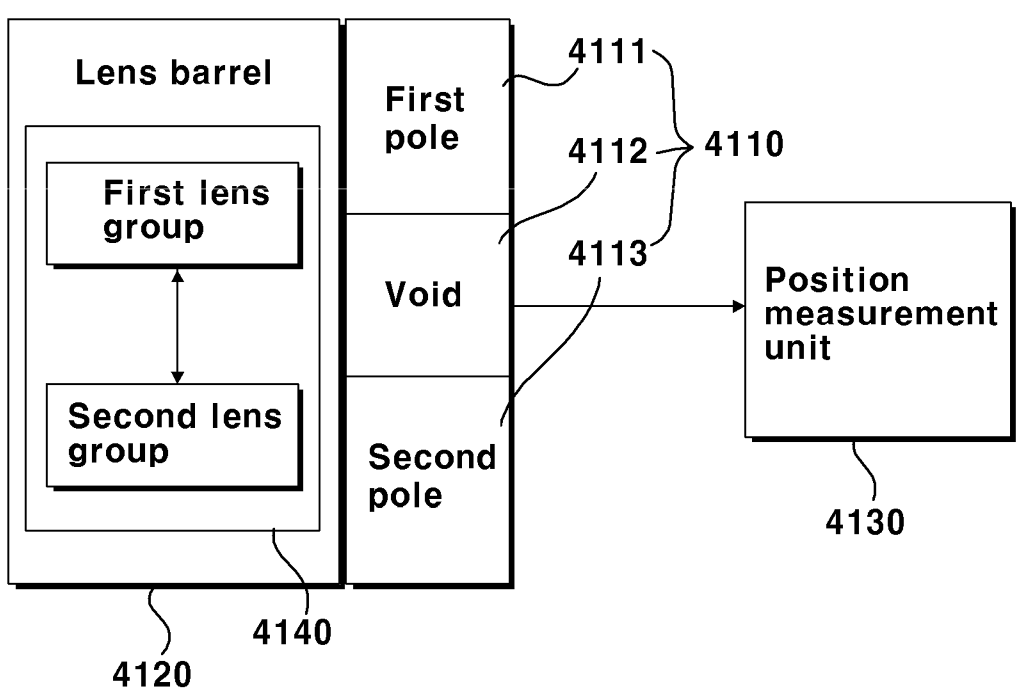
FIG. 77 is a block diagram of a camera module according to an embodiment of the present invention.
Figure 78:
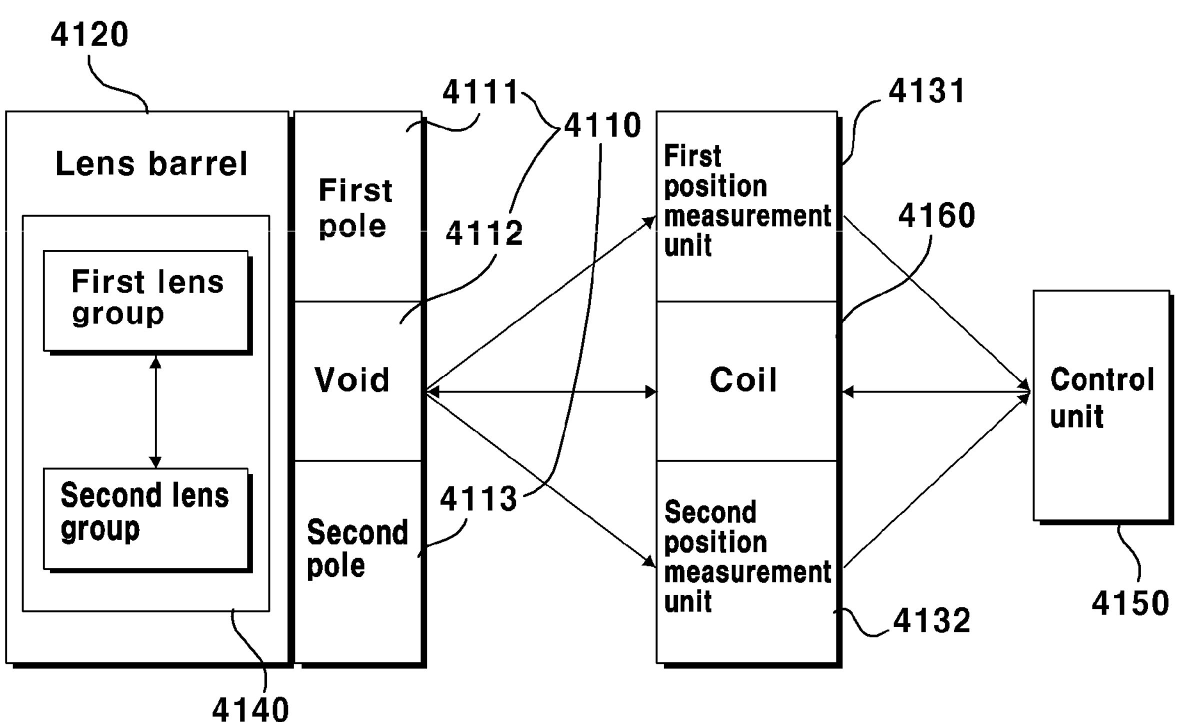
FIG. 78 is a block diagram of a camera module according to another embodiment of the present invention.

FIG. 77 is a block diagram of a camera module according to an embodiment of the present invention, and FIG. 78 is a block diagram of a camera module according to another embodiment of the present invention. Since a detailed description of each configuration of the camera module according to an embodiment of the present invention corresponds to a detailed description of each configuration of the lens driving device of FIGS. 73 to 76 corresponding to each configuration, hereinafter, redundant descriptions will be omitted.

A camera module according to an embodiment of the present invention comprises: a plurality of lens groups 4140 comprising at least one lens group fixed in position and at least one movable lens group; a lens barrel 4120 in which a plurality of lens groups 4140 are disposed; a magnet 4110 disposed in the lens barrel 4120 and comprising a first pole 4111, a void 4112, and a second pole 4113; and a position measuring unit 4130 measuring the position of a magnet 4110. Here, the length of the void 4112 of the magnet 4110 may be set according to the length of the movement stroke of the magnet 4110.

The plurality of lens groups 4140 may comprise a first lens group that is at least one lens group whose position is being fixed, and a second lens group that is at least one lens group that is movable. In addition, the lens group that is movable may further comprise a third lens group (not shown) to an nth lens group, an OIS lens, a right angle prism, a filter for inhibiting foreign substances, an infrared (IR) filter, and the like. At this time, the first lens group, the second lens group, and the third lens group may be sequentially arranged. The OIS lens or the right-angle prism may be disposed at the front end of the first lens group. Each lens group may comprise a plurality of lenses. Continuous magnification adjustment may be possible according to a distance between two lens groups among the plurality of lens groups 4140. For example, the magnification may be continuously adjusted according to the movement of the second lens group, and the focus may be adjusted according to the movement of the third lens group. At this time, the movement amount of the third lens group may be greater than the movement amount of the second lens group. Here, the meaning of continuously increasing or decreasing the magnification may mean that the magnification increases or decreases linearly rather than intermittently increasing or decreasing digitally. By using a plurality of lens groups, continuous magnification adjustment is possible, high resolution can be maintained even at high magnification, and a compact zoom lens can be implemented.

The magnet 4110 consists of a first pole 4111, a void 4112, and a second pole 4113, and the length of the void 4112 may be set in proportion to the movement stroke length of the magnet 4110. At this time, the length of the void 4112 in the moving direction of the magnet 4110 may be set within a tolerance range of ½ of the movement stroke length, and the tolerance range may be 10%.

The position measuring unit 4130 is disposed to face the magnet 4110 and detect a change in magnetism according to the movement of the magnet 4110 to measure the position of the magnet 4110. The position measuring unit 4130 may comprise a first position measuring unit 4131 and a second position measuring unit 4132, as shown in FIG. 78, the control unit 4150 may be respectively connected to the position measuring units 4131 and 4132 to receive a signal, thereby detecting the position of the magnet 4110. The control unit 4150 may be a driver IC. The control unit 4150 may comprise at least one processor that processes a control algorithm stored in a memory for driving a lens driving device. Here, the control algorithm is an algorithm for detecting a position and posture difference using a Hall sensor or a gyro sensor, which is a position measuring part, and based on this, driving an actuator, wherein the control unit 4150 may drive the coil 4140 to perform a zoom, auto focus (AF), or image stabilization (OIS) function by using the corresponding algorithm. When driving by applying a control signal to the coil 4140, the position of the magnet 4110 may be adjusted by the magnetism between the coil 4140 and the magnet 4110. Through this, zoom, auto-focus, and anti-shake functions can be performed.

Figure 79:
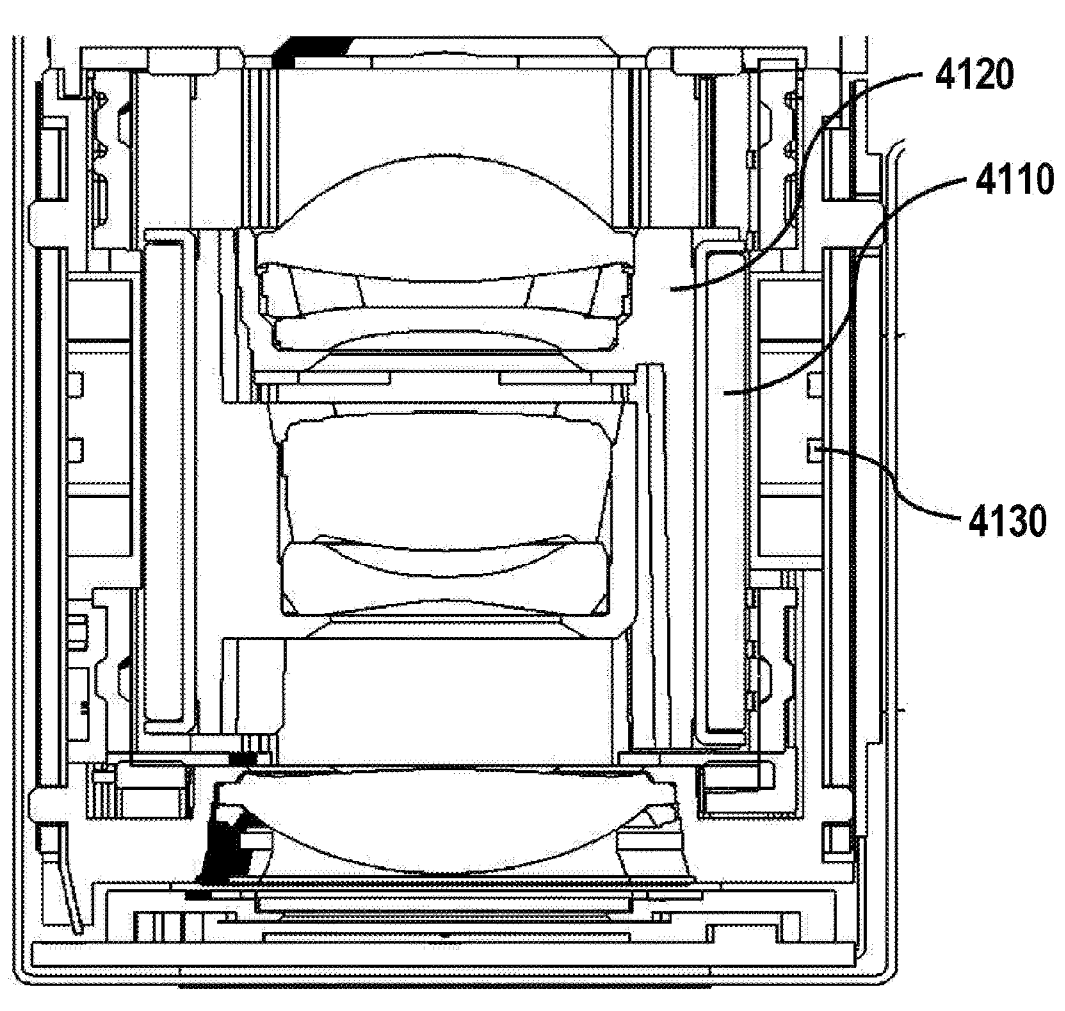
FIG. 79 illustrates an implementation example of a camera module according to an embodiment of the present invention.

A camera module according to an embodiment of the present invention may be implemented as shown in FIG. 79. A lens barrel 4120 in which a plurality of lens groups are formed, a magnet 4110 that is disposed and performs the functions of a driving magnet and a sensing magnet at the same time, and a position measuring unit 4130 for measuring the position of the magnet 4110 facing the magnet 4110 can be formed. The magnet 4110 is formed with a first pole, a void, and a second pole, and as the length of the void is being set according to the length of the movement stroke of the magnet 4110, a long stroke can be implemented.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A lens driving device comprising:

a fixed part;

a first moving part and a second moving part disposed in the fixed part;

a first driving magnet disposed on the first moving part;

a second driving magnet disposed on the second moving part;

a first coil disposed on the fixed part and disposed at a position corresponding to the first driving magnet;

a second coil disposed on the fixed part and disposed at a position corresponding to the second driving magnet;

a first Hall sensor and a second Hall sensor disposed in a hollow of the first coil and configured to detect the first driving magnet; and a first yoke formed in a shape corresponding to the first driving magnet and disposed to cover at least a portion of at least three surfaces of the first driving magnet, wherein, in an optical axis direction, a center of the first coil is disposed in front of a center of the second coil, and wherein a portion of the first coil is overlapped with the second coil in a first direction perpendicular to the optical axis direction, wherein the first driving magnet comprises a first magnet portion and a second magnet portion each having an N pole and an S pole, and a neutral portion or void disposed between the first magnet portion and the second magnet portion, and wherein, in the optical axis direction, a size of the neutral portion or void is smaller than a size of the hollow of the first coil and is larger than a distance between the first Hall sensor and the second Hall sensor.

2. The driving device of claim 1, wherein the first coil comprises a portion not overlapped with the second coil in the first direction.

3. The driving device of claim 1, wherein, in a second direction perpendicular to the optical axis direction and the first direction, the center of the first coil is disposed at a height corresponding to the center of the second coil.

4. The driving device of claim 3, wherein the fixed part comprises a second yoke comprising a magnetic material, wherein the first driving magnet is disposed such that an attractive force acts with the second yoke, wherein, in a second direction perpendicular to the optical axis direction and the first direction, a width of the second yoke is greater than a width of a first surface of the first driving magnet facing a first surface of the second yoke.

5. The driving device of claim 1, wherein the fixed part comprises a housing and a first lens disposed on the housing, wherein the first moving part comprises a first holder disposed in the housing, and a second lens disposed on the first holder, wherein the second moving part comprises a second holder disposed in the housing, and a third lens disposed on the second holder, and wherein the second lens is disposed between the first lens and the third lens.

6. The driving device of claim 5, wherein the first coil is formed to have a same size as the second coil and is disposed closer to the first lens than is the second coil.

7. The driving device of claim 5, wherein the first driving magnet is formed to have a same size as the second driving magnet and is disposed closer to the first lens than is the second driving magnet.

8. The driving device of claim 1, wherein a portion of the first driving magnet is overlapped with the second driving magnet in the first direction, and wherein the first driving magnet comprises a portion not overlapped with the second driving magnet in the first direction.

9. The driving device of claim 1, wherein the fixed part comprises a second yoke comprising a magnetic material, wherein the first driving magnet is disposed such that an attractive force acts with the second yoke, and wherein, in a second direction perpendicular to each of the optical axis direction and the first direction, a width of the second yoke is greater than a width of a first surface of the first driving magnet facing a first surface of the second yoke.

10. The driving device of claim 1, wherein the first driving magnet comprises a first magnet portion and a second magnet portion each having an N pole and an S pole, and a neutral portion or void disposed between the first magnet portion and the second magnet portion, wherein the first coil comprises a first portion facing the first magnet portion and a second portion facing the second magnet portion, and wherein the first portion of the first coil is not overlapped with the second magnet portion in the first direction, and the second portion of the first coil is not overlapped with the first magnet portion in the first direction.

11. The driving device of claim 1, wherein the first moving part is configured to move to perform a zoom function when a current is applied to the first coil, and wherein the second moving part is configured to move to perform an autofocus function when a current is applied to the second coil.

12. A camera device comprising:

a printed circuit board;

an image sensor disposed on the printed circuit board;

a reflective member driving device; and the lens driving device of claim 1 disposed between the image sensor and the reflective member driving device.

13. The camera device of claim 12, comprising:

a driver IC disposed on the printed circuit board and electrically connected to the first coil and the second coil;

a substrate electrically connecting the printed circuit board and the reflective member driving device; and a temperature sensor disposed on the substrate.

14. The camera device of claim 13, wherein the temperature sensor is disposed adjacent to the first coil or the second coil.

15. An optical device comprising:

a main body;

the camera device of claim 12 disposed on the main body; and a display disposed in the main body and configured to output at least one of a video and an image photographed by the camera device.

16. A lens driving device comprising:

a fixed part;

a first moving part and a second moving part disposed in the fixed part;

a first driving magnet disposed on the first moving part;

a second driving magnet disposed on the second moving part;

a first coil disposed on the fixed part and disposed at a position corresponding to the first driving magnet;

a second coil disposed on the fixed part and disposed at a position corresponding to the second driving magnet;

a first Hall sensor and a second Hall sensor disposed in a hollow of the first coil and configured to detect the first driving magnet; and a yoke disposed between the first driving magnet and the first moving part, wherein, in an optical axis direction, a center of the first coil is disposed in front of a center of the second coil, wherein a portion of the first coil is overlapped with the second coil in a first direction perpendicular to the optical axis direction, wherein, in a second direction perpendicular to the optical axis direction and the first direction, the center of the first coil is disposed at a height corresponding to the center of the second coil, and wherein the yoke is configured to cover at least a portion of at least three surfaces of the first driving magnet, wherein the first driving magnet comprises a first magnet portion and a second magnet portion each having an N pole and an S pole, and a neutral portion or void disposed between the first magnet portion and the second magnet portion, and wherein, in the optical axis direction, a size of the neutral portion or void is smaller than a size of the hollow of the first coil and larger than a distance between the first Hall sensor and the second Hall sensor.

17. A driving device comprising:

a fixed part comprising a first lens;

a first moving part disposed in the fixed part and comprising a second lens;

a second moving part disposed in the fixed part and comprising a third lens;

a first driving magnet disposed on the first moving part;

a second driving magnet disposed on the second moving part;

a first coil disposed at a position corresponding to the first driving magnet;

a second coil disposed at a position corresponding to the second driving magnet;

a first Hall sensor and a second Hall sensor disposed in a hollow of the first coil and configured to detect the first driving magnet; and a yoke formed in a shape corresponding to the first driving magnet and disposed to cover at least a portion of at least three surfaces of the first driving magnet, wherein the first driving magnet is disposed closer to the first lens than is the second driving magnet, wherein a portion of the first driving magnet is overlapped with the second driving magnet in a first direction perpendicular to an optical axis direction, wherein the first driving magnet comprises a first magnet portion and a second magnet portion each having an N pole and an S pole, and a neutral portion or void disposed between the first magnet portion and the second magnet portion, and wherein, in the optical axis direction, a size of the neutral portion or void is smaller than a size of the hollow of the first coil and larger than a distance between the first Hall sensor and the second Hall sensor.

18. The driving device of claim 17, wherein the first driving magnet comprises a portion not overlapped with the second driving magnet in the first direction.

19. The driving device of claim 17, wherein the first coil is disposed closer to the first lens than is the second coil.

20. The driving device of claim 17, wherein the first driving magnet is formed to have a same size as the second driving magnet.

* * * * *